(No Model.) 14 Sheets—Sheet 1.
W. W. HOPKINS.
ADDING, SUBTRACTING, AND RECORDING MACHINE.
No. 517,383. Patented Mar. 27, 1894.
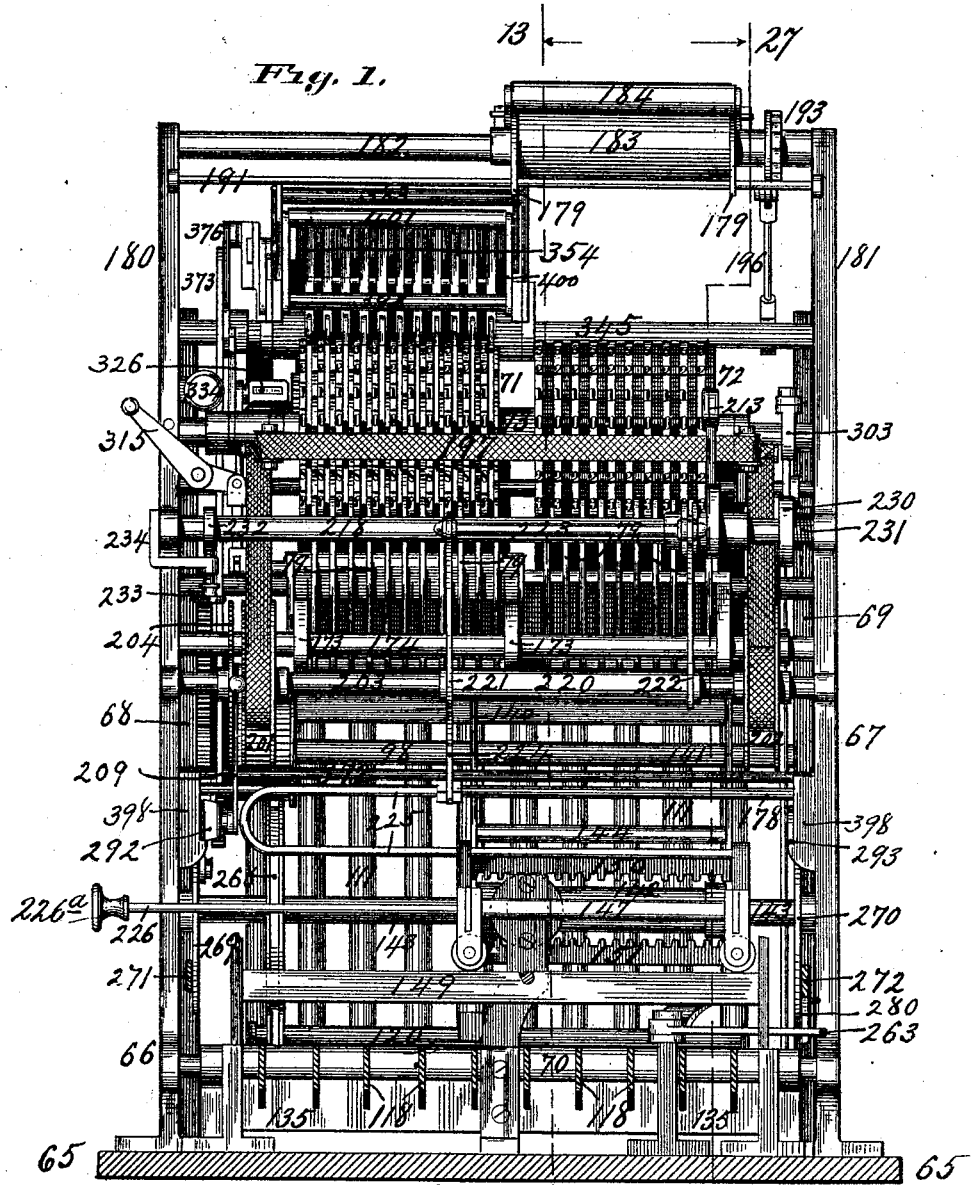
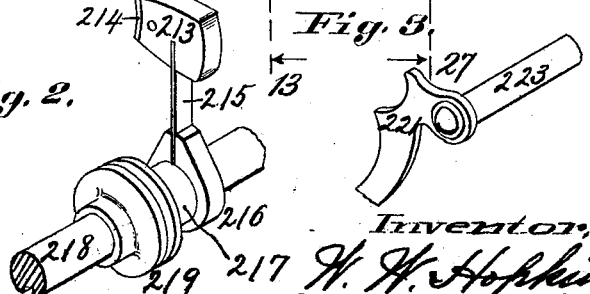
Witnesses:
Charles Pickles
Alfred W. Davis
Inventor:
W. W. Hopkins
By Howler & Howler
Attorneys (No Model.)
W. W. HOPKINS.
ADDING, SUBTRACTING, AND RECORDING MACHINE.
No. 517,383.
14 Sheets—Sheet 2.
Patented Mar. 27, 1894.
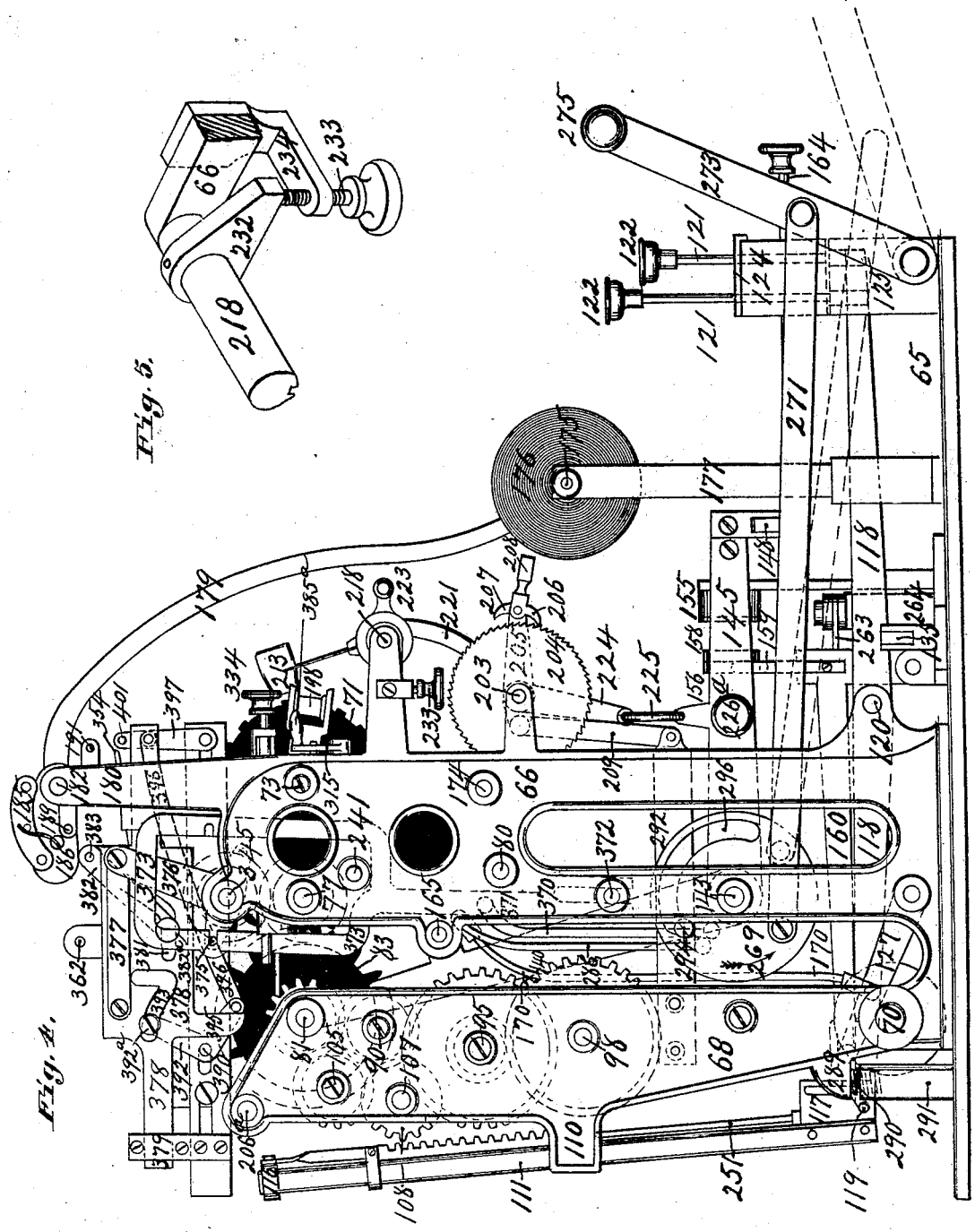
Witnesses:
Charles Pickles
Alfred W. Davis
Inventor:
W. W. Hopkins,
By Fowler & Fowler
Attorneys.

(No Model.) 14 Sheets—Sheet 3.

W. W. HOPKINS.
ADDING, SUBTRACTING, AND RECORDING MACHINE.

No. 517,383. Patented Mar. 27, 1894.

Witnesses:
Charles Pickles
Alfred W. Davis

Inventor:
W. W. Hopkins,
By Fowler & Fowler
Attorneys.

(No Model.) 14 Sheets—Sheet 4.
W. W. HOPKINS.
ADDING, SUBTRACTING, AND RECORDING MACHINE.
No. 517,383. Patented Mar. 27, 1894.
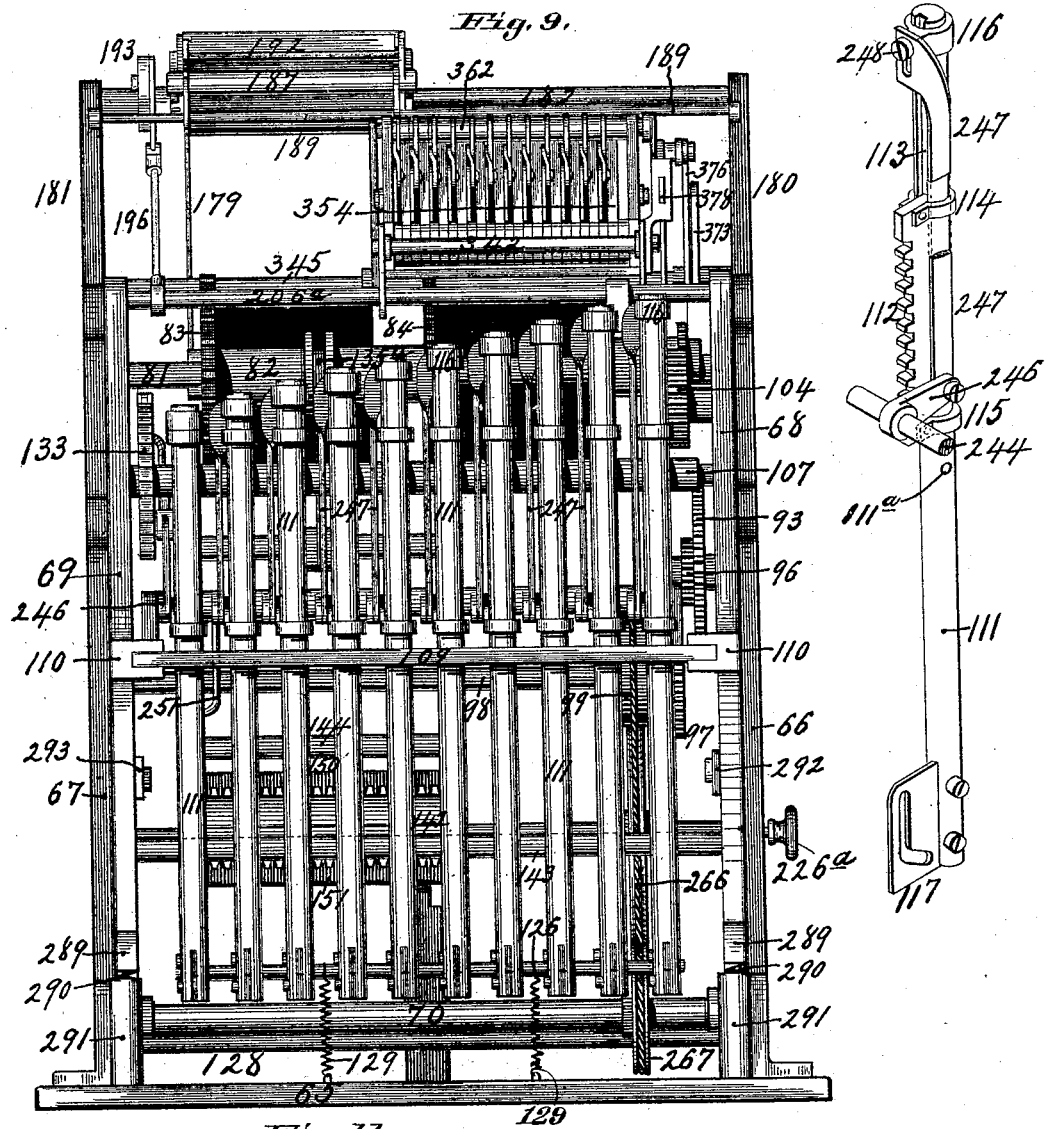
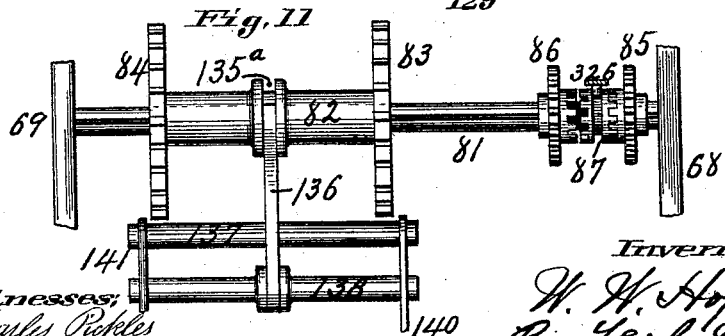
Witnesses:
Charles Pickles
Alfred W. Davis
Inventor:
W. W. Hopkins,
By Fowler & Fowler
Attorneys.

(No Model.)  14 Sheets—Sheet 5.

W. W. HOPKINS.
ADDING, SUBTRACTING, AND RECORDING MACHINE.

No. 517,383.  Patented Mar. 27, 1894.

Witnesses:
Charles Pickles
Alfred W. Davis

Inventor:
W. W. Hopkins,
By Fowler & Fowler
Attorneys.

(No Model.) 14 Sheets—Sheet 6.
W. W. HOPKINS.
ADDING, SUBTRACTING, AND RECORDING MACHINE.
No. 517,383. Patented Mar. 27, 1894.
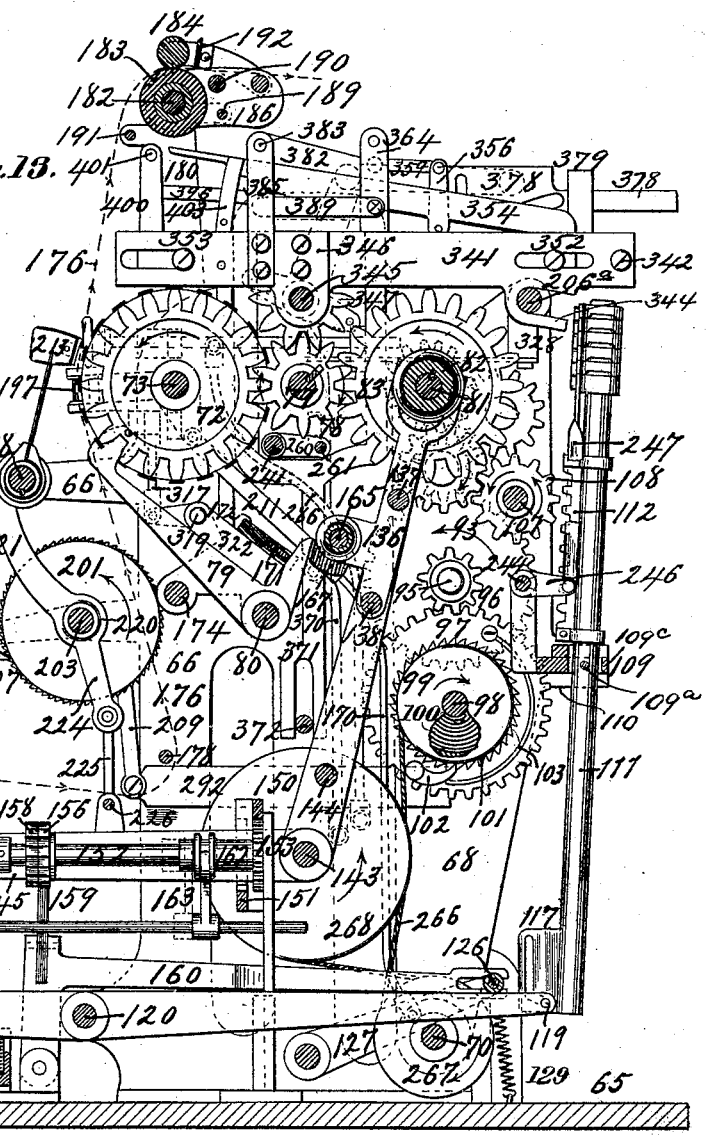

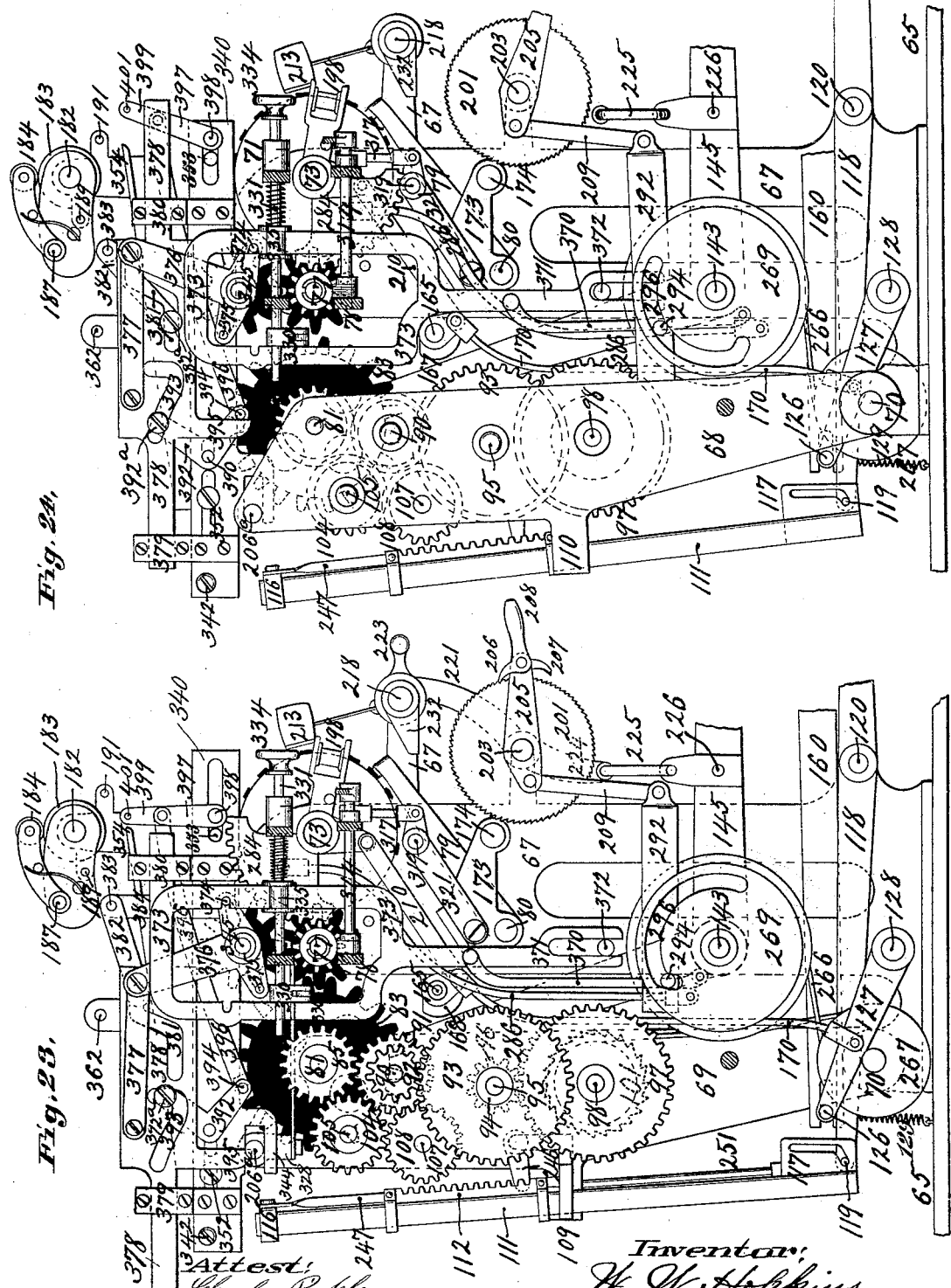

(No Model.)

W. W. HOPKINS.
ADDING, SUBTRACTING, AND RECORDING MACHINE.

No. 517,383. Patented Mar. 27, 1894.

Witnesses:
Charles Pickles
Alfred W. Davis

Inventor:
W. W. Hopkins,
By Fowler & Fowler
Attorneys.

(No Model.)  14 Sheets—Sheet 9.
W. W. HOPKINS.
ADDING, SUBTRACTING, AND RECORDING MACHINE.
No. 517,383.  Patented Mar. 27, 1894.
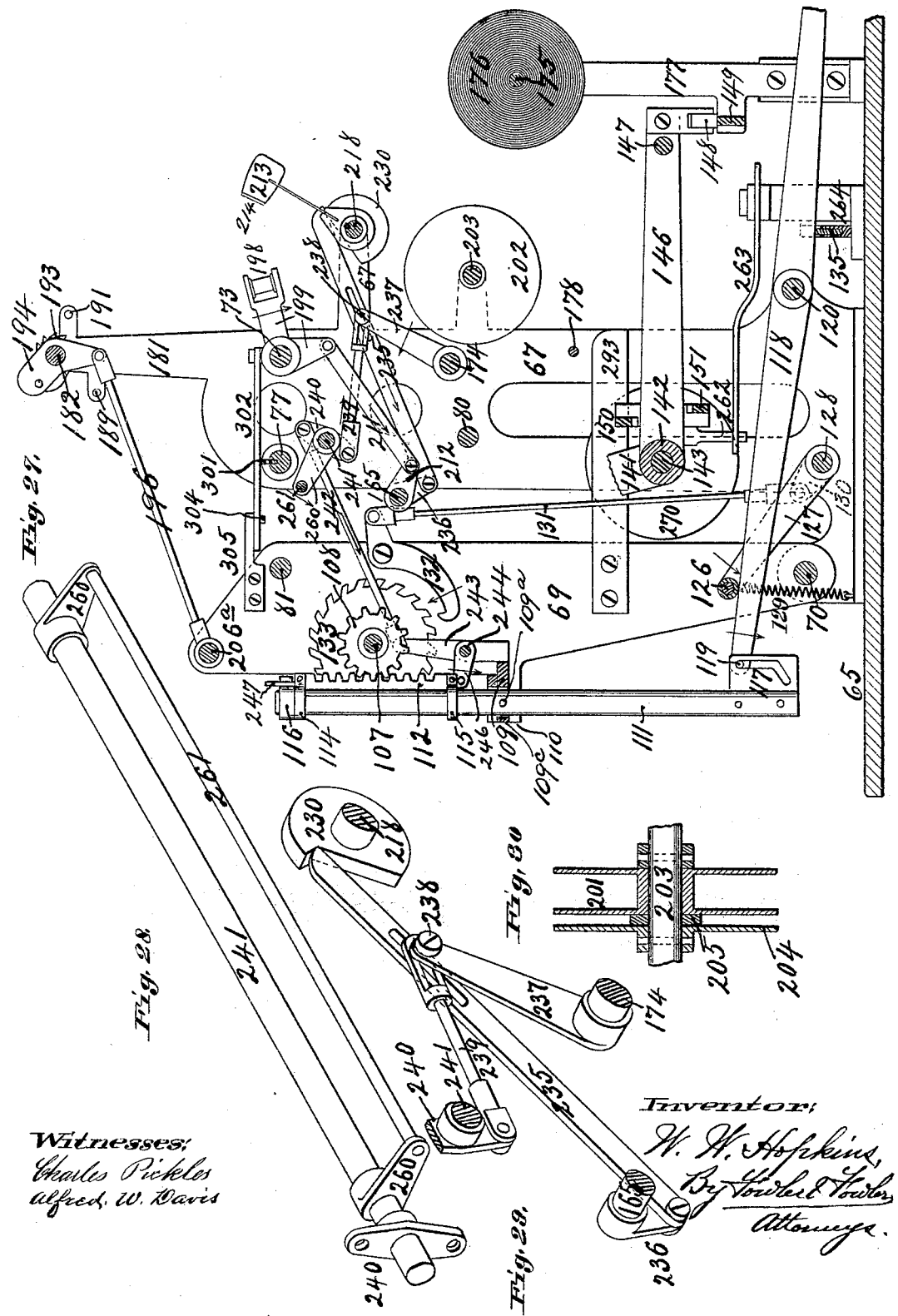

(No Model.)
14 Sheets—Sheet 10.
W. W. HOPKINS.
ADDING, SUBTRACTING, AND RECORDING MACHINE.
No. 517,383. Patented Mar. 27, 1894.
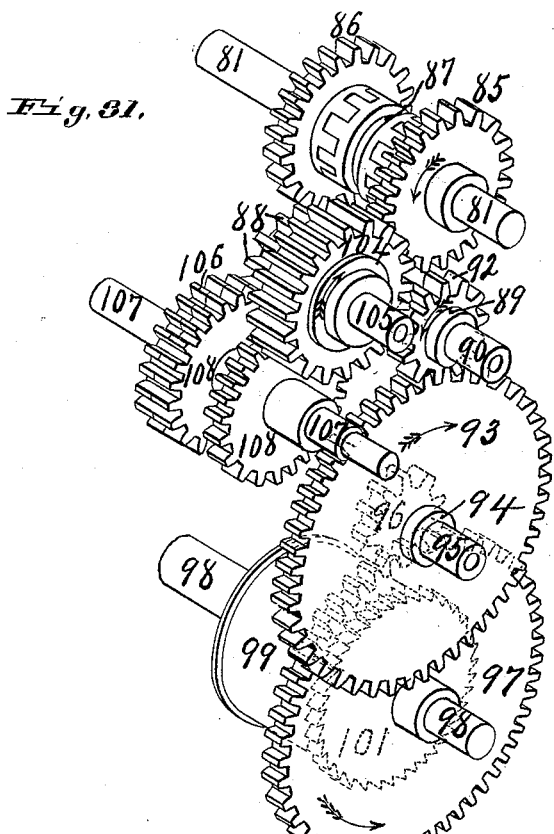
Fig. 31. Fig. 32.
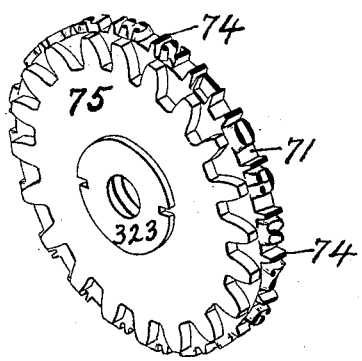
Fig. 34.
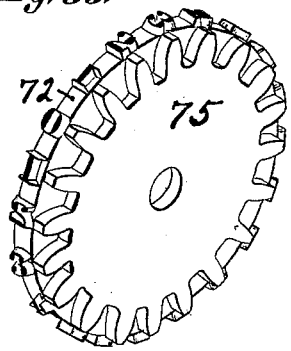
Fig. 33.
Fig. 35.
```
176
        94783
        627548
       4682779
       32718642
       78763 4723
       9621843218
      10447601693
      10447503007
Balance: 98686
```
Witnesses,
Charles Rickles
Alfred W. Davis
Inventor,
W. W. Hopkins,
By Fowler & Fowler
Attorneys.
THE NATIONAL LITHOGRAPHING COMPANY,
WASHINGTON, D. C.

(No Model.) 14 Sheets—Sheet 11.
W. W. HOPKINS.
ADDING, SUBTRACTING, AND RECORDING MACHINE.
No. 517,383. Patented Mar. 27, 1894.
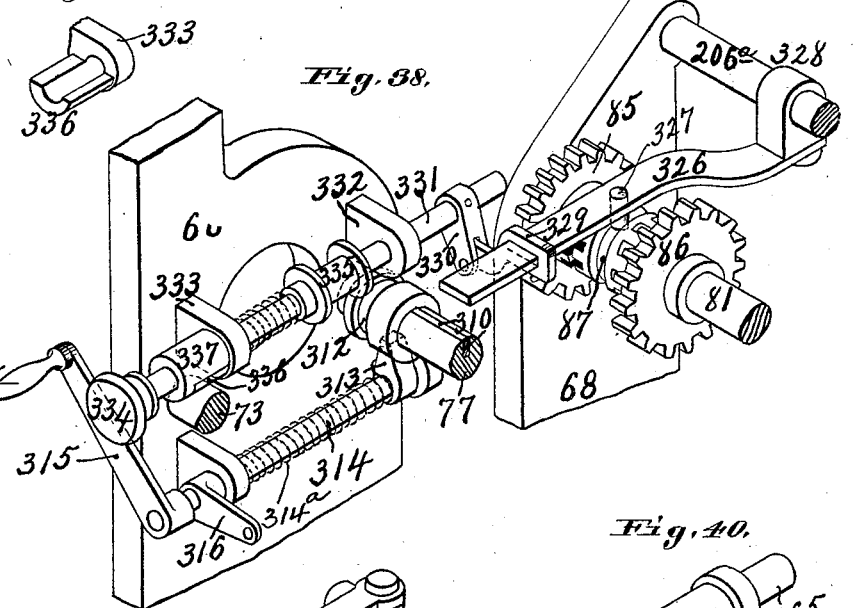
Witnesses:
Charles Pickle
Alfred. W. Davis
Inventor:
W. W. Hopkins
By Fowler & Fowler
Attorneys (No Model.)  W. W. HOPKINS.  14 Sheets—Sheet 12.
ADDING, SUBTRACTING, AND RECORDING MACHINE.
No. 517,383.  Patented Mar. 27, 1894.
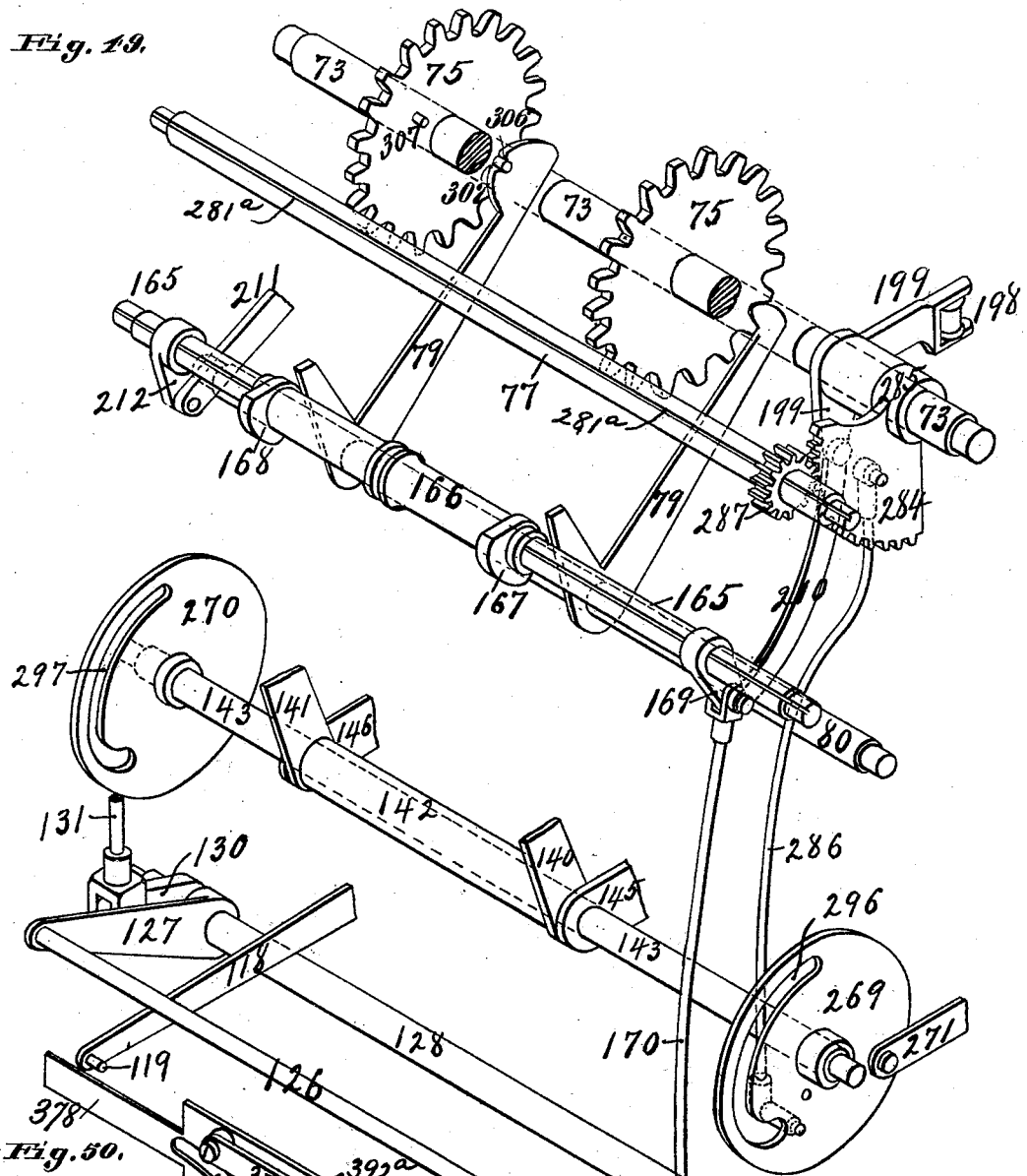
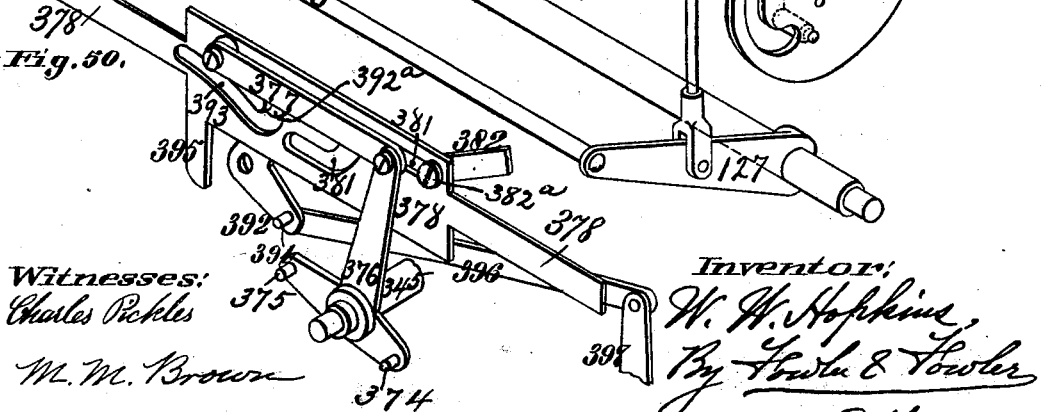
Witnesses:
Charles Pickles
M. M. Brown
Inventor:
W. W. Hopkins,
By Fowler & Fowler
Attorneys (No Model.) 14 Sheets—Sheet 13.

W. W. HOPKINS.
ADDING, SUBTRACTING, AND RECORDING MACHINE.

No. 517,383. Patented Mar. 27, 1894.

Witnesses:
Charles Pickles
Alfred W. Davis

Inventor:
W. W. Hopkins,
By Fowler & Fowler
Attorneys.

(No Model.) 14 Sheets—Sheet 14.
W. W. HOPKINS.
ADDING, SUBTRACTING, AND RECORDING MACHINE.
No. 517,383. Patented Mar. 27, 1894.
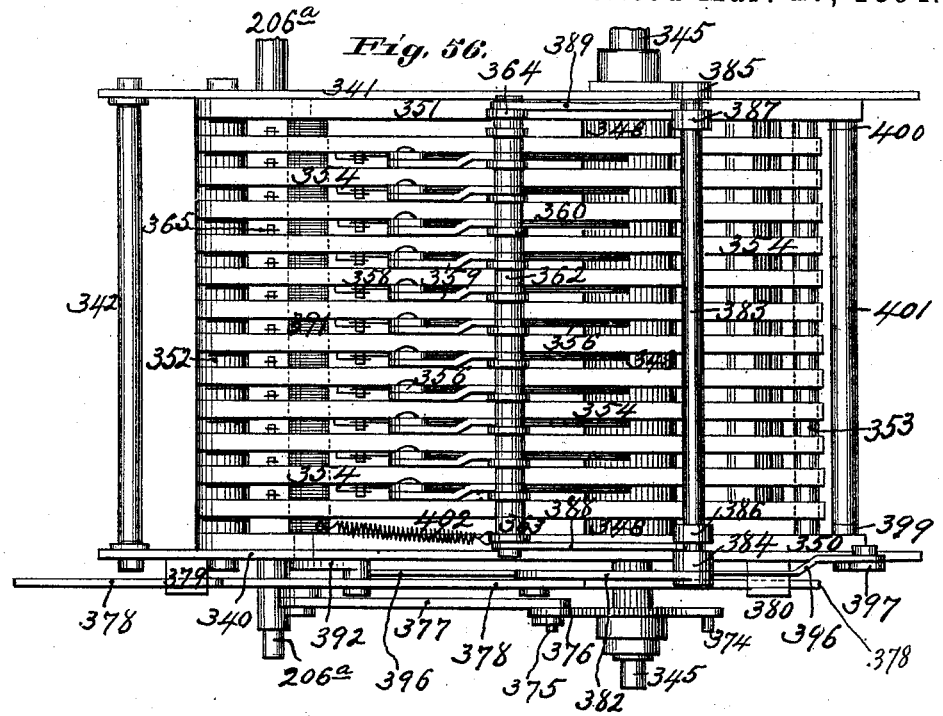
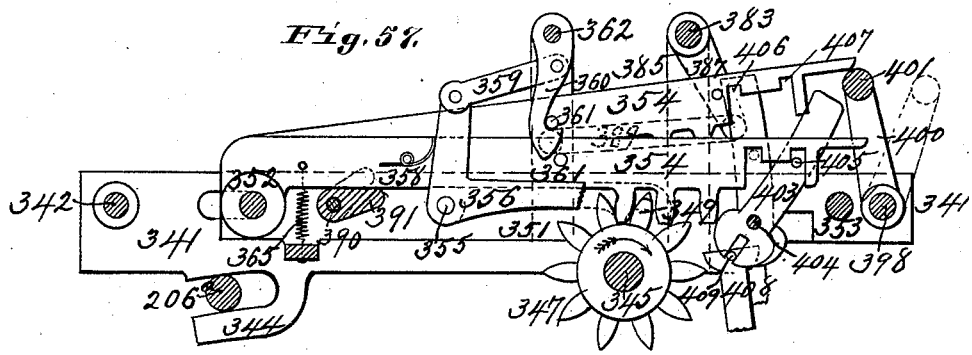
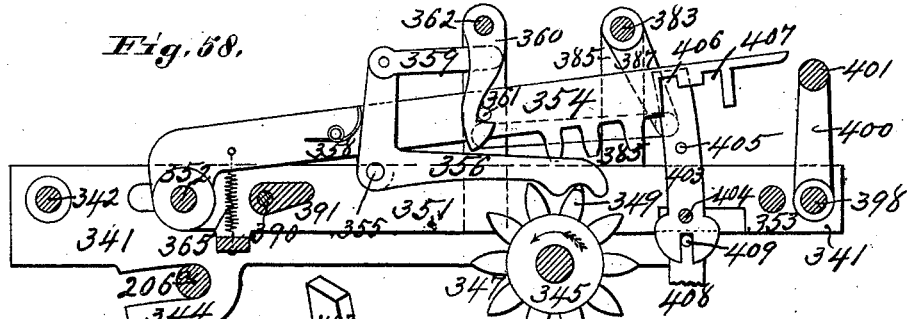
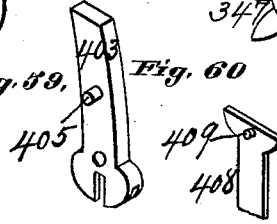

UNITED STATES PATENT OFFICE.

WILLIAM W. HOPKINS, OF ST. LOUIS, MISSOURI, ASSIGNOR TO THE STANDARD ADDING MACHINE COMPANY, OF SAME PLACE.

ADDING, SUBTRACTING, AND RECORDING MACHINE.

SPECIFICATION forming part of Letters Patent No. 517,383, dated March 27, 1894.

Application filed October 4, 1892. Serial No. 447,865. (No model.)

*To all whom it may concern:*

Be it known that I, WILLIAM W. HOPKINS, a citizen of the United States, residing in the city of St. Louis and State of Missouri, have invented a certain new and useful Adding, Subtracting, and Recording Machine, of which the following is such a full, clear, and exact description as will enable any one skilled in the art to which it appertains to make and use the same, reference being had to the accompanying drawings, forming part of this specification.

*Class of adding machines to which the invention relates.*

My invention relates more especially to that class of adding machines which are suitably controlled by keys, and more particularly appertains to an adding machine in which a carriage, or traveling member, moves automatically from order to order as the numbered keys are operated. The first instance of such a machine is exemplified in United States Letters Patent granted to Albert C. Ludlum on June 12, 1888, No. 384,373, and Reissue No. 11,147 of said patent granted to said Ludlum on March 3, 1891. Many features of the present invention are applicable to adding, subtracting, and recording machines generally.

*Objects of the invention.*

One object of my invention is to construct a commercial adding machine, which shall have the least possible number of keys, so as not to confuse the mind, and to lessen the liability of making mistakes in using such machine. In the key-operated adding machines now on the market (that is now in commercial use and with which I am familiar), a great multiplicity of keys are required, a set of digit keys for each numerical order being employed. Where there are many numerical orders the number of keys necessarily becomes very great, ranging from eighty-one to ninety keys to meet ordinary commercial requirements.

Another object of my invention is to make the key-resistance as light as possible, and to construct an adding machine in which the key resistance will be uniform and the depression of the keys the same for one key as for another.

Another object of my invention is to simplify and improve the mechanical construction of adding machines, and to make them more durable, requiring less adjustment and repairing than machines of this character generally demand; also to render such machines less liable to get out of order and make mistakes, and enabling them to stand hard commercial usage successfully, and at the same time to be rapid in action.

Still another object of my invention is to print the numbers added or subtracted, and the sum or difference thereof; also to print the same in such a manner as to be readily visible to the operator, the numbers being printed upon a bulletin sheet preferably standing in front of the machine, and directly opposite the operator, and recorded on that side of the bulletin sheet facing the operator.

A further object of my invention is to construct a machine which will both add and subtract, and in which corrections can be made in the work performed by the machine by subtracting the amount accidentally added, and then adding the correct amount afterward.

Another object of my invention is to construct an adding machine in which over-rotation of the registering or adding mechanism is prevented, and mistakes guarded against, and for this purpose I construct a carrying mechanism, which is brought into operation after the number has been added, and by a deliberate movement, so as to move the registering or adding mechanism but one tooth in carrying.

Still another object of my invention is to construct a carrying mechanism which will operate both for adding and subtracting.

A further object of my invention is to provide means, whereby the machine may be adjusted to commence at the beginning, left hand, or highest order of numbers in adding or subtracting, instead of beginning at the units or right-hand end of numbers.

Another object of my invention is to construct an adding machine in which the work is performed by a motor and in which the keys liberate and control mechanism for governing the motor, but do not by preference themselves, perform the work of operating the registering and carrying mechanism, whereby, among other things, the object of making the key resistance uniform, as stated above, is secured.

Another object of my invention is to store power for the motor by a handle manually operated, which handle may also bring the carriage or traveling member, to its starting point when operated, and may also feed the paper for recording or printing the next number, effect the carrying, and feed the ink-ribbon.

A further object of my invention is to provide a means for bringing the mechanism for printing and recording the numbers registered, to zero, and their starting point, after each number has been added, and which means may be controlled by the manually-operated handle referred to above.

A still further object of my invention is to provide a means for bringing the adding-wheels to zero after the taking of any sum or difference, and when another series of numbers are to be added, and which means may be operated also by the handle aforesaid when said means is suitably brought into requisition by additional devices also operated at will.

Another object of my invention is to provide means for positively locking each of the printing and adding wheels when the same is not in active operation.

A further object of my invention is to positively gear the motor to the adding and printing mechanism in such a manner that a given movement of the motor will produce a certain given movement of the printing and adding mechanism, thereby insuring positive predetermined movement of the parts, and recording the exact number registered by the machine.

The invention has many other objects in view, too numerous to mention, and which will be apparent from the construction to be hereinafter set forth in detail, and some of which latter-mentioned objects will be pointed out hereinafter.

*General plan of machine.*

I will first set forth generally my invention, and the general plan of my machine, and will then describe in full the details thereof, in order to have the invention more readily understood, and to advise one beforehand what the general characteristics of my machine are. The machine has preferably only ten keys corresponding to the digits 0, 1, 2, 3, 4, 5, 6, 7, 8, 9. These keys, when depressed, unlock a motor, and so govern an escapement mechanism, that the motor is permitted to rotate and revolve the registering wheels exactly proportional to the key depressed. On one side of the machine, say the right-hand side, is a series of type-wheels, which, for purposes of convenience, I will designate hereinafter as the printing wheels, inasmuch as their only function is to print the numbers which are registered by the machine, and caused to be so registered by the operation of the keys. These wheels are loosely mounted or journaled upon, preferably, a horizontal shaft, and correspond in number to the number of numerical orders the machine has. Upon the other side, say the left-hand side of the machine, is a corresponding set of wheels, but which may be greater in number than the printing wheels. They are similarly arranged, and are preferably, also loosely mounted or journaled upon the same shaft. The latter-mentioned wheels work in conjunction with the carrying mechanism, and are provided with type to print or indicate the sum of or the difference between the numbers registered by the machine. Their chief function being to register the result, that is to indicate the result principally of addition or of subtraction, I, for purposes of convenience, will hereinafter refer to them as the registering or adding wheels.

Both the adding and printing wheels may be geared respectively to a corresponding number of idle wheels loosely mounted or journaled upon a parallel shaft. Into the teeth of any corresponding two idle wheels of the same numerical order of both the printing and adding wheels, may take respectively two gear wheels capable of axial movement, and rotated by the motor. These last-mentioned gear wheels are preferably connected together, and carried by a shaft and moved axially by a carriage, which, preferably after each key is operated, travels along step by step from order to order, being in engagement with preferably first and turning, the units idle wheel of both the printing and adding wheels, and then progressing step-by-step to the other numerical orders of both the printing and adding wheels, and turning said wheels to an extent proportionate to the key depressed each time. As the carriage proceeds from order to order and the keys are depressed, the printing and adding wheels are unlocked in the order in which the axially-moving gear wheels are, and are automatically locked as the carriage leaves any numerical order and proceeds to the next. As the adding wheels in the different orders are rotated, said adding wheels preferably, suitably position the carrying mechanism so as to carry when required. Each number registered and added by the machine is recorded by the printing wheels upon a strip of paper which is, by preference, arranged in front of the printing wheels bearing the type, so as to be before and readily visible by the operator and form a bulletin sheet, the printing platen and impression-taking devices being in turn arranged in front of the paper, but not in such a manner as to obscure or cover the number printed each time. After each number is printed, the paper is preferably fed for the next number, and the carriage moved to its starting point.

After the sum or difference is registered by the machine, the numbers upon the adding wheels may be printed below the column of figures, by observing the numbers upon such wheels, and striking keys to correspond with the digits of said numbers, or the paper and impression-taking devices may be shifted to the other side of the machine and the numbers registered by the adding wheels printed direct from said adding wheels by striking the zero key, or in any other suitable manner.

After any given number is registered, and it is desired to add or subtract another number, the printing wheels are brought to zero by suitable connections. Mechanism must also be provided, of course, to bring the adding wheels to zero, after any addition or subtraction is made, and it is desired to commence anew upon another mathematical calculation.

Any means or kind of a motor may be used to rotate the printing and adding wheels, such, for the latter instance, as a motor operated by any motive power supplied thereto. Such a motor may be a mechanical motor wound by hand at suitable intervals when run down, or a motor may be used which will have power stored in it each time a number is added or subtracted, by suitably operating some part or member for this purpose. The latter form of motor I prefer, because it renders the machine self-contained. Such a latter-mentioned motor may have power stored in it by the same handle or device which the operator operates each time to feed the paper. This same handle may also control the devices to bring the printing wheels to zero each time, and these constructions I have preferably adopted in the present machine. This same handle may also bring the carriage to its starting point, and this is another construction which I have preferably adopted in the present machine. The carriage, in being moved to its starting point by the handle, may have power stored in a second motor which may be governed by a step-by-step escapement controlled by the keys to impel the carriage. This motor, for purposes of convenience, and to avoid confusion with the main motor referred to above, I will denominate the carriage motor, and the escapement controlled thereby I will hereinafter refer to as the carriage escapement.

Instead of employing a carriage motor and carriage-escapement mechanism, a mechanism by which the keys themselves propel the carriage, or store power for its propulsion upon the up-rise of the keys, may be used. The mechanism for storing power in the motors from the handle, is so designed as to store into the motors only the amount of power which has been expended by the motors, it being just the amount of power required by the motors to complete their full complement of stored energy. I prefer also to have the pulling of the handle effect the carrying, as this throws less work upon the motor and requires a smaller motor of less power to be used. The motor merely rotates the printing and adding wheels of each numerical order corresponding to the keys struck, and the said adding wheels position the carrying mechanism so that it carries and turns the adding wheels, when the handle is operated, through one tooth when it is necessary to carry from any given order to the next higher. The operation of automatically unlocking the desired adding wheel or wheels also takes place when the handle is pulled and carrying is to be effected. The main reason for adopting this construction wherein the handle actuates the carrying mechanism, is that where the motor itself operates the carrying mechanism, or where the carrying and all operations are performed when the keys are depressed, there is liability of the wheels over-rotating or failing to properly perform their functions by reason, among other things, of lacking time in which to do the required work. By my construction the carrying is done by a deliberate movement of the handle, and over-rotation is guarded against. In no instance in my machine, at the striking of any key, is a greater number than nine ever added, and that only in the order in which the machine is working, and when proper appliances are adopted over-rotation or liability of the machine to err is taken away. So also, positive gearing and connections being used between the motor, its escapement and the printing and adding mechanisms, the machine may be said to be infallible in its work. The handle may also perform certain incidental functions which it is not necessary now to mention.

By merely reversing the direction of rotation of the shaft carrying the axially-moving gear wheels, the machine may be made to add or subtract at pleasure, the motor running always in the same direction. To effect this purpose a clutch is preferably provided, which may be operated by a suitable knob terminating upon the outside of the machine conveniently for the operator.

The depressing of one or more of the ten keys of the machine and the pulling of the handle by the operator is all that is needed to be done to perform addition or subtraction, and this may be done with nearly the same facility and expedition that an ordinary commercial type-writer can have its keys struck, the paper fed and the carriage brought to its starting point after the end of a line is reached.

In setting forth my invention and my machine embodying one form thereof, I do not wish to imply that all of said features must be used in a machine in order to embody my invention, as I am aware that many of the features of the invention herein, are applicable singly and in various combinations, to adding and other machines.

In setting forth specifically the machine illustrated in my drawings, I wish to have it distinctly understood that I do not confine myself to the details of construction set forth, excepting, however, when the details are claimed in the claims making a part hereof, as I am aware that various constructions may be devised to carry out the principles of my invention, and that some of the mechanism herein set forth may be simplified and still embody my invention.

By the terms "registering machine," "registering wheels" and "registering mechanism" used herein, I include and mean any machine, wheels, or mechanism which calculate or count numbers.

In making use of the term carriage, herein, I include any device or mechanism which moves from order to order, whether the same reciprocates or not to perform said function, and in mentioning adding wheels I include any equivalent therefor which will answer the purpose of indicating calculations, and do not necessarily confine myself to wheels for this purpose. So too, in referring herein to printing wheels, I do not wish to necessarily limit my invention to wheels being used for printing, but include an appliance bearing printing characters whether it be a wheel or other device. And by the term handle, used herein, I include a treadle, key or devices which perform the function of said handle.

*What the invention consists in.*

The invention consists in a novel form of variable escapement for the motor which preferably, operates the printing and adding mechanism, and in a novel means for controlling said escapement by the finger keys. Also in a novel means of gearing the motor to the printing and adding mechanism, as well as a novel means for storing power in the motor proportional to the amount of work done, or the power required by the motor.

The invention also consists in a novel form of mechanism or escapement for governing the traveling carriage, with suitable means for controlling the same, by the finger keys which govern the operation of the motor upon the printing or adding mechanism.

The invention further consists in means for reversing the direction of the motor so as to change the machine into an adding or subtracting machine at will.

The invention further consists in a means for recording, in the manner heretofore indicated, the numbers added or subtracted, and also means for recording the result.

The invention further consists in a means for operating such printing mechanism by means of the escapement controlling the adding mechanism.

The invention further consists in means for reversing the direction of the carriage to begin at either end of a number.

The invention also consists in a novel carrying mechanism, and in means whereby said mechanism may be made to perform the function of carrying both for addition and subtraction.

The invention further consists in means for feeding the paper upon which the numbers are recorded, which means is operated by the manually-controlled handle by which power is stored in the motor, for propelling the adding and printing mechanism, or the carriage brought to its starting point.

The invention also consists in a novel means for normally locking the printing and adding wheels, and in means for unlocking said wheels when the machine is working in any given order and the keys are operated.

The invention also consists in means for bringing the carriage to a starting point, preferably operated by the manually-controlled handle for winding up the motor which impels the printing and adding mechanism.

The invention further consists in means for bringing the printing wheels to their normal position each time said handle is pulled, and also in means for bringing the adding wheels to zero, the said latter means when properly positioned, being also operated by the said handle.

The invention also consists in novel means for controlling and reversing the inking ribbon for printing.

The invention also consists in certain features and details of construction, and in various combinations of the means, features and details referred to above, all of which will be set forth in detail and then particularly pointed out in the claims at the end hereof.

*Description of views of the drawings.*

The invention will be best understood by referring to the accompanying drawings making part of this specification, and in which—

Figure 1 Sheet 1, is a front elevation of an adding, subtracting, and recording machine made in accordance with one form of my invention. Figs. 2 and 3 are detail isometric views respectively on an enlarged scale, of the printing hammer and a part of the carriage. Fig. 4 Sheet 2, is a side elevation of the machine shown in Fig. 1, as seen by looking from the left-hand side of the machine. Fig. 5 is an isometric view on an enlarged scale, of a detail showing a part of the printing hammer-controlling mechanism. Fig. 9, Sheet 4, is a rear elevation of the foregoing machine. Fig. 10 is an isometric view on a slightly enlarged scale, of part of the escapement mechanisms, and showing also the printing-hammer connection which is operated thereby. Fig. 11 is a rear view of details, illustrating the traveling carriage, the axially-moving wheels carried thereby, the propelling shaft for said wheels, and a clutch for reversing the direction of rotation of said shaft. Fig. 13, Sheet 6, is a vertical longitudinal cross-sectional view taken on the plane of line 13—13 of Fig. 1, a little to the right of the center of the machine, looking from the right-hand side of the machine, as shown by the arrows to the line 13—13 of Fig. 1. Figs. 14 and 15 are detail views on an enlarged scale, showing the printing-hammer connection, which is operated by the escapement racks shown in Fig. 10, and illustrating two different positions of the parts. Fig. 16 is a detail view on an enlarged scale, illustrating one of the idle gear-wheels intermediate the printing and adding wheels and the motor-driven or axially moving wheels, and showing a device for aligning said wheels and maintaining them in proper co-incident radial positions. Figs. 17, 18, 19, 20, 21, and 22 are detail views illustrating the carriage escapement enlarged. Figs. 23 and 24, Sheet 7, are side elevations of the machine, looking from the left-hand side thereof, and representing the same with the main side frames nearest the observer removed, said views representing two different positions of some of the parts, and Fig. 23 delineating the apparatus with the oscillating side frame nearest the observer, removed to more clearly show the parts. Fig. 27 Sheet 9, is a vertical longitudinal cross-sectional view taken on the plane of the line 27—27 of Fig. 1 at the right-hand side of the machine, just beyond the printing wheels and gearing therefor, and looking from the left-hand side thereof as shown by the arrows to the line 27—27 of Fig. 1. Fig. 28 is an isometric view on an enlarged scale, of a device shown in cross-section in Fig. 16, for aligning the idle wheels intermediate the printing and adding wheels and motor-driving or axially-moving wheels, to maintain said idle, printing, and adding wheels in proper coincident radial positions, the cross-section of said device and its connections being clearly delineated in Fig. 27. Fig. 29 is an isometric view of a part of the devices for operating the printing hammer, said devices and connecting parts being clearly illustrated by side view in Fig. 27, and said Fig. 29, as well as all of the remaining figures of the drawings, being on an enlarged scale. Fig. 30 is a sectional view of the printing-ribbon spool at the left-hand side of the machine. Fig. 31 Sheet 10, is an isometric view of the motor and its gearing. Fig. 32 is an isometric view (with the motor omitted) of part of the motor gearing shown in Fig. 31, looking at the same from an opposite point of view from Fig. 31, both of the latter views delineating the clutch for reversing the direction of rotation of the driven and driving shaft to add or subtract at pleasure. Fig. 33 is an isometric view of a type-wheel and gear wheel attached thereto, which may be used for printing the numbers registered by the machine. Fig. 34 is a similar view to the latter, but illustrating a type wheel which may be used in the adding mechanism to print the sum of or difference between numbers, and make a dotted line above the same. Fig. 35 is a view illustrating work which may be done on the machine, and showing the dotted line last referred to. Figs. 36 and 37, Sheet 11, are isometric views of the knob and co-operating means for reversing the direction of rotation to add or subtract. Fig. 38 is an isometric view showing the reversing mechanism for adding or subtracting at will in its entirety, and also illustrating in part the devices for bringing the adding wheels to zero after a sum or difference is ascertained. Fig. 39 is an isometric view of devices for co-operating to bring the printing wheels to zero each time the adding or subtracting of a number is completed and the handle is pulled. Fig. 40 is an isometric view of the sliding sleeve carrying the cams for unlocking the type wheel pawls of both the printing and adding wheels as the keys are operated, it forming a part of the traveling carriage. Figs. 41 to 46 inclusive are detail views of devices for suitably rotating the idle wheels shown in many of said figures, to bring the printing wheels to zero when required. Figs. 47 and 48 are isometric views illustrating principally part of the printing mechanism. Fig. 49, Sheet 12, is an isometric view illustrating details of construction. Figs. 50 to 60 inclusive are detail views of the carrying mechanism, Figs. 50, 54, 55, 59, and 60 being isometric views, Fig. 56 a plan of the carrying mechanism, and the remaining figures side views, variously illustrating the parts, and showing some of them in different positions.

I will now proceed to set forth specifically, the details of the machine referred to, by reference to the accompanying drawings, in which the same marks of reference indicate the same parts throughout the several views.

Figures 6, 7, 8:
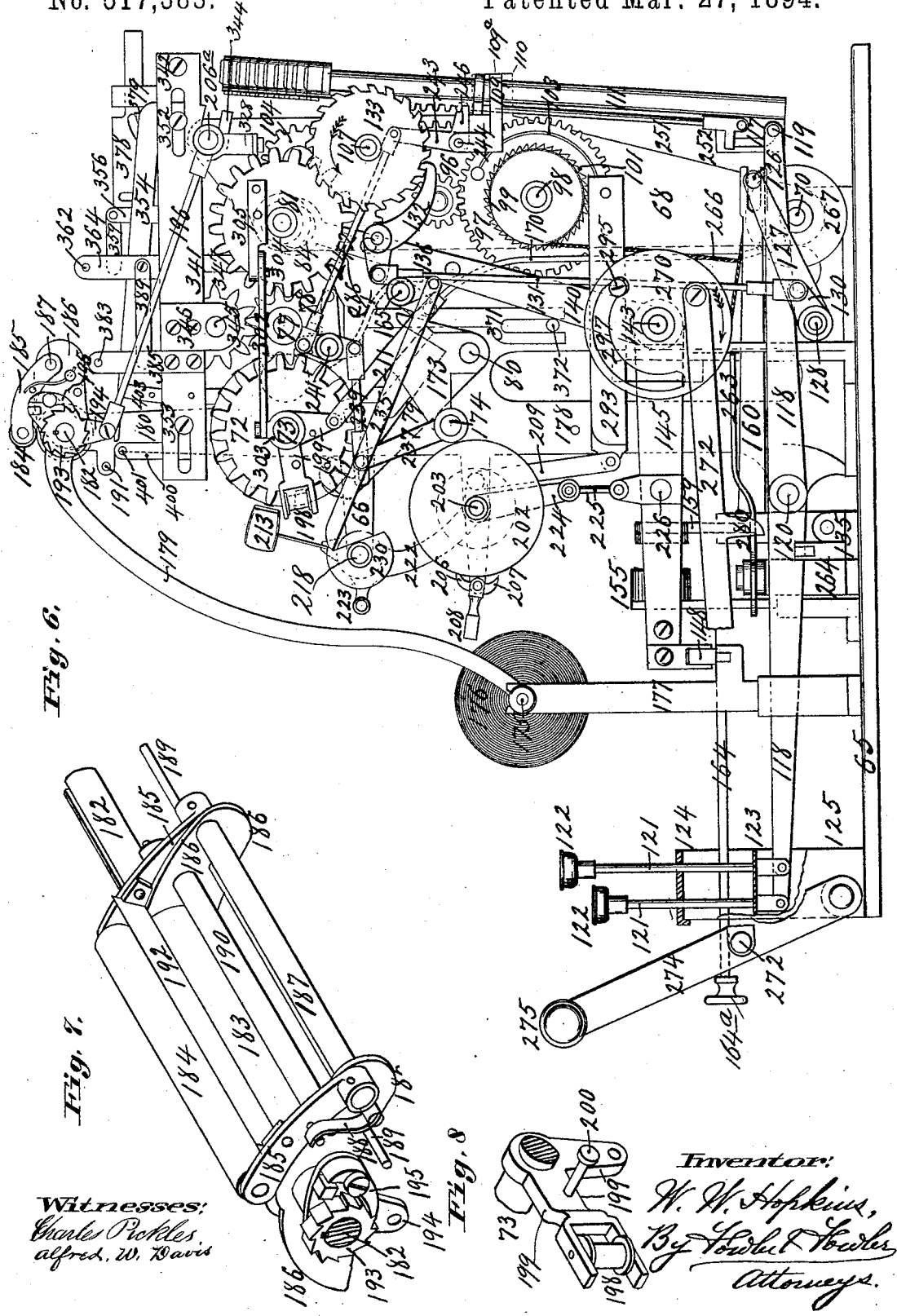
Fig. 6, Sheet 3, is a side elevation looking from the other, or right-hand side of the machine, with the side frames similar to those shown in Fig. 4 removed to better show the construction.
Fig. 7 is an isometric view on an enlarged scale, of the paper-feeding and part of the paper-carriage mechanism.
Fig. 8 is an isometric view on an enlarged scale, of a detail illustrating one of the printing ribbon-carrying rollers.

*Framing of machine.*—Having now reference to Figs. 1, 4, 6, 9, 12, 13, 23, 24, 25, and 27, 65 is the base plate of the machine upon which are mounted two upright stationary frames 66 and 67. Upon the rearwardly extended base of said upright stationary frames 66 and 67 respectively, are mounted frames 68 and 69 swung upon a shaft 70, parallel with and near the base plate 65. These fixed uprights and oscillating side frames support the mechan-

*Adding and printing wheels and gearing therefor.*—The adding or registering wheels are represented at the left-hand of the machine, and are designated by the numeral 71, (Figs. 1, 12, 23, 24, and 34) and the printing wheels on the right-hand side of the machine designated by the numeral 72, (Figs. 1, 6, 12, 13, and 33) a space being preferably left between the adding and printing wheels, and between said wheels and the side frames. All of these wheels are loosely mounted or journaled upon a shaft 73, (Figs. 4, 6, 12, 13, 23, 24, 27, 38, 49, and 53) which is fixed at its ends in the stationary frames 66 and 67. The adding or registering wheels are shown more particularly in Fig. 34, Sheet 10, and the printing wheels in Fig. 33, same sheet. The adding wheels consist preferably of steel disks, the peripheries of which are provided with type bearing the digits 0, 1, 2, 3, 4, 5, 6, 7, 8, and 9, which are, by preference in the present machine repeated in two series thereon in regular succession. The digits may be, however, suitably engraved upon the periphery of the steel disks. Between the digits upon the adding wheels may be a projecting lip or ridge 74, the outer surface of which is flush with the impression surface of the digits upon said wheel, so that when an impression is taken from a series of such wheels placed side by side, a dotted line will be drawn as illustrated in Fig. 35 above the digits in the number registered by the adding wheels. The printing wheels are substantially similar to the adding wheels, except that they are not provided with any lip or projection 74. To both the adding and printing wheels, on the flat face thereof, is preferably secured a spur-wheel 75, which is really a part of said wheels. Upon a shaft 77, (Figs. 4, 6, 12, 13, 23, 24, 27, 38, 49, and 53) in the rear of and parallel with the shaft 73 heretofore described, is arranged a series of idle wheels 78, one for each of the adding and printing wheels, (shown in detail in Figs. 41 to 46 inclusive, Sheet 11.) These idle wheels are also loosely mounted or journaled upon the said shaft 77, which is, in turn, journaled at its ends in the upright stationary frames 66 and 67. Each gear wheel 75 secured to the printing and adding wheels is locked in position by a pawl 79, (Figs. 1, 6, 13, 23, 24, 49, and 53,) all of which pawls for both the adding and printing wheels, 71 and 72 respectively, are mounted upon a fixed shaft 80 (Figs. 4, 6, 13, 23, 24, 27, and 49), the ends of which are sustained by the uprights 66 and 67. These pawls are unlocked at the proper time by devices and in a manner to be hereinafter set forth. They hold the type-wheels 71 and 72 and idle-wheels 78 in corresponding co-incident radial positions. The series of idle-wheels of both the printing and adding wheels have, therefore, so to speak, a set of channels traversing them at right-angles to their plane, the said channels being formed by the spaces between the teeth. As the idle-wheels are held by the type-wheels and pawls in proper position, it will be seen that the so-called channels or passage-ways through the idle-wheels, will be unobstructed.

*Motor and gearing with reversing means.*—Parallel with the type-wheel and idle-wheel shafts 73 and 77, is a shaft 81 journaled at each end near the top of the oscillating frames 68 and 69. This shaft carries a sleeve 82 which is keyed thereto in such a manner as to allow the sleeve to move longitudinally or axially thereon, but not to permit the sleeve to rotate independently of said shaft (see Figs. 11 and 13). This sleeve has rigidly mounted upon it at each end, gear-wheels 83 and 84 respectively. The wheel 83 is adapted to mesh into the idle-wheels of the adding or registering wheels, and the wheel 84 to mesh into the idle-wheels of the printing wheels, each of said wheels meshing into the corresponding idle-wheel of any given numerical order of the adding and printing wheels. The rotating wheels 83 and 84, being carried by the sliding sleeve 82, move axially, that is, in the direction of their axes, as well as rotate. To fully identify the wheels 83 and 84 herein, I have therefore referred to them as axially-moving wheels. The shaft 81 is driven by the motor heretofore referred to, by a system of gear wheels shown in detail, and on an enlarged scale in Figs. 31 and 32, Sheet 10. Upon the shaft 81 are loosely mounted or journaled two spur-wheels 85 and 86, and between the same is a clutch 87 which may be moved longitudinally on said shaft and placed in engagement with a crown-wheel extending from the opposite flat faces of each of the spur-wheels 85 and 86, and forming a part of the clutch mechanism. The clutch proper, while capable of longitudinal movement upon the shaft 81, is not capable of rotary motion independently of said shaft, but rotates with the shaft, whereas the wheels 85 and 86 rotate with the shaft or not, depending upon whether the clutch is placed in engagement with the one or the other.

I will first describe how the spur-wheel 86 is driven from the motor in one direction, and will then set forth how the spur-wheel 85 is rotated in the opposite direction by the motor. The clutch 87 is shown as in engagement with the crown-wheel (Figs. 12, 31, 32, and 38) on the spur-wheel 86. The spur-wheel 85 will then be free to rotate independently of the shaft 81, and spur-wheel 86 will rotate with the shaft 81, being affixed thereto by the clutch. The spur-wheel 86 meshes into a spur-wheel 88 fast upon a sleeve 89 carried by a stud 90 extending from the oscillating side frame 68. The sleeve 89 which is loosely mounted or journaled on the stud 90 carries also a spur-wheel 91 fast to said sleeve. Upon this sleeve 89 is also fixed a spur-pinion 92, which meshes into a large spur wheel 93 arranged upon a collar 94 loosely mounted upon a stud 95. The collar 94 has fast upon it a spur-pinion wheel 96 which meshes into a large spur-wheel 97 below the spur-wheel 93 before referred to. The spur-wheel 97 is loosely journaled upon a shaft 98, one end of which is fixedly mounted in the oscillating side frame 68, and the other end likewise carried in the oscillating side frame 69. Upon the shaft 98 is freely or loosely mounted a drum 99 containing within its interior a coiled motor spring 100 (Fig. 13) similar to the main spring of a clock or watch, the inner end of which coiled motor spring 100 is attached to the shaft 98, and the outer end thereof to the drum 99. To the head or end of this drum adjacent to the spur-wheel 97 is attached a ratchet-wheel 101, which is, together with the drum, suitably impelled by the coiled motor spring 100. Fast to the spur-wheel 97 is a pawl 102 (Fig. 13) which is adapted to take into the teeth of the ratchet-wheel 101, it being kept up to its work by a spring 103 (Figs. 6 and 13). This pawl and ratchet connection is provided to enable the motor to be wound without rotating the train of gearing described. From the previous description it will be seen that the motor rotates the sleeve 89 carrying the spur-wheels 88 and 91 always in the same direction, this direction being indicated by arrows in the drawings of Figs. 31 and 32. The spur-wheel 88 rotates the spur-wheel 86, clutch 87 and shaft 81 in the direction also indicated by arrows. The spur-wheel 91 carried by the same sleeve 89 to which the spur-wheel 88 is affixed, does not mesh directly into the spur-wheel 85, but first meshes into a spur-wheel 104 loosely mounted upon a stud 105 extending from the oscillating or movable side frame 68, which also supports the shaft 81 and the stud 90, sustaining the wheels 88 and 91 as before described. The wheel 104 meshes into the spur-wheel 85. The effect of interposing this wheel 104 is to drive the wheel 85 in the opposite direction to the wheel 86, the direction of rotation of the said wheel being indicated by arrows in Figs. 31 and 32. It will be noted that while the wheel 86 is coupled to the shaft 81 by the clutch and is being driven by the motor, the wheel 85 is also being driven by the motor through the instrumentality of the spur-wheels 91 and 104, but in an opposite direction to the wheel 86 and shaft 81 and independently thereof, because said wheel 85 is now loosely journaled upon said shaft 81, it not being at present coupled to said shaft. It will be evident that by throwing the clutch into engagement with the wheel 85, that the shaft 81 will be rotated in the opposite direction, and that the wheel 86 will be rotated as before, but will revolve independently of the shaft 81, it now being uncoupled from said shaft. As the shaft 81, which bears the axially-moving wheels 83 and 84 that drive the printing and adding wheels, may be rotated in either direction, it will be evident that said printing and adding wheels may be made to rotate in one or the other direction, and thus may be caused to add or subtract as the case may be. It will be noticed that the gearing from the motor to the adding and printing wheels is positive gearing throughout, and that if the motor revolves through a given distance, the adding and printing wheels will be positively revolved through a proportional distance. It will also be noticed that all the principal movements of the machine are rotary, and effected by ordinary gear-wheels, which are thoroughly reliable, and easily and cheaply constructed. The idle-wheels 78 may really be said to be a part of the adding or registering and printing wheels in that their only function is to transmit motion to said wheels.

I include within my invention and claims a machine in which the idle-wheels are dispensed with, and the axially-moving motor-impelled wheels drive directly the adding and printing wheels. The adding and printing wheels would then have their type disks (Figs. 33 and 34 Sheet 10) dispensed with, and the printing characters placed upon the ends of the teeth of the spur-wheels 75; or else the type disks would have to be notched or cut, to provide channels through the adding and printing wheels for the axially-moving wheels to travel through uninterruptedly.

Many features of my invention are independent of the motor and its gearing, and I do not wish to limit my invention necessarily to a motor being used excepting, of course, when a motor is specified in my claims herein, as the registering and printing may be otherwise actuated, say by the keys more or less directly. Neither do I wish to limit my invention to a reversible motor when a motor is used therein, as when it is required to have the machine add only, the reversing means would naturally be dispensed with.

Figure 12:
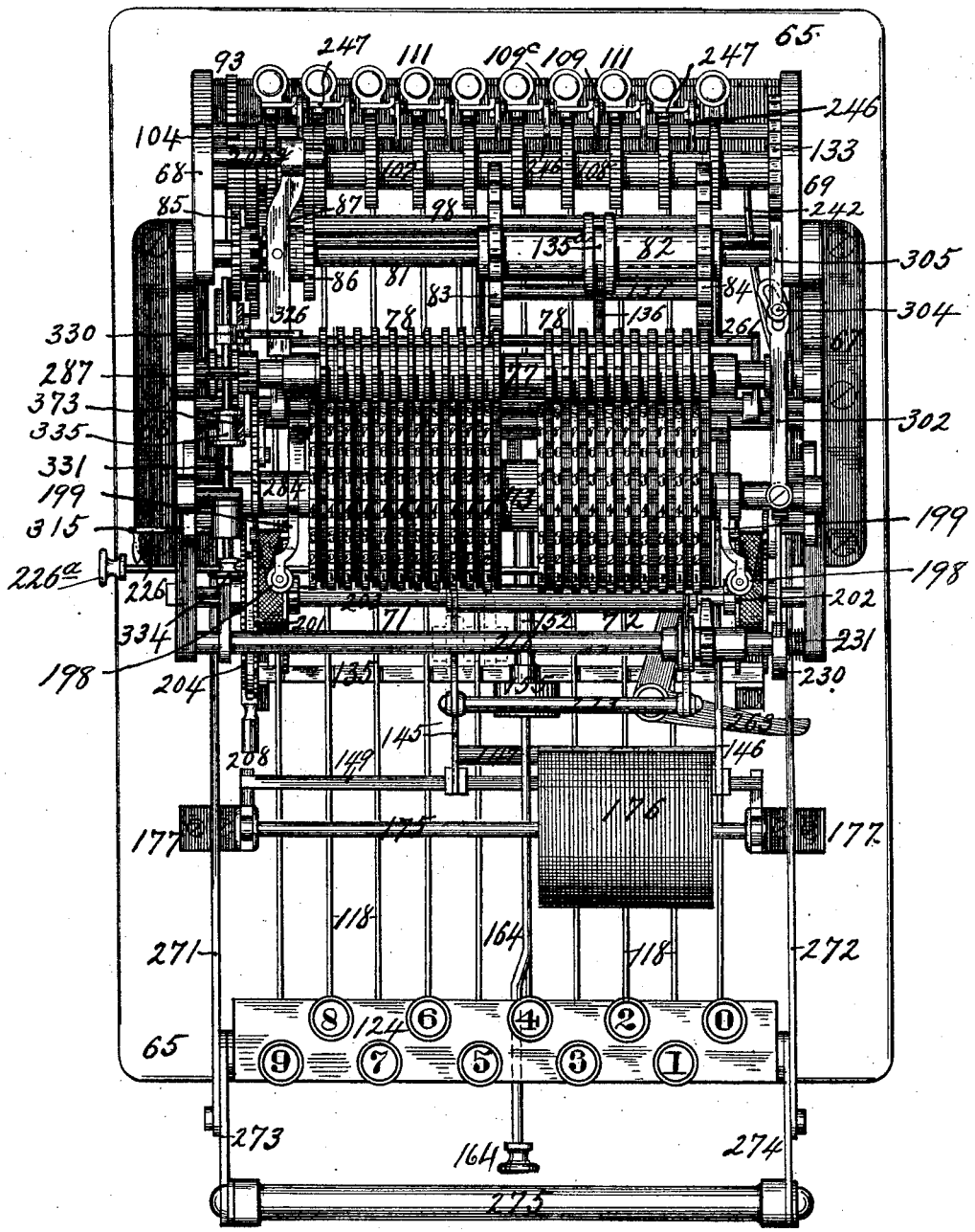
Fig. 12, Sheet 5, is a plan or top view of said machine with the carrying mechanism removed.

*Escapement for motor and key connections therefor.*—The spur-wheel 88 meshes into a spur-wheel 106 to the rear of the same, which spur-wheel 106 is fast upon a shaft 107 extending across the back of the machine and having bearings at each end in the oscillating or movable side frames 68 and 69, the said shaft being carried by the same oscillating frame which supports the shafts and studs shown in Figs. 31 and 32. Upon this shaft 107 at regular intervals are, preferably, a series of wheels 108, by preference ten in number corresponding to the digits or finger keys of the machine. From the construction described, it will be noted that the motor drives the shaft 107 at the same time that it drives the shaft 81, and that it drives said shaft 107 always in the same direction, as indicated by the arrows in Figs. 31 and 32. The shaft 107 is the escapement shaft, and the wheels 108 I will hereinafter refer to as the escapement wheels. At the rear of the machine, and pivoted to a bar 109 supported at each end by off-sets 110 extending rearwardly from each of the oscillating side frames, are a series of bars or rods 111, corresponding in number to the keys, there being one of said bars for each of the escapement wheels 108. The upright rods 111 may be pivotally supported upon the bar 109 by a single rod 109ª (Figs. 13 and 27) which passes through a slot 109ᵇ (Fig. 47) in the edge of said plate 109, the open or outer part of said slot being closed by a plate 109ᶜ (Figs. 6, 12, 13, and 27) to hold the rod 109ª and the upright rods 111 in place. One of these bars is shown in detail by isometric view in Fig. 10, Sheet 4, see also Figs. 4, 6, 9, 13, 23, 24, and 27. They are preferably made round, but can be of other shape, and each has a hole 111ª (Fig. 10) bored therethrough to receive the rod 109ª before referred to. Upon each of said bars near the upper end thereof, is a rack 112, the rear edge of which takes in a groove 113 channeled in said bar from about the middle thereof to the upper end. The racks 112 are held to said bars by straps 114 and 115 at each end of the racks, and passing around the bars. At the upper end of each of the bars is a collar 116 fixed thereto, against which the racks may come to determine the limit of excursion of the racks. The bars 111 are made of different lengths (see Figs. 6, 9, and 13). The rack of the bar corresponding to the nine key being capable of nine times the extent of movement of the rack carried by the bar corresponding to the one key, and the rack carried by the bar corresponding to the eight key having eight times the movement of the rack carried by the bar corresponding to the one key, and so on. These bars 111 may be provided with other appliances which pertain to the printing mechanism, and will not now be described. The racks carried by the bars 111 are adapted to be thrown in and out of engagement with their respective escapement wheels 108, and are provided with suitable teeth to mesh with the teeth of the wheels 108. The bars at the lower end may be provided with a slotted plate 117 suitably attached thereto. The slot in the plates 117 are all similar and consist of an incline branch which runs into a vertical part. 118 are the key bars, each carrying at its inner end, a pin 119 which normally takes into the incline part of the slot in said plates, (Figs. 4, 6, 13, 23, 24, and 27.) The key bars are swung near their center upon a shaft 120 supported at each end near the lower part of the machine in forward extensions from the stationary side frames 66 and 67. The keys at their outer ends are each provided with vertical stems 121 having knobs 122, each bearing upon the upper face thereof its respective digit or number (Fig. 12). The keys and their knobs may terminate in two rows if desired, or in any other way. The stems of the keys pass through two plates 123 and 124 which are carried by upright brackets 125 from the base-plate, which plates serve to guide the stems of the keys (Figs. 4, 6, and 12). Over the rear of all the keys passes a bar or rod 126 (see more particularly Figs. 25, 27, and 49). This bar is attached to two arms 127 each fixed to a shaft 128, which shaft is sustained by the fixed side frames of the machine, the said bar or rod 126 and arms 127 forming a bail. This bail is provided with springs 129 (Figs. 9 and 27) which normally hold the bar 126 down against the key bars. The shaft 128 has also fixed to it at one end a crank 130 (Figs. 6, 27, and 49). The said crank has pivoted to it a rod 131, which in turn is articulated to a locking-pawl 132 pivoted to the side frame 69 of the oscillating frame, (Figs. 6 and 27.) The nose of the locking-pawl 132 takes into a ratchet-wheel 133 upon the escapement shaft 107, and arranged adjacent to the upright 69 of the oscillating frame. When any key is depressed, the pin 119 on the inner end of that key, rises and travels up the incline slot in the plate 117 carried by the bars 111 of the escapement. The motion of any pin 119 up the incline of its slot, throws the lower end of the corresponding rod 111 outward from and the upper part of said bar inward toward the machine, bringing the rack 112 carried by said bar into engagement with its corresponding escapement wheel 108. This takes place at the very first movement of the keys. During the further depression of the keys, the bar 126 which passes over all the keys, is raised and swings upward the arms 127 (Fig. 27), which rotates the shaft 128, operates the crank 130 so as to push upward the rod 131 and lift the nose of the locking-pawl 132 from the locking-wheel 133. The parts are so proportioned that the first motion of the keys does not unlock the wheel 133, but such unlocking takes place directly after any one of the racks 112 is thrown into engagement with its respective escapement-wheel 108. It is to be borne in mind that the escapement shaft 107 constantly has a tendency imparted to it by the motor to revolve, and that the locking wheel 133 fast upon said shaft, also has such tendency imparted to it, but is normally restrained from rotation by the locking-pawl, this being the only thing which normally prevents the motor from rotating the wheels until the motor is run down. As soon as the locking-pawl 132 is withdrawn from the locking wheel 133, the motor will rotate the escapement-shaft and other shafts and gear wheels set forth above. When one of the escapement-racks is thrown in engagement with its escapement-wheel, the motor rotates the escapement, and other shafts and wheels referred to, through a distance corresponding to the limit of excursion of said rack, and depending upon the key depressed. When the limit of excursion of the rack is reached, the rack comes solidly against the collar 116 (Fig. 27) and prevents further rotation of the shafts and wheels referred to, holding said wheels and shafts as effectually from rotation as the locking pawl 132 does in the first instance. The springs 129 acting upon the operated key-bar through the bar 126 bring the said key-bar to its normal position, the pin 119 passing down the vertical part of the slot in the plate 117, but does not throw the escapement-racks out of engagement with the escapement-wheel until after the pawl 132 has engaged the locking-wheel 133, after which the pin 119 travels down the incline part of the slot in the plate 117 and throws the escapement-rack out of engagement with the escapement-wheel. The return movement of the parts is indicated by arrows in Fig. 27. The bar 126 may be covered with rubber, leather or any suitable material to deaden the noise upon its return movement, when it comes down and strikes the other key-bars. Each key-bar may be provided with an individual spring of slight strength, arranged in a bar 135, (Figs. 4, 6, 12, 13, 25 and 27) to hold in their normal position the key-bars, when any key-bar is depressed and the tension of the springs 129, which are of considerable power, is removed from the keys by the bar 126 being raised. It will be noted that the depression of all the keys is of the same extent and resistance at all times, the nine key having no greater depression and no greater resistance than the one key, for instance. Nor does the resistance of the keys in my machine, increase when carrying from one or more orders to the next higher order or orders is to be effected. In many adding machines the keys themselves are made to do the work of actuating the adding mechanism, and hence keys of a high numerical value must have more depression or greater resistance than keys of lower denomination. The resistance of the keys in adding machines often varies also when carrying is performed. This is troublesome to operators in that a variable touch or amount of power must be supplied to the keys, and the different keys depressed to different extents, all of which prerequisites the operator cannot have in mind, and not appreciating the same, will often not depress a key sufficiently, or will not apply enough force to the keys, both of which will cause the machine not to be properly operated, and hence the machine will not correctly register the required amount. In my machine, all this is obviated, as the motor does the work and the keys merely control the motor escapement. I do not wish to limit myself to a separate or independent escapement for each key.

I include within my invention and claims, except where otherwise specified, one or more sets of escapement members, or one or more escapement-racks and one or more escapement-wheels suitably operated and controlled by the keys, or a single escapement-wheel and one escapement-rack suitably checked in proper position by stops operated by the keys.

The key resistance in my machine is very light, for although the motor may have considerable power, and an appreciable amount of force be required to unlock it, the leverage for unlocking the motor is so proportioned as to require but little force to depress the keys and unlock the motor. After any one of the escapement-racks has been carried upward to the limit of its excursion by its escapement, and its corresponding key returns to its normal position, throwing the escapement-rack out of engagement with the escapement-wheel, the rack drops by gravity to its original or starting position. The operation of throwing the racks in engagement with the escapement-wheels, unlocking the motor, and the racks traveling to the limit of their excursion, then dropping to their starting point ready for another actuation of the key-bars, takes place so quickly that the keys may be operated as rapidly as desired. Even though the keys should be operated too rapidly and not sufficient time be given for the full number to register in the machine, the number that is registered by the machine will be printed and thus the machine will record and indicate the number that has been registered, so that the desired correction in the result may be made.

*The carriage.*—I will now describe the carriage by which the axially-moving wheels 83 and 84 and their sleeve 82 are moved step by step from numerical order to numerical order as the keys are operated. The sleeve 82 has a circumferential groove 135$^a$ cut in it, or between two collars thereon (Figs. 9, 11, and 12). Into the groove 135$^a$ takes a forked bar 136, the fork at the upper part of said bar being semicircular and engaging the lower semicircular part of the groove in the sleeve 82. The bar 136 passes down and is carried by two shafts or rods 137 and 138. This bar 136 has an off-set 139 extending therefrom, which engages the groove of another sleeve to be hereinafter described (Figs. 6, 13, and 49). The rods 137 and 138 are carried by side-bars 140 and 141, which extend downwardly and are carried by a sleeve 142 (Figs. 13, 25, 26, and 49), about which they are loosely journaled. The sleeve 142 is adapted to slide upon a shaft 143 journaled at each end in the upright stationary side frames of the machine. The side-bars 140 and 141 may revolve slightly about the sleeve 142, and the shaft 143 may rotate independently of said sleeve 142. Between the side-bars 140 and 141 near their lower ends, is a brace 144 which ties the bars 140 and 141 together. To the ends of the sleeve 142 are attached horizontal side-bars 145 and 146 outside of the upright bars 140 and 141, (Figs. 4, 6, 12, 13, 23, 24, 25, 26, 27, and 49.) The outer and forward ends of the horizontal side-bars 145 and 146 are connected together by a cross-bar 147. The upright side-bars 140 and 141 and the horizontal side-bars 145 and 146 together with their cross tie-rods and sleeve 142 constitute a carriage which may be slid widthwise of the machine, and which carries therewith the sleeve 82 bearing the axially-moving wheels 83 and 84. The bars 145 and 146 at their outer ends are each provided with a suitable anti-friction roller 148 in brackets depending therefrom, which anti-friction rollers are adapted to run upon a track 149 supported at each end in any suitable manner from the base-plate 65 of the machine.

Figure 25:
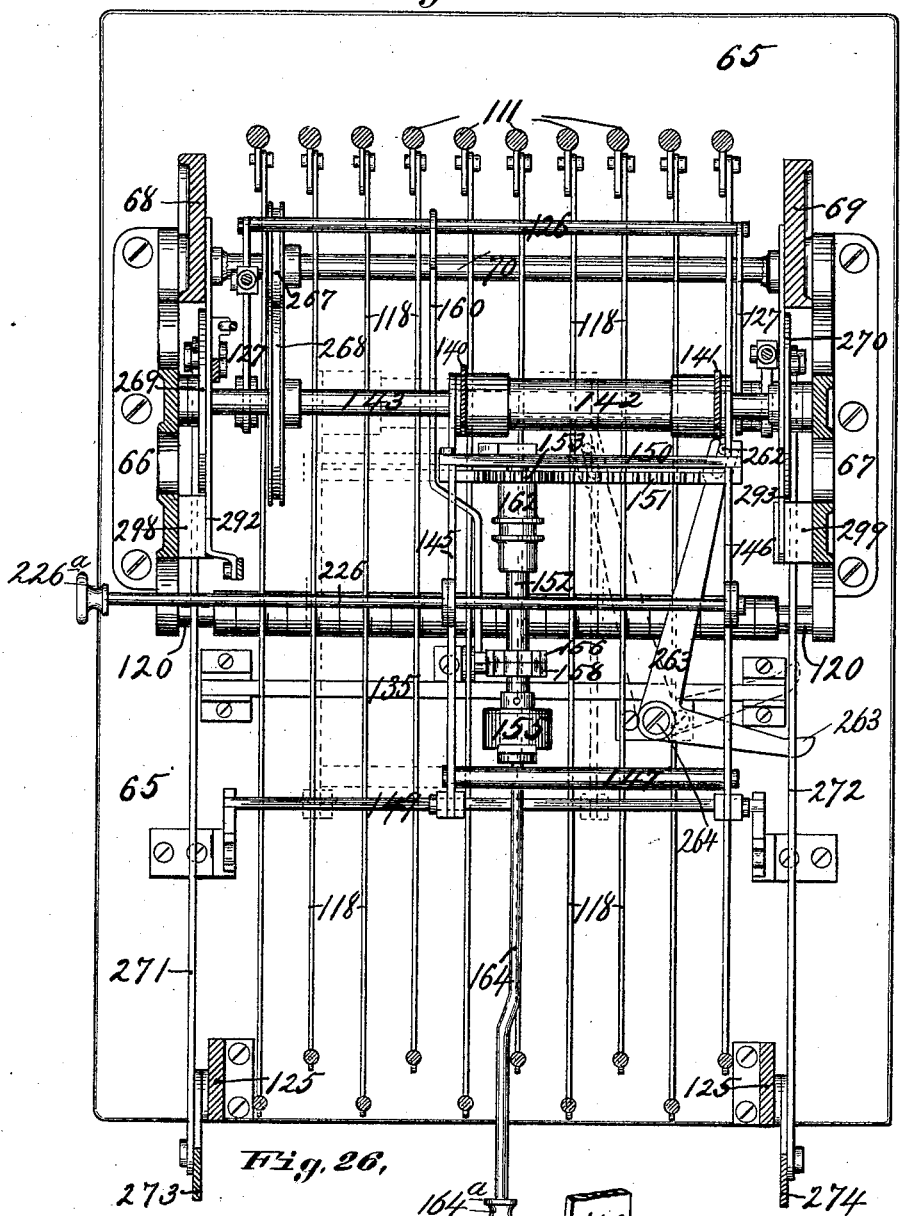
Fig. 25, Sheet 8, is a sectional plan or top view taken considerably below the center of the machine, and entirely beneath the adding and printing mechanism and paper roll, to clearly illustrate the carriage mechanism, the winding mechanism for the motor, and the key bars.

*Carriage propelling and reversing mechanism.*—Connecting one of the side-bars 145 with the other side-bar 146 are two racks 150 and 151, one above said side-bars and the other below the same, and both arranged parallel and adjacent to the shaft 143. The said racks are not arranged in the same plane, but have a slight space between them (Figs. 13, 25, 26, and 27). Journaled in uprights extending from the base-plate of the machine is a shaft 152, which runs parallel with the two side-bars 145 and 146, and is arranged about the middle of the machine. At the rear end the shaft 152 carries a spur-wheel 153, the upper part of which is adapted to engage the rack 150, and the lower part of which is adapted to engage the rack 151, when properly placed in engagement with said latter rack and moved out of engagement with rack 150 (Fig. 13). The shaft 152 is preferably impelled by means of a coiled spring 154 arranged within a drum 155 (Figs. 17 and 18). The shaft 152 always revolves in the same direction. Upon the shaft 152 is arranged a ratchet-wheel 156 (Figs. 13, 20, 21, and 22) which has a slight definite motion about the shaft 152, a spring 157 being provided to take up the play which the wheel has about the shaft 152. Adjacent to the wheel 156 is a second ratchet-wheel 158 rigidly keyed to the shaft 152 (Fig. 19). Normally the shaft 152 is held from rotation by a pawl 159 carried at the elbow of the angular lever 160 pivoted to a bracket extending from the base-plate of the machine, and arranged at the lower end of the short arm of said angular lever (Figs. 4, 6, 13, 23, 24, and 25). The rear end of the long arm of the angular lever 160 is forked and embraces the bar 126, which bar passes over the rear end of all the keys and is arranged and operated as previously described. Upon the actuation of the keys the bar 126 will be raised, the angular lever 160 vibrated, and the pawl 159 carried by the elbow of the angular lever 160 will be moved thereby from the ratchet-wheel 156 with which it is normally in engagement, into the teeth of the fixedly mounted ratchet wheel 158. The ratchet wheel 156, being now freed from the pawl 159, will be slightly rotated by the spring 157, and the play which said wheel has independently of the shaft 152 is taken up by said spring, as the said wheel 156 is loosely mounted on the shaft 152 and is capable of a certain amount of rotation independently of said shaft 152, and said wheel 156 is now from under the restraining influence of the pawl 159 and placed under the influence of the spring 157. During the depression of a key the carriage does not move. As soon, however, as the key is allowed to rise and the bar 126 to fall in consequence thereof, the pawl 159 will be returned by the angular lever 160 to the loosely spring-mounted ratchet-wheel 156. The carriage will now feed toward the left, the spring of the drum 154 overcoming the spring 157, which is a light one, and taking up the play the shaft 152 has independently of the said ratchet-wheel 156. The spring-impelled shaft 152 compresses the spring 157 to its extreme limit, and when this is reached the carriage is held from further movement until another key is depressed and the same operation gone through with. The pawl 159 may be provided with a spring 161 if necessary, in order to permit the carriage to be moved to its starting point by allowing the pawl to give and ride over the incline of the ratchet teeth when the carriage is moved in an opposite direction from that in which it is impelled by the mechanism described. The spur-wheel 153 is not directly carried by the shaft 152, but is upon a sleeve 162 carried thereby, which is adapted to slide upon said shaft but rotates with the shaft (Figs. 13 and 25). This sleeve has a circumferential groove in it or between two collars thereon, and into the groove takes a piece 163 (Fig. 13) carried by a rod 164, which extends to the front of the machine beneath the keys, and terminates in a knob (Figs. 4, 6, 12, 13, and 25). The part 163 permits the sleeve 162 and shaft 152 to rotate freely, but when the rod 164 is pushed in or out, the sleeve, carrying said wheel 153, moves it into engagement with one or the other of the racks 150 or 151. It will be noted that the upper part of the wheel 153 revolves from left to right for instance, while the lower part rotates from right to left, or in opposite direction so to speak. If, therefore, the wheel 153 be put into engagement with the upper rack 150, the carriage will be driven in one direction as the keys are depressed and allowed to rise, but the carriage will be moved in an opposite direction when the said wheel 153 is put into engagement with the lower rack 151 and the keys operated. Thus it will be seen that by operating the rod 164 in one or the other direction, the carriage may be made to travel in either direction. If, therefore, it be necessary or desirable to begin at the front or highest order of a number, it can be done, but the carriage in the machine herein described will have to be moved by hand to the starting point in beginning at the front of a number. Addition may be commenced in the units column if desired, and when this is done, I provide mechanism whereby the carriage will be suitably brought to the units column or starting point without going through a special and additional operation for the mere purpose of positioning the carriage. Many features of my invention are not limited to a carriage being used, but are applicable to adding machines generally wherein a carriage need not be used.

*Devices unlocking adding and printing wheels when keys are operated.*—I have previously explained that the spur-wheels attached to the printing and adding wheels are suitably locked by pawls 79, and will now describe the means by which the said wheels are unlocked in the numerical order in which the machine is working for both the printing and adding wheels. Upon a shaft 165 journaled at each end in a rearwardly extension from the upright stationary side-frames of the machine, is arranged a sleeve 166, which is adapted to slide along said shaft, but is held from rotation independently of the said shaft, (Figs. 6, 13, 23, 24, 40, and 49) preferably by a longitudinal groove in said shaft 165 (Figs. 4 and 49) and a key or spline. The said sleeve 166 has a circumferential groove cut therein, or formed thereon by collars at or near its center. From the part 136 of the carriage heretofore described extends an offset 139 heretofore referred to, which takes into the groove in said sleeve 166 (Figs. 13 and 49) in such a manner as to carry the sleeve 166 along with the carriage, but to permit the said sleeve to turn with the shaft 165 independently of the said part 139 and carriage. The sleeve 166 has at each end a cam 167 and 168 (Figs. 40 and 49) respectively, the former of which is adapted to unlock the pawls of the adding wheels, and the latter of which is adapted to unlock the pawls of the printing wheels, the pawls unlocked depending upon in which order the carriage is, and the machine is working. Upon the shaft 165 at the left-hand side of the machine, is a crank 169, to which is articulated a rod 170 passing downwardly, and in turn articulated to one of the arms 127, which carry the bar 126, and are fixedly united to the shaft 128 (Fig. 49). When any key is put down, the bar 126 and arms 127 will be raised, lifting the rod 170 and turning the crank 169 so as to slightly rotate the shaft 165 and sleeve 166, thereby bringing the cams 167 and 168 in contact with the short arm of the pawls 79 respectively of both the printing and adding wheels, and thereby unlocking said wheels. This unlocking takes place during the first movement of the key, and before the motor has been unlocked, as heretofore explained, the said action taking place during the time the escapement racks are thrown into engagement with the escapement wheels by the operation of the keys. The sleeve 166 travels along with the carriage from order to order in either direction at will when the keys are operated, unlocking the pawls of the units, tens, hundreds, &c., as the case may be, of both the printing and adding wheels. The short arm of each of the pawls 79 at the opposite side from the cams 167 and 168 (Figs. 13 and 53), is provided with an individual spring 171, which tends to keep them in their normal position and returns them to such position when actuated by the said cams. It will be seen from the construction described that the pawls of any given order both of the adding and printing wheels will be held unlocked as long as any key is kept depressed. As soon, however, as the key is allowed to rise, the cams turn in the opposite direction and permit the springs 171 to return the pawls unlocked to their normal position, locking the unlocked adding wheel and putting the unlocked pawl of the printing wheel in the path of the pins on said wheel to be hereinafter described. This locking of the unlocked adding wheel occurs after the digit has been registered by the machine, and hence locks such number into the registering mechanism. After the cams have rotated away from the short arm of the locking pawl 79 upon the first part of the rise of the keys, the carriage moves to the next order and the cams are in position to unlock the pawls of the next order when a key is depressed. The individual springs 171 for the locking pawls 79 are carried by a plate 172 (Figs. 13 and 53) suitably slotted, for the short arms of the pawls to enter the plate and prevent the pawls from being twisted or thrown out of their normal plane. The springs 171 are held in place between the pawls and bored out places in said plate, which receives the other ends of said springs (Fig. 53). The plate 172 is sustained by triangular pieces 173 at each end, which pieces are supported by the shaft 80 and a shaft 174 supported by the fixed side-frames of the machine. My invention is not limited to these type-wheel locking devices being used, as it is evident they may be dispensed with if not wanted: or may have frictional or non-positive locking devices substituted therefor, which may not require special means for unlocking them.

*Arrangement of paper, paper-carriage and paper-feeding mechanism.*—Upon a shaft 175, preferably in front of the knobs of the finger-keys and between the same and the type-wheels, is arranged a roll of paper 176 of a width equal to the total width of the series of adding wheels. The shaft 175 extends nearly all the way across the front of the machine, and is suitably supported at each end by brackets 177 extending from the base-plate 65 of the machine. The roll of paper stands normally at the right-hand side of the machine (Fig. 12), and the paper passes from the same under a rod 178 supported in the fixed side-frames of the machine. The paper then passes over the printing wheels to a paper-feeding apparatus at the top of the machine (Figs. 6 and 13). The paper roll is held between two curved arms 179 which pass upward from the shaft 175 to the paper-feeding mechanism (Figs. 4, 6 and 9). The paper roll may be slid axially on the shaft 175, and when pushed over to the other side of the machine carries with it the curved arms 179 and the paper-feeding devices. 180 and 181 are uprights extending from the fixed side-frames 66 and 67 respectively of the machine and carrying at their upper ends a shaft 182. Upon this shaft is arranged a roller 183 which may be slid along said shaft, but which rotates with the shaft. Upon this roller rests a second roller 184 carried by arms 185 which are pivoted to side pieces 186 (Fig. 7), by a shaft 187. Said roller 184 is held to the roller 183 by springs 188 which hold the arms 185 down in position. 189 is a rod which is supported at each end by a rearwardly extending off-set from the uprights 180 and 181, and serves to keep the paper-feeding apparatus from turning bodily around the shaft 182, it passing through the side frames 186 which sustain the paper-feeding rollers. The paper-feeding apparatus slides upon this rod 189 the same as it does upon the shaft 182. 190 is a tie rod for holding together the side pieces 186 of the paper carriage. 191 is a guide rod carried by forward off-sets extending from the uprights 180 and 181, the object of such rod being to guide the paper to the feeding rollers (Fig. 13) and hold it clear of the carrying mechanism to be hereinafter described. The paper passes between the two rollers 183 and 184, and may be cut off when desired by bringing it against a knife 192 carried by the spring-pressed arms 185 of the paper-carriage. If the shaft 182 be rotated, it will turn the roller 183, and will cause the paper held between that roller and the roller 184 to feed, drawing upon the paper roll 176 for its supply (Fig. 13). To accomplish this purpose a ratchet-wheel 193 is keyed to the shaft 182, and upon said shaft is loosely swung adjacent to said ratchet-wheel 193, a bell-crank lever 194 (Figs. 1, 6, 7, 9, and 27), one arm of which is provided with a pawl 195 pivoted thereto and normally taking into the teeth of the ratchet-wheel 193. The other arm of the bell-crank lever is articulated to a rod 196, which may be suitably actuated and preferably is actuated in the manner hereinafter to be described. When the rod 196 is actuated by pulling on it, or the bell-crank lever 194 is operated in the same direction, the pawl 195 catches in the next tooth of the ratchet-wheel 193, and when the bell-crank lever 194 and rod 196 are moved in an opposite direction, the shaft 182 is rotated so as to turn the roller 183 and feed the paper one space.

*Arrangement of inking ribbon and actuating devices therefor.*—Across the printing and adding wheels and in front of the paper 176, passes an ink ribbon 197 (Figs. 1 and 13). This ribbon travels over rollers 198 at each side of the machine, the said rollers being journaled in bell-crank levers 199 loosely journaled upon the shaft 73 carrying the type-wheels (Figs. 8, 23, 24, 27, and 49). Each of the bell-crank levers carrying said rollers is provided with a pin 200 over which the ribbon is led after passing over the rollers 198, the said ribbon traveling over said pins at right-angles to the plane at which it is received from the rollers 198 down to spools 201 and 202, arranged at each side of the machine upon a shaft 203 sustained by off-sets extending forwardly from the fixed side-frames of the machine. The outside disk of the spool 201 has cut upon it a series of ratchet teeth, and at a short distance therefrom but parallel thereto, is a disk 204 (Fig. 30) having ratchet teeth cut upon it but in opposite direction to the teeth of the ratchet previously referred to (compare Figs. 4, 23, and 24 with Fig. 13). About the shaft 203 is loosely swung a lever 205 which carries at its outer end two pawls 206 and 207 arranged upon the same pivot and controlled by the same finger piece 208. The pawl 206 is adapted to take into the ratchet-wheel 204, and the pawl 207 is adapted to take into the ratchet-wheel cut on the outside disk of the spool 201, according as the finger piece 208 is manipulated to throw one or the other pawl into engagement with the one ratchet wheel or the other. The lever 205 may be actuated back and forth by a link 209 in any suitable way, but is preferably actuated by the means to be hereinafter described. The spool 201 is loosely mounted upon the shaft 203, but the spool 202 and the ratchet-wheel 204 are fixedly mounted upon said shaft (Fig. 30). When the lever 205 is actuated back and forth it will drive the ratchet wheel 204 in one direction and the spool 201 with ratchet teeth cut thereon in the opposite direction. When the pawl 207 is in engagement with the ratchet teeth upon the spool 201 (Fig. 13) and the lever 205 is operated, the ribbon will be drawn from the spool 202 upon the spool 201, which is now directly operated by the pawl 207. After the ribbon has accumulated upon the spool 201 and has been entirely withdrawn from the spool 202, the finger piece 208 is operated so as to throw the pawl 206 in engagement with the ratchet-wheel 204 (Fig. 23), which will be rotated in the opposite direction, and will revolve shaft 203 and thereby turn spool 202 in the direction referred to, so as to draw the ribbon from the spool 201 to the spool 202. The mechanism described, as will no doubt be obvious, is for feeding the ribbon in order to offer a fresh part to the type for printing, and for reversing the direction of travel of the ribbon so as to cause the same to pass back and forth from one spool to the other automatically until worn out, thereby avoiding the necessity of turning the ribbon back by hand in order to use it over again. It is not necessary that an inking ribbon be used, as some other expedient can be employed to furnish ink for printing, but I prefer to use the arrangement and means set forth. If desired, the arrangement of the paper and inking ribbon may be changed to print in the usual way, without departing from my invention. It is to be noted that the type is back of the paper and the ribbon in front of the paper, and that the characters printed are recorded on that side of the paper next to the ribbon. It is of considerable advantage to have the digits registered by the machine displayed in full view as soon as recorded, and for this purpose I preferably cause the ribbon to recede after printing so as to display the digit printed. To accomplish this the spools 198 carried by the bell-crank levers 199, are loosely swung upon the shaft 73 and actuated by links 210 and 211 articulated respectively to each bell-crank lever 199 (Figs. 6, 23, 24, 27, and 49). The link 211 is articulated to a crank 212 fast upon shaft 165, and the link 210 is articulated to the crank 169 previously referred to, which communicates motion to the shaft 165 by means of the rod 170 when the keys are actuated, as previously described. When any key is put down the ink or printing ribbon is raised to permit an impression to be taken of the digit registered. When the number has been printed and the key is allowed to rise, the ribbon is lowered so as to display the digit printed.

*Impression-taking and printing devices.*—213 is the printing-hammer, or platen which takes a printing impression from a type-wheel each time a key is struck. This hammer is preferably fed along automatically from order to order by the carriage heretofore described, and prints the number registered by the machine upon the uprise of the keys, and, by preference, just after the number has been duly registered by the machine. The said hammer consists of a small block of any suitable material, but preferably of metal, having a slightly curved piece 214 thereon to form the face thereof, said piece being of any suitable material (Figs. 2 and 3). The hammer 213 is carried by a thin piece of spring metal 215, which is set into a projecting part of a collar 216 carried by a sleeve 217, which is adapted to slide longitudinally upon a shaft 218, but is held from rotation with reference to said shaft. The shaft 218 is supported by off-sets extending forwardly from the upright stationary side-frames 66 and 67 of the machine. The sleeve 217 has a circumferential groove 219 thereon formed by collars carried by said sleeve, or cut therein. Traveling upon the shaft 203 previously described is a sleeve 220 which is independent of the said shaft, both as to longitudinal and rotary motion. From said sleeve extend upwardly arms 221 and 222 which are joined together by a rod 223. The shape of these uprights is shown in Figs. 3, 4, 6, and 13. The upright 221 is extended downwardly to form a part 224 which is attached to a rod (Figs. 1, 4, 6, 13, 23 and 24) 225 that returns upon itself, and is connected to an upward extension from the horizontal side-bars 145 and 146 of the carriage. The object of having the rod 225 return upon itself is to prevent the movement of the carriage from interfering with the paper, which in view of this arrangement passes clear of the traveling carriage, from the paper roll to the paper-feeding rollers at the top of the machine. The curved part of the uprights 221 and 222 are adapted to take into the groove 219 of the sleeve 217 that carries the printing hammer. The sleeve 220, rod 223, and uprights 221 and 222 being connected to the carriage of the machine by the part 224, constitute a part of the carriage and feed the hammer from numerical order to numerical order as the keys are operated. 226 is a rod which is fastened to the carriage and projects horizontally to the left-hand side of the machine, its end being provided with a suitable knob 226ª. The object of this rod 226 is to position the carriage by hand when desired, and may be used to set the carriage when it is desired to begin at the front or left-hand end of a number. Upon the shaft 218 is a cutaway disk 230 at the right-hand side of the machine and fixed to the said shaft. (Figs. 1, 6, 12, 27, and 29.) Preferably adjacent to said cutaway disk, and coiled about shaft 218, is a helical spring 231, one end of which is attached to the frame of the machine, and the other end secured to the shaft 218, or the cutaway disk 230, the purpose of which spring is to throw the printing-hammer 213 toward the type of the wheels to take an impression. Preferably at the left-hand side of such machine and rigidly fixed to the shaft 218 is a short arm 232, the free end of which is adapted to come against the end of an adjustable thumb-screw 233 carried by a bracket 234 sustained by the stationary side frame 66 of the machine (Figs. 1, 4, 5, 6, 12, 27, and 29). The purpose of the arm 232 and thumb-screw 233 is to check the motion of the shaft 218, when the spring 231 actuates said shaft to throw the hammer 213 against the ink-ribbon to take an impression. These parts check the turning of the shaft just previous to the time the hammer strikes the inking ribbon and forces it against the paper and the paper against the type. The flexible standard 215 of the hammer completes the rest of the stroke and makes an instantaneous contact, so that blurring in printing, which might be caused by the type wheels not having come completely to rest when the impression is taken, is avoided. The type are therefore prevented from dragging over the paper, or the paper over the type, for even an appreciable instant of time, and causing blurring. Normally the spring 231 keeps the shaft in such position that the arm 232 is against the end of the thumb-screw 233, and the hammer within a short distance of the inking ribbon, but not touching the same.

*Mechanism for setting impression-taking devices for printing.*—I provide means when a key is depressed, for turning the shaft 218 so as to raise the printing-hammer to take an impression by the force of the spring 231 when suitably liberated (Fig. 27). The cutaway disk 230 on shaft 218 has a notch near one of its peripheral edges (Fig. 29), and into this notch normally rests the nose of a bar 235, which is articulated to a crank 236 at the extreme right-hand end of the shaft 165, which is suitably actuated when any key is put down as previously explained (see Fig. 49). The crank 236 is adjacent to the crank 212 before referred to, and is placed between the crank 212 and the right-hand end of shaft 165 when looking at the machine from the front. When any key is put down the shaft 165 will be slightly rotated, throwing the crank 236 toward the operator, and pushing the bar 235 outwardly from the machine, thereby rotating the notched cutaway disk 230 and shaft 218 so as to raise the printing-hammer for a stroke.

*Devices for tripping impression-taking device to print.*—To permit the hammer to be thrown against the inked ribbon and take an impression, I may provide devices for tripping the bar 235 so as to permit the spring 231 to throw the printing-hammer toward the inking ribbon and take an impression (Figs. 10, 14, 15, 27, 29, and 47). To the shaft 174 is swung an arm 237, the end of which is provided with a pin 238 (Figs. 27 and 29), which pin works in a slot in the bar 235 and connects the arm 237 with a link 239, which is also slotted at the end and has its slot likewise engaged by the pin 238. This link 239 has its other end articulated to a double crank 240 fast upon a shaft 241, which is supported by the fixed side-frames of the machine (see also Fig. 28). The other end of the double crank 240 is articulated to a rod 242, which in turn is connected to an arm 243 arranged at the right-hand side of the machine upon the end of a shaft 244 (Figs. 6, 9, 10, 12, 13, 37, and 47). The bar 235, the arm 237, the connecting link 239, the double crank 240, the bar 242 and the arm 243 are arranged in the manner previously described, adjacent to the right-hand side-frame of the machine. The shaft 244 is sustained at each end by uprights (Fig. 27) extending from a plate 109, which pivotally supports the vertical bars 111 carrying the escapement racks, as previously pointed out. Upon the shaft 244 adjacent to each of the escapement racks, is fixedly placed a short arm 246 to which is pivotally secured a vertical flat-bar 247 (see particularly Figs. 9 and 10). The vertical flat side of the bar 247 and the short arms 246 are arranged so as to be clear of the racks 112. The upper ends of the flat-bars 247 are turned at right-angles to the plane of the bar itself, so as to be above the racks 112. The upper bent ends of the bars 247 are each provided with a guide-pin 248 which works in a slot in said end. The said guide-pin 248 takes into the collars 116 on the upper end of the escapement bar 111. The bar 247 is shown in Fig. 10 as broken away about midway of its length in order to better illustrate the construction. The lower side of the ends of the bent bars 247 terminate slightly below the stop-collars 116, against which the racks come firmly when thrown in engagement with the escapement wheels and the motor is unlocked. The effect of this latter-mentioned operation is to lift the bars 247, draw on the short arm 246, and turn shaft 244, thereby actuating the arm 243 and operating the rod 242, which turns the double crank 240 in such a direction as to draw on the link 239, and so operate the toggle joint formed by said link and the arm 237 as to raise the nose of the bar 235 from the notch of the cutaway disk 230. This allows the spring 231 to throw the hammer toward the ink ribbon and type suddenly, and a digit is printed thereby in the manner heretofore stated. The movements of the parts referred to are in the reverse of the direction indicated by the arrows upon said parts in Fig. 27, which represents the said parts as returning to their normal positions. From the construction described, it will be seen that the hammer is thrown back and tripped each time a key is depressed. It will be further noted that the tripping of the hammer does not take place until the escapement rack corresponding to the key depressed, has reached the limit of its excursion and impinged against the bent or turned over end of the bars 247. This can occur only after the digit has been registered by the machine, so that premature printing is obviated, as is also taking impressions from the type wheels when in active revolution. This scheme enables the operator to keep pace with the operation of the machine, but not to get beyond the speed of the apparatus. The operator can, either by observing the printing hammer or noting the sound made by the printing hammer, know whether the machine has done its work, and is then informed whether or not the apparatus is ready for another key to be depressed. As soon as the key rises the carriage will feed the printing hammer to the next type-wheel, and thus the digit printed will be readily visible, as the hammer is preferably the width of one type wheel only. A zero escapement-bar 111, rack 112 and slotted plate 117, and key bar having a pin working in the slot in said plate are provided in order to make the resistance of the zero key exactly similar to the resistance of the other keys, so that the operator will experience no difference or want of uniformity in action of any of the keys. The escapement rack for the zero key cannot, of course, have any movement, else such movement will be registered by the machine, and the apparatus will not then indicate zero. I design to have the zero key also lift the bar 126 and unlock the motor the same as the other keys, to have this key in every respect similar in touch to the operator as the other keys. Although the motor is unlocked when the zero key is depressed by the locking pawl 132 being lifted out of the teeth of the locking wheel 133 (Fig. 27), the zero-escapement rack prevents the motor from causing any rotation and locks the motor, taking the place for the time being of the locking pawl 132. The zero key's chief function is to feed the carriage from order to order. The type wheels of the printing wheels are, however, left in their normal or zero position, and the adding wheels left undisturbed when the zero key is operated. As the zero-escapement rack has no movement, it, of course, will not do to rely upon the zero-escapement rack to liberate or trip the printing hammer, and I have, therefore, devised another means for doing this when the zero key is depressed. To the joint where the one-key crank arm 246 and bar 247 are articulated, I connect a bent bar 251 (Figs. 6, 9, 47, and 48) which passes downwardly therefrom through the plate 109 along the zero-escapement-bar 111, and is joined to a plate 252, which straddles the slotted plate 117 of the zero-escapement bar. This straddling plate 252 is fastened to its plate 117 by a guide pin 253 working in a slot (Fig. 48). When the zero-key bar is depressed, the pin 119 of said bar traverses the slot in its plate 117 and raises the plate 252, which is so arranged as to be struck by said pin before it has reached the end of said slot. The lifting of the plate 252 raises the bar 251, turns the shaft 244, operates the crank arm 243 and the connecting rod 242, and parts connected therewith to trip the hammer in the same manner that the escapement racks of the other keys do. Inasmuch as the registering apparatus is not called into requisition when the zero key is depressed, it is evident that there can be no premature printing, when such key is depressed, and no printing when the type wheels are in motion.

While I have described a printing apparatus and devices in connection with my machine, it will be understood that my invention and adding machine are not necessarily confined to the use of such printing devices, but said printing devices may be dispensed with, where it is required to have an adding machine solely, or may be greatly varied, and still be within my invention. For instance, my invention is not necessarily confined to a series of printing wheels, or even to wheels for printing, as other printing devices can be employed. Nor is my invention confined to printing each digit after each key is struck, for the numbers registered by the machine may be printed in a different manner. The printing-hammer setting and tripping devices herein described may be dispensed with, and the printing hammer operated directly by the keys in an obvious manner if desired.

*Device for aligning printing and adding wheels.*—It may happen that the series of idle wheels 78 will get out of co-incident radial position when there is much play between the teeth of the wheels, and thus not leave a straight track or channel for the axially moving wheels 83 and 84 to traverse. This would also cause the printing and adding wheels to be slightly out of co-incident radial position, and will therefore make the printing uneven and might forbid correct registration by the adding wheels. To obviate this, I place upon the shaft 241 two arms 260, which carry a rod 261 extending beneath all of the idle-wheels of both the printing and adding wheels. The arms 260 are rigidly secured to the shaft 241, and move with it when the same is actuated by the escapement-rack connection to trip the printing hammer in the manner described (Figs. 12, 13, 16, 27, and 28). Normally the rod 261 is below the teeth of the idle-wheels 78, so that the latter may revolve freely without being interfered with by said rod (Fig. 13). When the printing-hammer is tripped, and the double crank 240 actuated to turn the shaft 241, the bar 261 is suddenly thrown up into one of the spaces between the teeth of the idle-wheels, and thus aligns or puts in line the idle-wheels, and thereby the type-wheels of both the printing and adding wheels. This occurs just previous to the printing-hammer taking an impression. If any wheel is slightly out of line the aligning-bar 261 strikes up into the teeth first passing over the incline part of the teeth, and then going clear up into the same to the base of the root of the teeth (Fig. 16) and preserving alignment of the wheels, and of the characters printed. This aligning means may be used or not as desired in the machine, it not being absolutely required. Its connections may be varied if desired.

Figure 26:
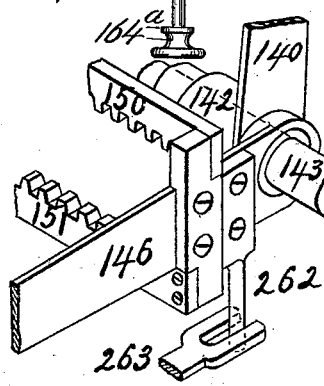
Fig. 26 is an isometric view illustrating in detail on an enlarged scale, a part of the carriage mechanism.
Figure 61:
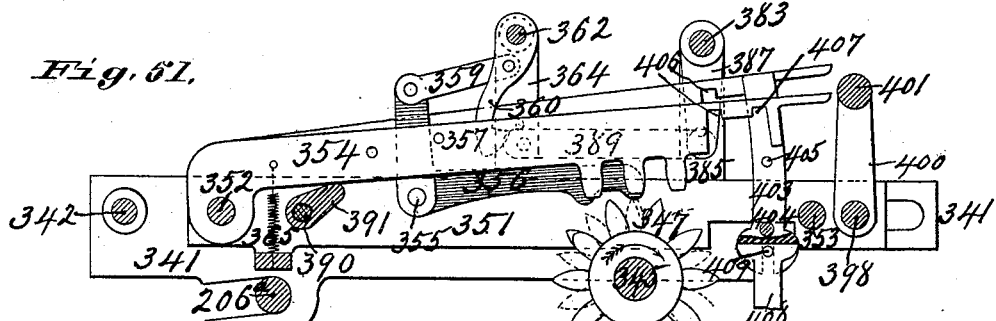
Figure 62:
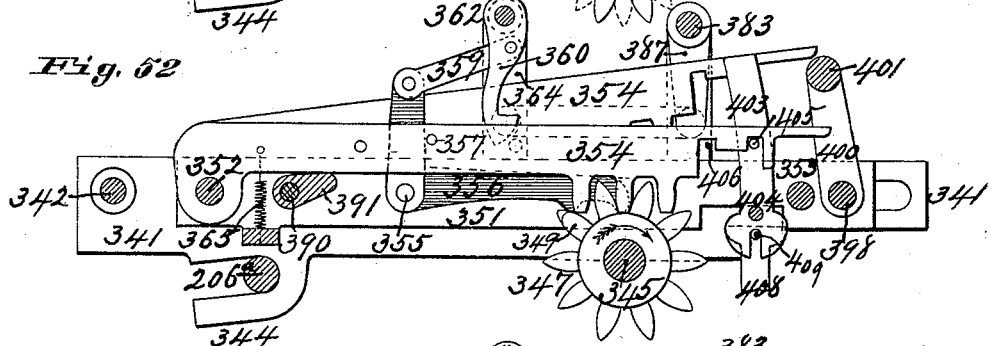
Figure 63:
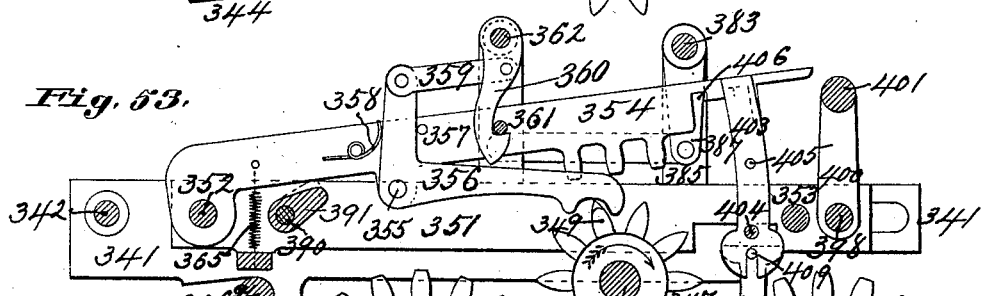
Figures 55, 64:
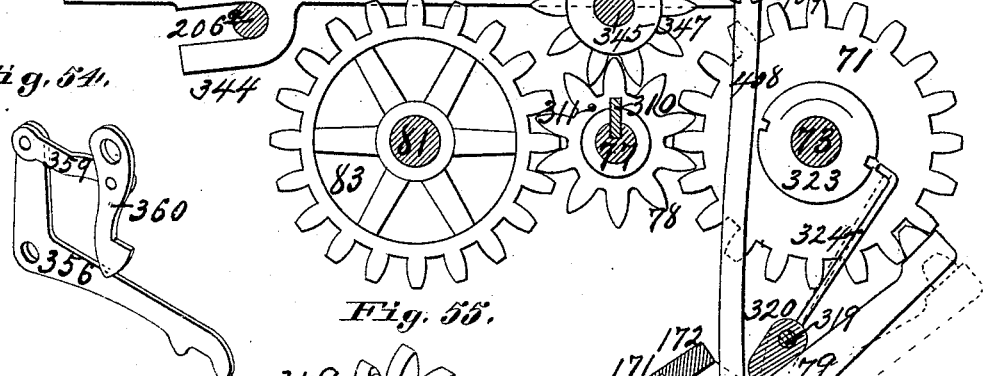

*Mechanism for bringing carriage to starting point.*—The carriage preferably starts from the units column and proceeds to the other numerical orders progressively step by step. When the beginning or left-hand end of a number has been reached after the full number has been registered and recorded by the machine, it is desirable to bring the carriage to the units order or column before starting to register another number. To accomplish this in a convenient manner, the carriage is provided with a pin 262 which extends downwardly therefrom (Figs. 25, 26, and 27). This pin is embraced by a right-angle forked lever 263 pivoted to a post 264 supported by the base plate of the machine (see also Figs. 1, 4, and 6). The unforked or other end of the bell-crank lever 263 projects preferably toward the right-hand side of the machine and may be operated in any suitable way to bring the carriage to the units or starting point, but is preferably operated by the means and in the manner to be hereinafter set forth. It will be noted that the right-angle lever 263 moves each time the carriage moves step by step. When the free end of said right-angle lever is pulled to its normal position, it brings the carriage invariably to the starting point, no matter in what position it is left by the operation of the keys. If the carriage is moved through one numerical order it is returned by said right-angle lever through the distance of one numerical order to the starting point. If the carriage is moved through two or more numerical orders, it is brought by said right-angled lever to the starting point. The carriage may be pushed to the starting point by the rod 226 heretofore described, or moved to such point by taking hold of any part of the carriage and shifting it. As previously described, the carriage may be made to begin at the front or highest order of the number by suitably operating the rod 164 and bringing the spur-wheel 153 in gear with the rack 151 of the carriage. The carriage would then in the present machine, be positioned by hand each time at the beginning of a number, and would move automatically step by step to the units end thereof. Other means may of course, be devised to bring the carriage to a starting point, and still preserve the features of my invention.

*Motor-winding mechanism and handle connections therefor.*—I deem it advisable to wind the motor spring 100 after each complete number has been registered by the machine, although a motor could be provided which would need winding at certain infrequent intervals of time, and still be within my invention. I prefer, however, the former arrangement. An electric motor may be used or any motor which has power transmitted to it and which does not require winding. For the purpose of winding the motor each time a complete number is registered by the machine, I attach to the motor-drum 99 one end of a flexible connection 266, which may be a cord, chain, cable, or tape, metallic or of other suitable material. This flexible connection passes downwardly from the drum under a spool 267 on the shaft 70 before referred to (Figs. 6, 9, 13, 23, 24, and 25). The flexible connection 266 after going over the spool 267, passes to a spool 268, fixed to the shaft 143, upon which the sleeve 142 of the carriage slides and rotates freely, as previously referred to (Fig. 25). The other end of the flexible connection 266 is attached to this spool 268. At each end of the shaft 143 and adjacent to the side frames of the machine are disks 269 and 270 (Figs. 4, 6, 13, 23, 24, 25, and 49). To each of the disks 269 and 270 is pivoted a bar 271 and 272 respectively. These bars pass forward to beyond the key knobs 122, and are in turn pivoted to levers 273 and 274 respectively. The said levers 273 and 274 are connected together by a bar or handle 275, which is at or about the level of the key knobs 122, but is arranged in front thereof so as not to interfere with the operation of the keys, and yet be within convenient reach of the operator. When the handle 275 is pulled by the operator it draws on the bars 271 and 272, and thereby rotates the disks 269 and 270 through the arc of a circle, winds the flexible connection 266 upon the spool 268 on the shaft 143, which is rotated by said disks 269 and 270, thereby causing the drum 99 to be revolved by the spring 100 therein to be wound. The handle 275 and parts connected thereto last referred to may be brought to their normal position by the operator pushing the handle backward after pulling it forward. It is evident that a spring may be employed for this purpose, or gravity relied upon to perform this office of returning the parts to their normal positions. After the spool 268 is rotated backward subsequent to being rotated forwardly to wind the flexible connection on said spool to store power in the motor, the flexible connection will be slack. As the keys are operated and the motor unlocked and permitted to revolve, the slack in the flexible connection will be gradually taken up by the motor, the flexible connection being wound upon the drum 99. If but few keys have been operated and the motor 100 brought into requisition but little, a small part of the slack of the flexible connection will be taken up and wound upon the drum 99, but if the keys have been operated to the full limit of the machine for any single complete number, nearly all, if not all, of the slack will be taken up in the flexible connection and wound upon the drum 99. When the handle is pulled, the motor is wound by drawing upon the flexible connection and uncoiling it from the drum 99. If but little of the flexible connection is coiled upon the drum, but little power will be stored in the motor when the handle is pulled, but if on the other hand, a large part of the slack of the flexible connection 266 is wound upon the drum 99, when the handle is pulled considerable power will be stored in the motor. When the handle is pulled and the motor has expended but little of its energy, the effect of pulling the handle will be to first take the slack out of the flexible connection, and then to wind the motor, there being as it were a lost motion between the handle and the motor during the first part of the movement of the handle. If, however, the motor has expended the full limit of its power, the very first motion of the handle will start to wind the motor and will continue winding the same during all the movement of the handle, and will store into the motor its full complement of energy. In both instances supposed, the exact amount of power expended by the motor will be stored into the motor when the handle is pulled. This is one of the features of my invention. The details of construction of my motor-winding mechanism may be varied without departing from the spirit of my invention. The operating handle 275 or its connections need not necessarily be actuated by hand, as any way of effecting the desired movement at the will of the operator may be adopted, as by a foot treadle for instance, and still be within my invention.

*Handle connections for bringing carriage to starting point.*—I design to have a lug 280 upon the bar 272 come in contact with the projecting end of the forked bell-crank lever 263 which draws the carriage to its starting or units point (Fig. 6). This lug 280 draws the carriage to the starting or units point when the handle is pulled, no matter whether the carriage has traveled through one or two or through all the numerical orders of the machine. If the carriage has traveled but a few steps, the lug 280 upon the bar 272 does not strike the free end of the bell-crank lever 263 during the first part of the outward movement of the bar 272, but impinges against the same at the last part of said movement of the said bar 272. If the keys have been operated to propel the carriage through all the numerical orders of the machine, the lug 280 will strike the free end of the bell-crank lever 263 when the handle is first pulled, and the free end of the bell-crank lever 263 will travel with the bar 272 to the end of its movement. There will be no lost motion between the parts referred to in the last instance as in the former.

*Devices for bringing printing wheels to zero.*—In the idle-wheel shaft 77 is cut a key seat 281ª (Fig. 49) for receiving, at the right-hand half thereof, a key 281 having pins 282 (Figs. 39, 41, 42, 43 and 45) extending therefrom at a distance apart equal to the distance between the idle wheels 78. There is a pin 282 for each idle-wheel of the printing wheels. Upon each of the idle-wheels is also a pin 283 at right-angles to the pins 282, and against which the pins 282 when suitably operated, are adapted to strike (Figs. 41, 42, 43, 44, and 45). As before explained, the idle-wheels 78 are loosely mounted or journaled upon the shaft 77, so that said wheels may rotate independently of said shaft. Ordinarily the pins 282 on the key are out of the path of the pins 283 on the idle-wheels, so that the idle-wheels may rotate freely without encountering the pins on the key 281. I design to have the shaft 77 rotated each time a number has been registered by the machine, and the handle 275 is pulled, and I also design to have the key 281 at the same time moved longitudinally in its seat in the shaft 77, so that the pins 282 will be moved adjacent to the idle-wheels (Fig. 43), whereby when the shaft 77 is rotated and the key 281 carried thereby revolved, the pins 282 will strike or gather up the pins 283 on the respective idle-wheels, and will bring the idle-wheels to a predetermined position so as to position the type-wheels to zero. For the purpose of turning the shaft 77 to accomplish the object desired, I have arranged preferably upon the left-hand end of the shaft 73, a segmental disk 284 (Figs. 23, 24, and 49). The segmental disk 284 is carried by a collar or sleeve 285 preferably swung about the type-wheel shaft 73, so that the segment may turn independently of said type-wheel shaft 73. Pivotally attached to the segment 284 is a vertical curved rod 286, which passes downwardly and is pivoted to the disk 269 previously described, and which is actuated when the handle 275 is pulled. Normally the segment 284 is in a raised position as shown in Fig. 23, but when the handle 275 is pulled, the rod 286 is drawn downwardly by the rotation of the disk 269, and rotates the segment 284 downward to the position shown in Figs. 24 and 49. The segment 284 has teeth cut upon its peripheral edge, and these teeth mesh into the teeth of the small spur-wheel 287 fast upon the shaft 77 carrying the idle-wheels. Every time the handle is pulled, the shaft 77 is rotated by the connections described. Between the idle-wheels, and loosely upon the shaft 77 are placed collars 288 (Figs. 42, 43 and 46) which are open rings, between the ends of which the pins 282 of the key 281 come. The purpose of these open rings or collars is to keep the idle wheels at the proper distance from one another. The collars in no wise interfere with the free rotation of the idle-wheels 78, being held from revolution by the pins 282 of the key 281 when the idle wheels 78 rotate independently of said key 281, but being carried around with the pins of the key 281 when the shaft 77 is itself rotated, irrespective of whether the pins of the keys are in or out of the path of the pins of the idle-wheels. It will be noted that the shaft 77, carrying the key 281, could not be rotated when the pins 282 came against the pins 283 upon the idle-wheels when any of said idle-wheels were in engagement with the axially-moving wheels 83 and 84, which are positively geared to the motor 100, and positively locked from rotation except when the keys are depressed. Under the conditions stated it would then be impossible to bring the printing wheels to zero by the means described. If the axially-moving wheels 83 and 84 be separated from the idle-wheels it will be obvious that the type-wheels can then be brought to zero by pulling the handle. As one way of separating the axially-moving wheels from the idle wheels, I arrange to have said axially-moving wheels pass out of mesh with the idle-wheels, preferably at right-angles to their axis, and to have the further pulling of the handle move said axially-moving wheels in the direction of their axis to a starting point, when they are entirely clear of the idle-wheels. The axially-moving wheels may be moved out of engagement with the idle-wheels in any other suitable way, but by this system the axially-moving wheels are free to be drawn to their starting point by the pulling of the handle, without any possibility of striking the teeth of the idle-wheels. To effect this separation of the axially-moving wheels from the idle-wheels, I mount the ends of the shaft 81 which carries the sleeve 82, that bears the axially-moving wheels in the oscillating side-frames 68 and 69 which have been previously described. This oscillating frame carries the motor-shafts, gearing, and studs heretofore described, and in it are mounted all the parts of the motor and the motor-winding mechanism, as well as all the parts of the escapement for the motor. This oscillating frame also carries the means for unlocking the motor when the keys are depressed, which means really forms part of the motor-escapement. From the oscillating side-frames 68 and 69 extend rearwardly two lugs 289 respectively, each of which bears against a spring 290 carried by posts 291 upon the base-plate 65 of the machine (Figs. 4 and 9). Normally the springs 290 hold the oscillating frame in vertical position, so that the axially-moving wheels are in engagement with the idle-wheels. Attached to the oscillating side-frames 68 and 69 respectively, are forwardly projecting arms 292 and 293. To said arms 292 and 293 are secured respectively pins 294 and 295 (Figs. 1, 4, 6, 9, 13, 23, 24, 25, and 27). The pins 294 and 295 carried by said arms work in curved slots 296 and 297 (see also Fig. 49) in the disks 269 and 270 upon the shaft 143, as previously described. The first part of the slots 296 and 297 are made eccentric, but the rest of said slots and the main part thereof is concentric with reference to the shaft 143 with which the slotted disks 269 and 270 turn. In the normal position of parts, the pins 294 and 295 rest in the eccentric end of the curved slots. When the handle 275 is pulled, the very first movement of rotation of the disks 269 and 270 lifts the arms 292 and 293 by means of the pins 294 and 295 and the eccentric part of the slots, throwing the oscillating side-frames 68 and 69 backwardly slightly, compressing the springs 290 and effecting a separation of the axially-moving wheels from the idle-wheels. It will be observed that the slight rearward swinging movement of the shaft 81 carrying the axially-moving wheels and sleeve 82, is not interfered with by the carriage, which is connected to the sleeve 82 by the forked lever 136. The rearward swing of the sleeve 82 merely moves the lever 136 rearwardly, and swings rearwardly the uprights 140 and 141 of the carriage without disturbing the horizontal arms 145 and 146 of the carriage (Figs. 6, 13, 25, 27, and 49). Inasmuch as the oscillating frame carries the motor, the escapement, and the motor unlocking devices, all of which are to a large extent independent of the other part of the machine, there will be no derangement of the machine in effecting a separation of said parts from the rest of the machine. While the axially-moving wheels are out of engagement with the idle-wheels they are being moved to the starting point by means of the bell-crank lever 263 and handle 275 previously set forth. When the handle is pushed or brought back to its normal position, the axially-moving wheels are brought into mesh with the units idle-wheel. 298 and 299 Fig. 25 are two lugs respectively on the stationary upright side-frames 66 and 67, against which lugs come the arms 292 and 293 respectively to limit the forward return movement of the oscillating frame and keep the axially-moving wheels in proper meshing distance with the idle-wheels. When the idle-wheels are free from the axially-moving wheels, and the pins 282 on the key 281 are moved toward the idle-wheels (Fig. 43), the idle-wheels may then be rotated freely to the zero point by the rotation of the shaft 77 and the key 281, which latter rotation is effected by the segment 284 and connecting rod 286, as, and in the manner, heretofore described. To throw the key 281 in position, so that the pins carried thereby will impinge against the pins 283 on the idle-wheel, I may provide the idle-wheel shaft 77 with a loosely mounted collar 300, which is fast to the key 281, but is capable of sliding upon said shaft (Fig. 39). In a circumferential groove in the collar 300 takes a pin 301 carried by a lever 302, pivoted to a collar 303 preferably carried by the type-wheel shaft 73. The free end of the lever 302 is provided with a curved slot, into which takes a pin 304 carried by a bracket or arm 305, which is rigidly secured by preference, to the upright 69 of the oscillating frame (Figs. 6, 12, 27, and 39). The slot in the lever 302 is so curved that when the pin 304 rides along the curved sides of said slot, when the oscillating frame is moved backwardly by the pulling of the handle, that the free end of the lever 302 will be swung toward the left of the machine, thereby sliding the sleeve 300 and key 281 so as to put the pins 282 of the key 281 in the path of the pins 283 upon the idle-wheels. As before explained, the oscillating frame is moved backward at the very first motion of the handle, so that the pins 282 on the key will be thrown in the path of the pins 283 during the first part of the motion of the handle. During the rest of the movement of the handle, the shaft 77 is rotated thereby, and the type-wheels brought to zero by the idle-wheels being moved to their initial position by the means set forth. When the handle is moved or resumes its normal position, the pin 304 rides backward in the slot in the lever 302, and moves the key 281, so that its pins will be taken out of the path of the pins on the idle-wheels (Fig. 42).

It is obvious that any other means of throwing the pins of the keys in the path of the pins on the idle-wheels may be used without departing from the spirit of my invention in this particular. The means I have described represent only one way of accomplishing this purpose, and the way in which I have found convenient for the purpose. It is obvious that any sort of a movable frame may be substituted for the oscillating frame. If other means be used for the above described purpose, an oscillating or movable frame need not necessarily be employed, as no separation of the axially-moving and idle-wheels may then be desired. Other means may be employed to bring the type-wheels to zero, but I prefer the devices set forth.

*Devices automatically locking printing wheels at zero.*—The printing wheels 72 may be frictionally restrained from rotating past, and held at, their zero point when the operating handle is pulled, but I prefer to positively lock them in such position, and to unlock them when the finger-keys are depressed as previously set forth, positively relocking them automatically at zero when the operating handle is pulled. For this purpose the ends of the printing-wheel locking pawls are slotted or notched, and provided with a rounded part on each side of the slot or notch 306 therein. The slot of the pawls 79 of the printing-wheels 72, is adapted to take over one of two pins 307 upon each of the gear wheels 75 attached to the printing-wheels (Figs. 6, 13, and 49). The pawls 79 of the printing-wheels do not lock into the teeth of the spur-wheels 75 attached thereto, as do the locking pawls of the adding wheels 71 when the printing wheels 72 are at zero. One of the pins 307 rest normally in the said slots, and hold said printing-wheels positively locked until any given pawl is moved away from its pin, when the wheels so unlocked may be rotated freely. This unlocking of the pawls occurs when the keys are depressed and the cam 168 on the sleeve 166 impinges against the short arm of any pawl 79 (Fig. 49) as previously explained. After each printing-wheel is suitably positioned, and an impression taken therefrom, each pawl 79 is forced to its normal position by the individual springs 171 previously referred to. The printing wheels after being actuated, and before the operating handle is pulled, are not locked by the pawls, but are left temporarily in the position in which they are placed until the complete number is registered and printed and the handle 275 is pulled. It matters not, of course, whether the printing-wheels rotate out of their position after an impression is taken from them, or not, for they have no function to perform again until the handle 275 is pulled. When any pawl 79 is returned to its normal position after the printing-wheels are rotated, it is within the path of its pins 307, so that when the handle 275 is pulled and the key 281 in shaft 77 has its pins 282 put in the path of the pins 283 of the idle-wheels 78, the said idle-wheels will turn to their initial positions, and will rotate the wheels 75 of the printing-wheels, bringing one of the pins 307 against one or the other curved side of the pawl. The pins 307 will ride over one of the curved parts of the pawl 79 until the slot 306 is encountered, when the pawl will snap over the pin and lock the printing wheels positively at zero, the springs 171 causing the snapping action of the pawls. The pins 307 ride over one or the other of the curved parts of the pawl at each side of the slot, depending upon in which direction the printing-wheels have been rotated, i. e. whether they have been turned in one direction to cause the machine to add, or in the other direction to cause the machine to subtract. If one or more of the printing-wheels in adding or subtracting a number have not been actuated, but have been left at zero to print a cipher in the number, such wheel or wheels will not have their pawls unlocked, and one of the pins 307 of such wheel or wheels will remain in the slot in its pawl and hold said wheels at zero during the entire time. When the printing wheels are brought to zero, they are ready to be rotated again to any character to print the next number to be registered by the machine.

*Handle connections for feeding ink ribbon and paper.*—The forward end of the arm 292, secured to the side oscillating frame 68, is attached to the link 209, which is secured to the inner end of the lever 205 carrying the ink-ribbon feeding pawls 206 and 207 (Figs. 4, 6, 13, 23, and 24). From this it will be seen that each time the handle 275 is moved to and fro and the oscillating frame vibrated back and forth, the lever 205 will move up and down the ink-ribbon-feeding pawls 206 and 207, so as to feed the ribbon each time the handle 275 is pulled, and after a complete number has been registered by the machine and another number is to be registered and printed. The rod 196, which is connected to the paper-feeding devices, and the actuation of which feeds the paper for the next number to be printed in the manner and by the means heretofore set forth, is connected to a rod 206ª, which ties together the upper part of the oscillating side-frames 68 and 69 (Figs. 6, 9, and 27). When the oscillating frame is moved back and forth by the actuation of the handle as described, the paper will be fed and ready for recording the next number. Thus it will be seen that the actuation of the handle 275 not only brings the carriage to its starting point, winds the motor, and rotates the printing-wheels to zero, but that said handle feeds the paper and inking ribbon, greatly simplifying the action of the machine, and making it convenient to operate and its operation automatic throughout. All it is necessary to do to add or subtract and record numbers is to operate the keys and pull the handle after each complete number is struck upon the keys. Other connections than those described may be made between the operating handle and the ink-ribbon and paper-feeding devices without departing from my invention. The means described for these purposes are set forth merely to disclose one means of accomplishing the objects, and to show by way of illustration, how the same may be carried out.

*Appliances for bringing adding wheels to zero.*—In the key seat or groove 281ª (Fig. 49) passing from one end of the shaft 77 to the other end, and at the left-hand side of the machine, is a second key 310 having pins similar in every respect to the key 281 of Fig. 45. The idle-wheels of the registering or adding wheels have pins 311 upon them the same as the pins 283 on the idle-wheels of the printing-wheels, and the pins of the key 310 are normally without the path of the pins 311, the same as before described with reference to the idle-wheels of the printing-wheels (Figs. 16, 38, and 53). The key 310 is secured to a collar 312 which is free to slide upon the shaft 77, and which shaft may rotate independently of said sleeve. Into a peripheral groove in said collar, takes the nose of a projection 313 upon a shaft 314 journaled in brackets extending from the upright stationary side-frame 66 of the machine (Fig. 38). The shaft 314 has about it a coiled spring 314ª, which tends to move the collar 312 away from the side frame 66, and keep the pins on said key 310 out of the path of the pins 311 (Fig. 53) on the idle-wheels of the adding-wheels, so that said idle-wheels may rotate freely without being interfered with by the pins upon the key 310. The shaft 314 has upon it an arm 315, the free end of which may be provided with suitable handle or finger piece 315ª projecting within convenient reach of the operator. When the arm 315 is pulled downward, it overcomes the tension of the coiled spring around the shaft 314, and moves the collar 312 out of its normal position and toward the side frame 66, bringing the pins on the key 310 in the path of the pins on the idle-wheels of the adding wheels, the same as previously described with reference to the idle-wheels of the printing wheels. When the handle 275 is pulled while the arm 315 is depressed, the idle-wheels of the adding wheels will be brought to their initial position, and the adding wheels will thereby be revolved to zero. It will be remembered that every time the operating handle 275 is pulled, the movable frame is oscillated, and the axially-moving wheels separated from the idle-wheels of both the printing and adding wheels, so that the idle-wheels of the adding-wheels are free to be revolved. As before described, the shaft 77 is rotated each time the handle 275 is pulled, but the key 310 is not brought into requisition until the arm 315 is depressed, which is done at the will of the operator when it is desired to start an entire new addition. The key 310 is not brought into requisition automatically by the pulling of the handle, as the key 281, which controls the printing wheels is, but the adding wheels are only brought to zero by pulling the handle when the key 310 is positioned at the will of the operator.

*Mechanism for unlocking adding wheels to bring them to zero.*—Inasmuch as the adding wheels are positively locked by the pawls 79, some means must be devised to throw said pawls out of engagement with and unlock the adding wheels before said wheels can be turned to zero to start a new edition. In the present machine I design to have this done at the same time the key 310 is shifted to bring its pins in the path of the pins on the idle-wheel, and just before the handle 275 is pulled. This means consists of an arm 316 rigidly fastened to the shaft 314 (Fig. 38). The arm 316 has pivoted to it a connecting rod 317, to which is in turn pivoted an arm 318 rigidly fastened to a shaft 319, which carries a cam 320 extending over all the pawls 79 of the adding wheels (Figs. 1, 13, 23, 24, and 53). The shaft 319 which carries the cam 320 is supported at each end beneath the adding wheels by two bars 321 and 322, extending repectively from the plates 173 (Figs. 1, 13, 23, and 24). When the arm 315 is depressed, it draws upwardly the connecting rod 317 and arm 318, thereby throwing the cam 320 against the locking pawls 79 and unlocking all of the adding wheels (Figs. 13 and 53), so that when the handle 275 is pulled they are free to be brought to their zero position. The spring about the shaft 314 returns the parts to their normal position and is assisted in this action by the individual springs 171 applied to the locking pawls, as previously described. If need be other appliances may be employed to unlock the adding wheels and bring them to zero.

*Devices for arresting adding wheels at zero.*—When the locking pawls 79 are thrown out of engagement with the gear wheels 75 of the adding wheels 71 by operating the finger-piece 315, and the handle 275 is pulled, there will then be nothing to prevent the adding wheels from rotating past the zero point, and the momentum of said wheels may be sufficient to cause such over-rotation. To prevent this I provide each of the gear-wheels of the adding wheels with a disk 323, which is notched at diametrically opposite points (Fig. 53). I also secure to the cam 320 a number of bent fingers 324, one for each adding wheel. These fingers normally do not touch the disk 323, but when the cam 320 is operated by the finger-piece 315, the said fingers are thrown into contact with the said disks. If any adding wheel has been operated, and is not at zero when the cam 320 is operated, the end of its finger 324 will bear upon the periphery of its disk, and when the adding wheels are rotated by pulling the handle to bring them to zero, the bent ends of the fingers will snap into one or the other of the two notches when the zero point is reached, and thus prevent further rotation of the type-wheels, firmly holding them at the zero point and doing away with the possibility of over-rotation. When the finger-piece 315 is liberated, the cam 320 resumes its normal position, the locking pawls 79 pass into engagement with the gear-wheels of the adding-wheels, and the fingers 324 are removed from contact with the disks. Frictional means may be employed to stop the adding wheels at zero if desired. The unlocking devices last described would then be dispensed with.

*Subtracting and correcting.*—I have previously described the motor gearing and the clutch mechanism by which the direction of rotation of the axially-moving wheels and idle-wheels, and thereby the printing and adding wheels, may be reversed. Any means of operating the clutch 87 (Figs. 11, 31, 32 and 38) for this purpose may be adopted without materially affecting my invention. I have shown in the accompanying drawings one means of operating the said clutch to effect addition or subtraction at will, and for this purpose have provided a lever 326 with a pin 327 which takes into a peripheral groove in the clutch 87. The said lever 326 is pivoted to a collar 328 carried by the tie-rod 206ª (Figs. 11, 12, and 38). Surrounding the free end of the lever 326 is a sliding part 329, which is pivoted to a short arm or crank 330 rigidly affixed to a spindle 331 journaled in brackets 332 and 333 extending from the inside of the upright stationary side frame 66 of the machine. The spindle 331 extends to within convenient reach of the operator, and is provided with a knob 334, which may be adjacent to the arm 315, that is brought into requisition to bring the adding-wheels to zero. When the spindle 331 is rotated so as to swing the arm 330 and draw the part 329 to the left (Fig. 38), the lever 326 will be drawn to the left and will move the clutch 87 in the same direction, that is, from engagement with the wheel 86 into engagement with the wheel 85. Rotating the spindle 331 in the opposite direction will throw the parts 330, 329, and 326 to the right and move the clutch 87 from engagement with the wheel 86 into engagement with the wheel 85. Upon the spindle 331 is rigidly affixed a spool or collar 335, the purpose of which will be described hereinafter. Between the spool 335 and the bracket 333 is a spring coiled about the spindle 331. This spring tends to keep the spindle in its retracted position. From the bracket 333 extends a semi-cylindrical part 336, which is bored to receive the lower half of the spindle 331. Upon this spindle and rigidly attached thereto, is a corresponding semi-cylindrical part 337 (Figs. 36, 37, and 38). Normally the two parts 336 and 337 rest against each other so as to make a cylinder. In this position the spindle 331 is turned so as to throw by means of the parts 329, 330, 326 and 327 the clutch 87 into engagement with the wheel 86 and drive said wheel and its connected gearing, in such a direction as to add, for instance. By grasping the knob 334 and drawing the spindle forward until the semi-cylindrical part 337 escapes the semi-cylindrical part 336, and then turning the knob 334, so that the spindle 331 is turned to throw the arm 330 in such a direction as to put the clutch 87 in communication with the wheel 85, the printing and registering wheels of the machine will be driven in the opposite direction so as to subtract, for instance. When the spindle 331 is drawn forward and rotated, the end of the semi-cylindrical part 337 after the knob is liberated, engages the end of the semi-cylindrical part 336, the spring upon the spindle holding said parts firmly in contact, and preventing the spindle from being jarred so as to throw the clutch out of engagement with the wheel 85. By now drawing the knob slightly forward and turning the spindle, so that the semi-cylindrical parts 336 and 337 register with each other, the spring 331 retracts the spindle. The reversing of the motor, that is to say, the placing of the clutch 87 in engagement with one wheel or the other, is effected by the rotary motion of the spindle 331, but is not caused by the longitudinal movement of said spindle. The connecting piece 329 permits the spindle 331 to be slid in and out, and it allows the oscillating frame 68, 69, and 206ª to move back and forth without interfering with the spindle 331, the lever 326 by such connection being permitted to slide longitudinally in said connecting piece. I may mention here that the longitudinal motion of the spindle 331 is for the purpose of moving back and forth the spool 335 to suitably control the carrying mechanism to be hereinafter described, so that the said carrying mechanism will be governed to add or subtract at will. By referring to Figs. 33 and 34 of sheet 10, it will be noted that the digits upon the type-wheel of the printing-wheel shown in Fig. 33 are repeated thereon twice in reverse series, but that the digits upon the adding-wheel shown in Fig. 34 are repeated thereon in two direct or regular series. The difference of arrangement of type is due to the difference in function of the wheels. The printing-wheels in Fig. 33 print only the numbers registered by the machine, and start from zero each time a key is operated, whether the machine is adding or subtracting. The function of the adding-wheels (Fig. 34) is, however, different, their purpose being to indicate the sum of, or difference between, numbers, and hence the arrangement described is adopted.

One of the chief advantages of having an adding machine that will subtract, is to be able to make corrections in the work done by the machine. Suppose an operator has discovered that a wrong number has been added, and it is desired to correct the same. The knob 334 is manipulated so as to cause the machine to subtract, and the number wrongly added is struck over again upon the keys. This removes the wrong number from the machine and leaves the registering wheels in the same position they were before such number was erroneously added. Then by again manipulating the knob 334 so as to add, and striking the correct number on the keys, addition may be continued. It will be obvious that where the wrong number has been subtracted, the reverse of the preceding operation may be gone through with to effect correction. The correction of a number may apply to the correction of wrongly added digits, or to the taking out of the machine the entire number containing the digit as one element.

Another advantage of having the same machine both add and subtract is to furnish a means for verifying the work and of striking balances (Fig. 35). Let us suppose that a series of numbers have been added by the machine and a certain result is obtained. By changing the machine so as to subtract, and operating the keys to subtract the same numbers which were added to obtain the result, the adding-wheels should register zero. This indicates the correctness of the result obtained by addition. If the adding wheels by the method pursued, are not brought to zero, then the work of the machine has been at fault. If one direction of rotation be used for addition, then the other direction of rotation will effect subtraction, and it matters not which direction of rotation be selected by the operator to add and which to subtract.

*Carrying mechanism.*—Having now more particular reference to Figs. 50 to 60 inclusive, showing the carrying mechanism in detail on an enlarged scale, 340 and 341 are the side bars of a frame for supporting the carrying mechanism, which side bars are joined together at their rear by a tie-rod 342. This frame is sustained by the top rod 206ª of the oscillating frame at the rear end, where it is provided with a slot formed by a prong 344 extending therefrom to permit the rod 206ª to have the necessary motion which the oscillating frame has. The side bars 340 and 341 rest mediately at their forward part upon a shaft 345, which is supported at each end at the top of the stationary side frames of the machine (Fig. 4). The side bars 340 and 341 do not themselves rest upon the shaft 345, but are provided with downward extensions 346 screwed thereto, which rest upon said shaft (Figs. 6 and 13). The shaft 345 carries a series of wheels 347, loosely journaled thereon, of the same size as the idle-wheels 78, and corresponding in number to and meshing with the idle-wheels of the adding-wheels. These wheels 347 accompany the idle-wheels of the adding wheels through all their movements. Each of said wheels 347 is provided with an annulus 348 having a single tooth 349 (Fig. 55), which tooth is adapted to operate upon a suitable part of the carrying mechanism when carrying is to be effected. The wheels 347 are provided with ten teeth, the same as the idle-wheels 78, this being one-half of the number of the teeth on the axially-moving wheels 83 and 84, and one-half the number of the teeth of the type-wheel gear wheels 75. Within the frame formed by the side bars 340 and 341 and the cross bar 342, which frame is stationary, is a second frame adapted to reciprocate, and composed of side bars 350 and 351 similar to each other. These bars 350 and 351 are joined together by rods 352 and 353. The rods 352 and 353 project beyond the side bars of the reciprocating or movable frame into slots in the side bars 340 and 341 of the stationary frame, the said slots forming a means for guiding, and permitting the reciprocating frame to move back and forth, and at the same time sustaining it upon the fixed frame of the carrying mechanism (Figs. 4, 6, 13, 23, and 24). Upon the shaft 352 of the reciprocating frame are mounted to swing freely, a series of flat carrying-bars 354, the under side of which are provided with three teeth, and the forward ends of which are notched and cut away as shown in the drawings. The three teeth of the carrying-bars 354 are adapted to come into mesh with their respective carrying wheels 347 at the proper time, when suitably operated to effect the carrying. The bars 354 correspond in number to the carrying wheels 347, and are arranged in the same vertical plane with said wheels. Pivoted to a downward extension from each flat bar 354, by a pin 355, is a right-angle or bell-crank lever 356 arranged between the flat-bars 354, so that the lower ends thereof, which are provided with two teeth or rounded projections, are over their respective carrying-teeth 349 on the wheels 347. The said bell-crank levers are adapted to be normally held down in position so as to be operated upon by the carrying teeth. Gravity may be relied upon for this purpose, and to hold the upright arm of the bell-crank lever against a stop-pin 357 carried by each flat-bar 354. The action of gravity may be supplemented by a small spring 358 bearing against the rear of each of the upright arms of the bell-crank levers, and carried by a pin upon each of the carrying-bars 354. To the upright end of the bell-crank lever 356 is articulated a link 359, which is in turn articulated to a hook 360 (Fig. 54), forming a latch for each of the carrying-bars, and adapted to engage a pin 361 upon each of said bars. The hooks 360 are loosely swung upon a shaft 362 sustained at each end by standards 363 and 364, extending from the side-bars 350 and 351 respectively of the reciprocating or movable frame. Normally the carrying-bars 354 are all latched in their raised positions by the hooks 360. When carrying is to be effected, the free arms of the right-angular levers 356 are operated by the single carrying teeth 349, which by the connections described actuates the hook 360 so as to unlatch the raised carrying-bar 354 of the next order above. Suppose it is necessary to carry, for instance, from units to tens the right-angular lever between the units and tens carrying-bars will have its free end over the units-wheel carrying-tooth 349, and will unlatch the hook 360 which sustains in place the next above or tens carrying-bar. It will be observed that the right-angular lever does not unlock the carrying-bar upon which it is mounted, but the carrying-bar next above. Should gravity not be sufficient to cause the carrying-bars to fall when unlatched, each of said bars may be provided with a helical spring 365, which is connected to a cross-bar of the reciprocating frame at one end, and to the carrying-bars at the other end.

It will be understood that in my carrying apparatus the carrying members or bars may unlock one another, that is to say, the carrying-bar below (i. e. of a lower order) may unlock the carrying-bar or bars above, or of a higher order, when the registering wheels and carrying teeth corresponding to each of the carrying-bars above are one step removed from the carrying position. Suppose, for instance, that 99 is recorded on the units and tens wheel, and that one is added to the units. The units registering wheel 347 and carrying tooth 349 will strike in their rotation the bell-crank lever 356 and unlock the latch 360, letting the units-carrying-bar, between the units and the tens wheel, drop. This dropping of the units carrying-bar referred to will carry down with it, at the same time, the bell-crank lever 356 pivoted upon said bar. One of the teeth on the free end of the bell-crank lever 356 will now impinge against the carrying tooth 349 between the tens and the hundreds, and will throw upward this end of the bell-crank lever, and backward the upper end of said bell-crank lever, drawing on the link 359, and operating the latch 360, which sustains in position the tens carrying-bar 354 between tens and the hundreds, thereby permitting said tens carrying-bar to drop upon the rest 391. It will be noted that the units carrying-bar has, by the connections referred to, unlatched or positioned the tens carrying-bar for carrying, and that this has not been caused by the revolution of the tens carrying wheel, but on the contrary, is independent of the revolution of the tens wheel, which has remained stationary during this operation. When, now, the carrying mechanism is moved back or forth, the carrying-bars referred to, after the rest 391 has been lowered, will drop into engagement with the carrying wheels, and will turn said wheels through the space of one tooth. This action of one carrying-bar unlocking another through the instrumentality of the connections referred to, will take place no matter how many carrying wheels are at nine, or one step removed from the carrying point, and the actuation of one bar by the rotation of the carrying teeth will be sufficient to unlatch every carrying-bar, provided its corresponding carrying wheel and tooth is at nine, or but one step removed from the carrying position. One carrying-bar when unlatched, will not, however, operate the one or ones above when the carrying wheels corresponding to said carrying-bar or bars are not at nine, or one step removed from the carrying position, for then when a carrying-bar which is unlatched drops, carrying down with it its bell-crank lever 359, the teeth on the free end of said bell-crank lever do not strike against its carrying tooth 349, because said tooth 349 is not in the path of or in position to impinge against the said bell-crank lever, and therefore the spring 358 holds the bell-crank lever 356 in its normal position and maintains the carrying-bar next above in its latched condition. It will be seen, therefore, that all the carrying-bars which are to carry for an entire number, are positioned or unlatched before any of the carrying takes place, and that all of said carrying-bars carry simultaneously and independently when actuated, and not successively and progressively, as in the carrying mechanisms heretofore devised and with which I am familiar. This I regard as a decided advantage, in that the carrying-bars are all positioned or unlatched during the striking off of an entire number on the keys, and all the carrying is performed subsequently thereto. Each wheel and carrying-bar actuated during carrying is independently and simultaneously operated by the same movement, to a uniform extent, and therefore there is ample chance for the parts having opportunity to act. Over-rotation of the wheels during carrying is also guarded against by this means. This feature of having one carrying member unlock or position another for carrying independently of the rotation of any of the registering wheels and carrying teeth, except the first or the actuating one of the lower order, is, so far as I am aware, novel.

*Handle connections for actuating the carrying mechanism.*—The reciprocating frame in which the carrying-bars 354 are mounted may be normally held in a backward position, for instance, and propelled forward to carry for adding, for example, and may be held in a forward position and moved rearwardly to carry for subtracting, for instance. The carrying mechanism may be reciprocated in any suitable way, either by the keys direct, or by a motor, or may be operated by extraneous force. I prefer the latter means, and elect to have the carrying take place after a complete number has been struck upon the keys, and not to have the carrying done upon the registration of each digit of the number. This means of operation has several advantages, in the first place: it makes the key resistance less not to have the carrying done by the keys direct, and also gives the keys uniformity of resistance, which they would not have if they did the carrying. In the next place, the means preferred has advantages over permitting the motor to actuate the carrying mechanism, for the carrying would then have to be done when the keys were depressed, and sufficient time might not be afforded for the purpose. So also, having the motor do the carrying might result in over-rotation of the registering wheels by reason of the velocity of movement of the motor and gearing driven thereby, and this would also require a larger motor of considerably more power. For these reasons I prefer to have the carrying done by the operation of the handle 275, which is a deliberate movement, and which operation must necessarily be gone through to feed the paper, wind the motor, bring the carriage to the starting point, &c. The reciprocating frame 350, 351, 352, and 353 bearing the carrying-bars may be operated to carry from the handle in any suitable way without departing from my invention, but is preferably operated in the present machine by the following means. Pivotally connected to the disk 269, which is rotated to and fro in the arc of the circle by operating the handle 275 as above explained, is a rod 370 arranged adjacent to the rod 286 previously described. This rod passes upwardly and is pivoted to a bar 371, the lower end of which is slotted or forked and is guided by a shaft 372. The bar 371 is arranged adjacent to the fixed side-frame 66 of the machine, and is maintained vertical (Figs. 4, 6, 13, 23, and 24). The said bar at its upper end branches into and forms an open quadrangular part or member 373 having near its upper part two notches directly opposite and on the insides of the vertical limb of the quadrangular part. One or the other of these notches is adapted to engage either one of pins 374 and 375 respectively, carried by the diametrically opposite arms of an inverted T-lever 376 mounted upon the shaft 345 previously referred to (Figs. 4, 23, 24, and 50). When the disk 269 is turned back and forth by operating the handle 275, the rod 370 pulls downwardly the bar 371 and quadrangular part 373. When the said handle and disk 269 immediately thereafter return to their normal position, the aforesaid parts are raised. When the pin 374 of the T-lever 376 is in engagement with its notch in the open quadrangular part 373, and the parts are in their raised position, the principal arm of the T-lever will be deflected toward the rear of the machine (Fig. 23) and will normally maintain such position. As soon as the handle is pulled, the T-lever will now be deflected toward the front of the machine (Fig. 24) by means of the connection described. Upon the parts resuming their normal position, the T-lever will be pushed backwardly to its former position. Thus it will be seen under the assumptions made, that the T-lever is normally toward the rear of the machine, but is, by pulling of the handle, thrown forwardly and then backwardly. If the pin 375 upon the other arm of the T-lever be placed in engagement with the other notch in the quadrangular part 373 (Fig. 4), the principal arm of the T-lever will be normally forward toward the front of the machine, and when the handle is pulled and the quadrangular part drawn downwardly thereby, it will move the principal arm of the T-lever toward the rear of the machine. As soon as the quadrangular part rises by the return movement of the handle, the T-lever will be thrown forwardly to its normal position. The upper end of the T-lever is that which moves the carrying mechanism in one direction or the other, depending upon whether addition or subtraction is to be effected. When the pins of the T-lever are in engagement with one notch of the quadrangular part, say the pin 374 is in its notch, the carrying mechanism will be operated to carry one, for addition, for one or more of the numerical orders; and when the pin 375 for instance, is in engagement with its notch, the mechanism will be set so as to carry one, for subtraction, that is to subtract one from the next higher order.

*Means controlling the carrying mechanism to add or subtract.*—The T-lever 376 may be operated by any means to have its pins thrown in engagement with one or the other notch of the quadrangular part, but is preferably operated for this purpose by shifting the quadrangular part 373 slightly to one side or the other, that is, slightly to the rear or to the front of the machine. This shifting of the quadrangular part is accomplished by the spool or collar 335 previously described, upon the shaft 331 (Figs. 23, 24, and 38). One limb of the quadrangular part 373 engages the spool 335, so that when the knob 334 of the shaft 331 is pulled outwardly or permitted to move inwardly, the quadrangular part will be shifted as aforesaid. This occurs at the same time that the shaft 331 is rotated by the knob 334, to change the clutch 87 from one of its wheels to the other, to reverse the direction of rotation of the printing and registering wheels. Thus it will be seen that the carrying mechanism is reversed in its action at the same time that the registering mechanism proper is reversed in its action. When one of the pins carried by the T-lever engages its notch, the other pin and other end of the T-lever escape the opposite vertical side of the quadrangular part, causing no interference therewith. The pins of the T-lever will not of themselves engage the notches of the quadrangular part by merely shifting the quadrangular part slightly, that is to say, the change from one pin and one notch to the other pin and the other notch cannot be made by merely shifting the quadrangular part as explained, for the reason that when one pin is in engagement with its notch, the other pin is below its notch. This change is made by holding the knob 334 in one or the other position as the case may be, and then pulling the handle 275, which latter moves the quadrangular part 373 up and down and causes the pin which is to be made to engage its notch to ride along its vertical limb of the quadrangular part until its notch is encountered in the passage, when the said pin will snap into its notch and effect the desired engagement, and the other pin will be withdrawn from its notch.

*Appliances actuating the carrying mechanism by handle connections.*—Having shown how the T-lever which operates the carrying mechanism is positioned and operated in one or the other direction to carry, I will now proceed to describe the connections between the T-lever and the carrying mechanism. To the upper end of the T-lever 376 is articulated a link 377, which is in turn articulated to a plate 378 having forward and rearward extension arms, sustained in bearings 379 and 380 mounted upon the left-hand side bar 340 of the fixed frame (Figs. 4, 6, 13, 23, 24, 50, and 56). The plate 378 is by the link 377 moved back and forth by the T-lever. In a slot 381 in the plate 378 works a screw-pin 382ª carried upon the free end of an arm 382 rigidly affixed to a shaft 383, which is supported by uprights 384 and 385 at each end, and extending respectively from and secured to the stationary side-bars 340 and 341 of the fixed frame. The slot 381 has a horizontal part about midway of the plate 378, and an incline part joining another horizontal part near the top of said plate. The shaft 383 has also connected to it arms 386 and 387 rigid to the same and forming therewith a rock-shaft. These arms are connected by means of links 388 and 389 respectively to the uprights 363 and 364, which are secured to the side-bars 350 and 351 of the reciprocating frame, as previously described. When the plate 378 is reciprocated by the T-lever, the pin upon the arm 382 travels along through the slot 381 in said plate, from its initial position (Figs. 23 and 50) with lost motion until it encounters the diagonal or inclined part of the slot, when the plate 378 impels the pin 382ª and arm 382 forward, thereby rotating the shaft 383 so as to swing forwardly the arms 386 and 387, thereby drawing the links 388 and 389 forwardly so as to move forwardly the reciprocating frame 350, 351, 352 and 353 (Figs. 4, 24, 57, and 58.) When the T-lever returns to its former position, the movable frame will be impelled in the opposite direction by the connections described, the screw-pin on arm 382 traversing the slot 381 in the opposite direction, and moving the parts referred to in the reverse of the direction referred to. If the parts are in their initial position to subtract as shown in Fig. 4, where the notch in the quadrangular part is in engagement with the pin 375 of the T-lever, which is normally now in a forward position, and the screw-pin on the end of arm 382 in the rearward horizontal part of the slot 381, and the handle 275 is operated, the T-lever will move rearwardly and impel in that direction the plate 378. When the pin on the arm 382 encounters the incline part of the slot 381 the shaft 383 will be turned in an opposite direction to that first mentioned, and will first move the reciprocating frame 350, 351, 352, and 353 in which the carrying-bars 354 are mounted, rearwardly, or in an opposite direction to that previously described. When the connections referred to are moved in an opposite direction, the reciprocating frame will be impelled in an opposite direction in an evident manner, and will resume its normal position for subtracting.

*Means for holding unlatched the carrying-bars out of carrying position.*—Inasmuch as the carrying is done after the complete number is struck upon the keys, and when the handle is pulled, but not during the operation of the keys, it will not do in the mechanism described, to let the carrying-bars pass at once after being suitably positioned by the carrying-teeth 349 into engagement with the carrying-wheels 347, because this would interfere with the operation of the registering-wheels and carrying mechanism. To obviate this I design to have the carrying-bars when liberated by the connections described through the instrumentality of the carrying teeth 349, drop upon or be still held in their raised position by some suitable means, which will permit said bars to come into engagement with the carrying wheels 347 when the handle 275 is pulled. For this purpose I provide the movable or reciprocating frame of the carrying mechanism with a shaft 390, supported at each end by the side bars 350 and 351 beneath the carrying-bars, and carrying a cam or rest 391 upon which the carrying-bars 354 may drop (Fig. 51) when suitably liberated to carry in the manner hereinbefore set forth.

The shaft 390 passes through the fixed side-bar 340 Figs. 4, 23, 24, and 56, and works in a slot in said bar. It is provided where it protrudes through the side-bar 340 with a right-angle or bell-crank lever 392, the upper end of which is provided with a screw-pin 392ª which bell crank-lever works in a second slot 393 in the plate 378, said slot having an inclined portion and a vertical portion as shown in Figs. 4, 23, 24, and 50. The other end of the bell-crank lever 392 has upon it a pin 394, against which is adapted to impinge a lug 395, extending downwardly from the bottom of the plate 378, so as to operate the said bell-crank lever. Connected to the bell-crank lever 392 by the pin 394 is a link 396 pivotally affixed to a crank arm 397 upon the end of a rock-shaft 398, which protrudes through the slot in the fixed side-bar 340, in which slot works the bar 353 as before described. The shaft 398 has upon it two arms 399 and 400 which support a rod 401 (Figs. 1, 4, 6, 13, 23, 24, 51, 52, 53, 56, 57 and 58). The rod 401 by the means described is adapted to swing in under the carrying-bars, which have not been unlatched by the carrying-wheels, so that when the handle 275 is pulled the possibility of the carrying-bars, which have not been positioned by the carrying mechanism to carry, carrying, is averted (Figs. 52 and 57), and said carrying-bars prevented by any possibility from carrying. The rod 401 comes between the unoperated or raised carrying-bars and the carrying-bars which have fallen upon the cam 391 and made their first drop (Figs. 51, 52 and 57).

*Connections putting the unlatched carrying bars in carrying position.*—Let us suppose that the carrying mechanism is positioned to carry for addition, for instance, (Fig. 23) with the screw-pin 392ª on the upper end of the bell crank lever 392 resting in the vertical part of the slot 393 in plate 378. If the plate 378 be moved forwardly by pulling the operating handle 275 as previously described, the upper end of the bell-crank lever 392 will be moved forwardly and the lower part of the bell-crank lever will be moved rearwardly, drawing upon the link 396 and moving the crank-arm 397 rearwardly, thereby bringing the rod 401 beneath the carrying bars which have remained latched, and above the carrying-bars which have been unlatched. This occurs during the first part of the movement of the plate 378 and handle 275, and during the time the pin 382ª upon the arm 382 is traveling in the upper horizontal part of the slot 381 previously described, and during which there is lost motion between the plate 378 and said arm 382. The plate 378 continues to move forward the upper end of the bell-crank lever 392 until said end is moved downwardly sufficient to escape the vertical part of the slot and encounter the inclined part thereof (Fig. 24). When the bell-crank lever 392 gradually resumes its previous position in traveling up the incline of the slot 393, the rod 401 is finally withdrawn from beneath the carrying-bars 354 when the upper end of the bell-crank lever reaches the top of the inclined part of the slot 393. During the time the upper end of the bell-crank lever 392 is traveling up the incline of the slot 393, the movable frame in which the carrying-bars are mounted is being impelled forward to carry by the pin on the arm 382 encountering the incline part of the slot 381. While the bell-crank lever 392 has its upper end impelled forwardly and downwardly by the forward motion of the plate 378, it is turning the shaft 390 in such a direction as to lower the cam 391, and cause the carrying-bars which have dropped thereon to pass into engagement with the carrying-wheels 347, that is, from the position shown in Fig. 51 to the position illustrated in Figs. 52 and 57. It has just been shown that this movement of the bell-crank lever 392 takes place previous to the movement forward of the movable frame in which the carrying-bars are mounted, consequently the unlatched carrying-bar or bars are allowed to make their second drop and pass into engagement with the carrying-wheels, before the movable frame is impelled forward, that is, from the position shown in Fig. 52 to the position shown in Fig. 57, the former of which views shows the mechanism just previous to carrying, and the latter view illustrates the mechanism during carrying. It will be understood that the movement of the movable frame is of such extent as to move the adding or registering wheels through one tooth, or from one character or digit on said wheel to the next thereon only.

*Raising and relatching the carrying bars after carrying.*—It has been shown that there is lost motion between the plates 378 and the screw-pin on the arm 382 which reciprocates the movable frame in which the carrying-bars are mounted, and that this occurs during the latter part of the forward stroke of the plate 378, as well as during the first part of the stroke of the plate 378. The lost motion during the latter part of the stroke of the plate 378 occurs when the screw-pin on the arm 382 is in the lower horizontal part of the slot 381, consequently the movable frame is not moved forward during the last part of the forward stroke of the plate 378; but during the last part of the forward stroke of the plate 378, the screw-pin on the upper end of the bell-crank lever 392 is still impelled up the incline of the slot 393. This latter movement forces the bell-crank lever to its highest position, and turns the cam 391 upwardly to its most elevated point, slightly above its normal position (see dotted lines in Fig. 53), which operates to raise the carrying-bars, that have been unlatched and passed into engagement with the carrying-wheels. When the carrying-bars are thus raised, the hooks 360 automatically engage the pins 361 on the carrying-bars and latch said bars up in their normal position. The pins 361 on the carrying-bars ride over the curved nose of the hooks 360, pushing said hooks aside, and the gravity of the hook connections together with the aid of the spring 358, causes the hooks to latch over the pins 361. It will be noted that the pin on the upper end of the bell-crank lever 392 does not normally extend to the highest point or end of the slot 393. A further upward movement of the upper end of the bell-crank lever is caused by additional movement of the plate 378, which is for the purpose of raising the cam 391 above its normal position to lift the carrying-bars to their highest point and latch them in place. When the parts are free from restraint they resume their normal positions as set forth. It may be noted that during the latter part of the forward stroke of the plate 378, the rod 401 (Fig. 24) is moved from underneath the unlatched carrying-bars, but it will be remembered that at this time the carrying has already been effected, and forward motion of the movable frame bearing the carrying-bars has ceased by reason of the lost motion above explained, and it will also be remembered that the cam 391 is now moving upwardly so as to catch any carrying-bars which may have been inadvertently unlatched since the bar 401 was moved from beneath the unlatched carrying-bars. During the latter part of the forward stroke of the plate 378, the lug 395 thereon may come against the pin 394 on the bell-crank lever 392 and insure the positive movement of the parts, so that the cam 391 will be raised without fail to its highest position, slightly above normal, to insure the relatching of the carrying-bars.

*Operation of the carrying mechanism in subtraction.*—Now suppose the parts are in position for carrying for subtraction, for instance, as shown in Figs. 4 and 58, the pulling of the handle 275 will move backwardly the plate 378, the pin on the upper end of the bell-crank lever 392 is now normally in the inclined part of the slot 393. The rearward movement of the plate 378 causes the upper end of the bell-crank lever to move downwardly and forwardly in the inclined part of the slot 393, giving to said bell-crank lever the same motion that it had before with reference to addition, and consequently moving the cam 391 downwardly and the rod 401 beneath the unlatched carrying-bars as before. There will be lost motion between the pin on the arm 382 and the slot 381 during the first part of the motion of the plate 378 rearwardly, and no movement of the movable frame until said last-mentioned pin encounters the diagonal or inclined part of the slot 381, when the movable frame in which the carrying-bars are mounted will be impelled rearwardly by the connections previously described. When the plate 378 has been forced to near its extreme rearward limit, the parts referred to will be in the position shown in Fig. 23, with the exception of the T lever 376, quadrangular part 373, and its connections. The further movement of the plate 378 rearwardly brings the pin on the upper end of the bell-crank lever 392 to its highest position to the full limit of the vertical part of the slot 393, and removes the rod 401 from beneath the carrying-bars, and also raises the cam 391 so as to lift the carrying-bars to their highest point, whereupon they will be latched. When the handle 275 returns to its normal position, the plate 378 will be moved forwardly, and the same action will take place as was described with reference to the forward movement of the parts in the position shown in Fig. 23, with the exception that the carrying-bars being now latched, will have no effect on the carrying-wheels, so that the carrying-bars will resume their normal position idly. It will be plain from the foregoing description that correction may be made in the work done by the machine in the manner previously described, even after carrying has been effected.

*Maintaining the carrying mechanism in normal position.*—I have previously referred to the cam 391 resuming its normal position, and also to the plate 378 being normally held in position both for adding and subtracting, and that the screw-pins working in the slots in said plate do not normally rest at either of the extreme ends of said slots. This position of parts is insured by the connection of the quadrangular part with the T-lever, and by the connection of the T-lever with the plate 378, and is also insured by a spring 402 (Fig. 56) which is connected to the upright 363 of the movable frame at one end, and at the other end is secured to the cam 391 in such a way as to maintain said cam in its normal position, as shown in Figs. 51 and 53. The spring referred to not only tends to keep said parts in their normal position, but maintains the bar 401 normally removed from the carrying-bars.

*Devices for automatically unlocking the adding wheels during carrying.*—I have previously explained that the adding wheels are positively locked in position by pawls 79, except when the machine is working in a certain given order and a key is operated, or when the adding-wheels are unlocked to be brought to zero. It will be plain that since the carrying is done by the handle, and no key is operated when the carrying is effected, that the adding-wheels are locked from rotation, so that some means must be devised for the mechanism described to unlock the carrying-wheels when carrying is to be performed. To accomplish this I provide a lever 403 (Figs. 51, 52, 53, 57, 58 and 59) for each carrying bar. These levers are hung upon a shaft 404, so they may swing independently of said shaft and independently of one another. The said shaft 404 is supported at each end in the side frames 340 and 341 of the fixed frame. They each have a pin 405, which is adapted to be engaged by one or the other of two notches 406 and 407 in each of the carrying-bars 354 when the said carrying-bars are permitted to drop the second time (Figs. 52 and 57). The ends of the levers 403 are slotted in two directions, at right-angles to each other. In the slot in the plane of each lever 403 takes the T-end of a lever 408 having a pin 409 thereon (Fig. 60) which rests and plays in the other slot in the levers 403. The levers 408 pass downwardly and are pivotally connected to their respective locking-pawls 79 between the fulcrum 80 and the locking-nose thereof (Fig. 53). When any lever 403 is vibrated, in one or the other direction on its fulcrum 404, by the reciprocation of its carrying bar 354, which has dropped and engaged its respective pin 405 on said lever 403, it bears against the upper end of the lever 408, depresses the same, (the lower end of said lever 403 acting like a cam) and unlocks the gear-wheel of the adding-wheels, as shown by dotted lines in Fig. 53. The parts for adding are in the position shown in Fig. 51. During the first part of the movement of the handle 275 they occupy the position shown in Fig. 52, wherein the notch 407 is in engagement with the pin 405. Further movement of the handle 275 moves forward the reciprocating frame in which the carrying-bars are mounted, and causes the lever 403 to occupy the position shown in Fig. 57, in which position it causes the lever 408 to be depressed and to unlock its pawl 79, as previously described. If the parts are in position, say for substracting (Fig. 58), the carrying-bars 354 will be in such position that when they drop, the notch 406 therein, instead of the notch 407 as previously described, will engage the pin 405 when the handle is pulled and any of the carrying-bars are unlatched. The backward movement of the reciprocating frame, bearing the carrying-bars, will then move the lever 403 in an opposite direction to that shown in Fig. 57, but will depress the lever 408 the same as before, and unlock the pawls 79 automatically, as explained.

General observations.

Where a frictional or non-positive means is employed to keep the adding wheels at zero, the unlocking devices acting in conjunction with the carrying mechanism to unlock the adding-wheels, may be dispensed with.

It will be noted that my adding machine is reversible throughout. Not only can the registering mechanism proper and the carriage be reversed in direction of motion as and for the purposes previously set forth, but the carrying mechanism can also be reversed to carry for addition or subtraction at will.

My carrying mechanism may be used with other forms of adding machines other than that herein described, and I do not wish to limit such mechanism to use with any particular kind of adding machine. And on the other hand, other forms of carrying mechanism may be used with my machine, and I do not wish to confine myself to any particular form of carrying mechanism, except when otherwise stated in my claims.

The motor mechanism, the escapement mechanism, the carriage mechanism, and the carrying and other mechanisms herein set forth, while dependent upon each other to a certain extent in my machine, are independent of each other when broadly considered, and may be replaced with other forms of mechanism without departing from my invention.

Having fully set forth my invention, what I desire to claim and secure by Letters Patent of the United States is—

1. An adding machine having a series of registering mechanisms—one for each numerical order, printing devices recording the numbers registered, a motor impelling said registering mechanisms and printing devices, a carriage determining the numerical order in which the machine is working, and keys controlling said motor and carriage.

2. An adding machine having a series of adding-wheels registering the number added, printing devices, and a shiftable impression-taking device by which the different numbers registered may be printed by said printing devices, and the result of the numbers added and registered upon the adding-wheels may be printed directly from the said adding wheels by shifting said impression-taking device.

3. The combination of registering wheels, printing devices for recording the different numbers registered, keys for operating said registering wheels and printing devices, an impression-taking device traveling widthwise of the machine, a carriage for positioning said impression-taking device widthwise of the machine and determining from which of the printing devices an impression may be taken, a paper-sheet mounted independently of said carriage, and an inking ribbon at the opposite side of said paper-sheet from said printing devices and between the paper-sheet and impression-taking device.

4. The combination of registering wheels, printing devices, keys controlling said registering wheels and printing devices, an impression-taking device traveling widthwise of the machine, and determining from which of the printing devices an impression may be taken, a carriage for positioning said impression-taking device widthwise of the machine, a paper-sheet mounted independently of said carriage, an inking ribbon arranged across the paper-sheet between the impression-taking device and the paper-sheet, and actuating connections for vibrating said ink ribbon transversely of its length for the purpose described.

5. The combination of a series of registering wheels, a series of printing wheels for recording the numbers registered, an impression-taking device traveling widthwise of the machine, a carriage for positioning said impression-taking device widthwise of the machine and determining from which of the printing wheels an impression may be taken, a bulletin sheet, a frame independent of said carriage and maintaining that side of the bulletin sheet away from the printing wheels in view of the operator, keys for operating said registering and printing wheels and carriage, and an inking ribbon at the opposite side of the bulletin sheet from said printing wheels and between the bulletin sheet and the impression-taking device.

6. The combination of a series of registering-wheels, a series of printing-wheels, a carriage determining which of the printing and adding wheels may be operated, an impression-taking device arranged in front of the printing-wheels, a bulletin sheet interposed between the printing-wheels and impression-taking device, an inking means arranged between the bulletin sheet and the impression-taking device, and keys suitably controlling the series of registering and printing wheels, the carriage, and the impression-taking device.

7. The combination of a series of registering-wheels, a motor for impelling the same, keys controlling the motor, and a carriage governed by said keys and determining which of the registering-wheels may be actuated.

8. The combination of a series of registering-wheels, a motor for impelling the same, keys controlling the motor, a carriage governed by said keys and determining which of the registering-wheels may be actuated, a motor-winding mechanism, a handle for said latter mechanism, and connections intermediate the handle and the carriage by which the carriage is brought to the starting point at the same time the motor is wound.

9. The combination of a series of registering wheels, keys controlling the same, a series of carrying members suitably positioned by said registering wheels during the operation of the keys controlling said registering wheels, and a device operated at will actuating the said carrying members to carry after they have been positioned by the registering wheels during the operation of the keys.

10. The combination of a series of registering-wheels, keys controlling the same, a carriage governed by said keys and determining which of the registering-wheels may be actuated, a handle for bringing the carriage to its starting point, a carrying mechanism suitably positioned by the registering-wheels, and connections intermediate the said carrying mechanism and said handle whereby operating the handle brings the carriage to the starting point and causes the carrying mechanism to carry.

11. The combination of a series of registering-wheels, a motor for impelling the same, keys controlling the motor, a carriage governed by said keys and determining which of the registering wheels may be actuated, a motor-winding mechanism, a handle for the motor-winding mechanism, a carrying mechanism suitably positioned by the registering-wheels, and actuating devices connecting the said handle to the carrying mechanism.

12. The combination of a series of registering-wheels, a motor for impelling the same, keys controlling the motor, a carriage governed by the said keys and determining which of the registering-wheels may be actuated, a motor-winding mechanism, a handle for the motor-winding mechanism, connections intermediate the handle and the carriage by which the carriage is brought to the starting point at the same time the motor is wound, a carrying mechanism suitably positioned by the registering-wheels, and actuating devices connecting the said handle to the carrying mechanism.

13. The combination of a series of registering-wheels, a motor for impelling the same, keys controlling the motor, a carriage governed by said wheels and determining which of the registering-wheels may be actuated, a motor-winding mechanism, a handle for said latter mechanism, connections intermediate the carriage and motor-winding mechanism, by which the carriage is brought to the starting point at the same time the motor is wound, printing devices recording the numbers registered, and paper-feeding devices operated by said handle.

14. The combination of a series of registering-wheels, keys controlling the same, printing devices recording the numbers registered, a carrying mechanism suitably positioned by the registering-wheels, and a handle having suitable connections with the paper-feeding devices, and also connections with the carrying mechanism.

15. The combination of a series of registering-wheels, a motor for impelling the same, keys controlling the motor, a motor-winding mechanism, a handle for said motor-winding mechanism, a carrying mechanism suitably positioned by the registering wheels, printing devices recording the numbers registered, paper-feeding devices, and connections intermediate the handle and the paper-feeding devices and carrying mechanism.

16. The combination of a series of registering-wheels, a motor for impelling the same, keys controlling the motor, a carriage governed by said keys and determining which of the registering-wheels may be actuated, a motor-winding mechanism, printing devices recording the numbers registered, paper-feeding devices, a carrying mechanism suitably positioned by the registering-wheels, and a handle having suitable connections with the motor-winding mechanism, the carriage, the paper-feeding devices, and carrying mechanism.

17. The combination of a series of registering-wheels, a series of printing-wheels recording the numbers registered, a carriage determining which of the registering and printing wheels may be actuated, and a handle having suitable connections for bringing the carriage to the starting point and the printing-wheels to zero.

18. The combination of a series of registering-wheels, a series of printing-wheels recording the numbers registered, paper-feeding devices, and a handle having suitable connections for bringing the printing-wheels to zero and actuating the paper-feeding devices.

19. The combination of a series of registering-wheels, a series of printing-wheels recording the numbers registered, paper-feeding devices, a carriage determining which of the registering and printing wheels may be actuated, and a handle having suitable connections for bringing the printing-wheels to zero, the carriage to a starting point, and actuating the paper-feeding devices.

20. The combination of a series of registering wheels, a series of printing-wheels recording the numbers registered, paper-feeding devices, a carrying mechanism suitably positioned by the registering-wheels, and a handle having suitable connections for bringing the printing-wheels to zero, actuating the paper-feeding devices, and operating the carrying mechanism.

21. The combination of a series of registering-wheels, a series of printing-wheels recording the numbers registered, paper-feeding devices, a carrying-mechanism suitably positioned by the registering-wheels, a carriage determining which of the registering and printing-wheels may be actuated, and a handle having suitable connections for bringing the printing wheels to zero, feeding the paper, operating the carrying mechanism, and returning the carriage to the starting point.

22. The combination of registering wheels, a series of printing devices, keys controlling said registering wheels and printing devices, an impression-taking device traveling widthwise of the machine for taking impressions from said printing devices, a carriage for positioning said impression-taking device widthwise of the machine, and determining from which of the printing devices an impression may be taken, a paper-sheet mounted independently of said carriage, an inking ribbon, and a handle having suitable connections for returning the carriage and impression-taking device to the starting point and feeding the inking ribbon.

23. The combination of registering wheels, carrying mechanism, a suitable motor for rotating the registering wheels, printing devices, a carriage for determining which of the registering wheels may be rotated and spacing the printing, and a handle having suitable connections for winding the motor, drawing the carriage to its starting point, feeding the paper, actuating the carrying mechanism, and bringing the printing devices to their zero position.

24. The combination of registering wheels, carrying mechanism, a suitable motor for rotating the registering wheels, printing devices, an inking ribbon, a carriage for determining which of the registering wheels may be rotated and spacing the printing, and a handle having suitable connections for effecting separation of the motive power from the registering wheels, winding the motor, bringing the carriage to its starting point, feeding the paper and inking ribbon, and actuating the carrying mechanism.

25. The combination of registering wheels, a series of printing devices, a hammer for taking impressions from said printing devices, a carriage for determining from which of the printing devices an impression may be taken, and keys controlling the registering wheels, the printing devices, the hammer and the carriage.

26. The combination of registering wheels, a series of printing devices, a hammer for taking impressions from said printing devices, a carriage for determining from which of the printing devices an impression may be taken, paper-feeding devices, keys controlling the registering wheels, the printing devices, the hammer and the carriage, an inking ribbon, and a handle having suitable connections for feeding the inking ribbon and paper.

27. The combination of registering-wheels, type-carrying devices for printing, an impression-taking appliance, a motor impelling the registering-wheels and positioning the type-carrying devices, and keys controlling said motor.

28. The combination of registering wheels, printing devices, a motor for impelling the registering wheels and printing devices, a motor-winding mechanism, keys controlling the motor, paper-feeding devices, and a handle having suitable connections with the motor-winding mechanism and paper-feeding devices.

29. The combination of registering wheels, printing devices, a motor impelling the registering wheels and the printing devices, a motor-winding mechanism, a carriage for spacing the printing, keys controlling the motor and carriage, and a handle having suitable connections with the motor-winding mechanism and the carriage, whereby the carriage may be brought to the starting point and the motor wound by the same operation.

30. The combination of registering wheels, printing devices, a motor impelling the registering wheels and the printing devices, a motor-winding mechanism, a carriage for spacing the printing, keys controlling the motor and the carriage, paper-feeding devices, and a handle having suitable connections with the motor-winding mechanism, paper-feeding devices and carriage.

31. The combination of registering wheels, a series of printing devices, a motor for impelling the registering wheels and printing devices, a motor-winding mechanism, a carriage for spacing the printing, a hammer mounted upon the carriage for taking impressions from any one of said series of printing devices, keys controlling the motor, carriage and hammer, and a handle having suitable connections with the motor-winding mechanism and carriage, whereby the motor may be wound and the carriage brought to the starting point by said handle.

32. The combination of registering wheels, a series of printing devices, a motor impelling the registering wheels and the printing devices, a motor-winding mechanism, a carriage for spacing the printing, a hammer mounted upon the carriage for taking impressions from said printing devices, keys controlling the motor, carriage and hammer, paper-feeding devices, and a handle having suitable connections with the carriage, the motor-winding mechanism and paper-feeding devices.

33. The combination of registering wheels, a series of printing devices, a motor impelling the registering wheels and the printing devices, a motor-winding mechanism, a carriage for spacing the printing, a hammer mounted upon the carriage for taking impressions from said printing devices, keys controlling the motor, carriage and hammer, paper and inking ribbon feeding devices, and a handle having suitable connections with the carriage, the motor-winding mechanism and the paper and inking ribbon feeding devices.

34. The combination of a series of registering-wheels, printing devices, a carriage determining which of the registering wheels may be actuated and spacing the printing, a gear wheel carried by said carriage for imparting rotation to said registering-wheels, and keys governing said carriage and the extent of rotation of said gear wheel.

35. The combination of a series of registering-wheels, a motor for impelling the same, printing devices, a carriage determining which of the registering-wheels may be actuated and spacing the printing, a power wheel carried by the carriage and impelled by the motor, a variable escapement mechanism determining the extent of rotation of the said wheel, and keys governing said escapement and carriage.

36. The combination of a series of registering-wheels, a motor, printing devices, a carriage for determining which of the registering wheels may be actuated and spacing the printing, an axially-moving wheel mounted upon the carriage and sliding upon a shaft rotated by the motor, an escapement mechanism governing the motor and determining the extent of rotation, and keys controlling the escapement.

37. The combination of a series of registering-wheels, printing devices, a carriage determining which of the registering wheels may be actuated and spacing the printing, an axially-moving wheel mounted upon the carriage and sliding upon a shaft which propels it, mechanism determining the extent of rotation of said shaft, and keys controlling said mechanism.

38. The combination of a series of registering-wheels, a series of printing-wheels, means for taking impressions from said printing-wheels, suitably-impelled axially-moving wheels sliding upon a shaft and adapted to rotate said printing and registering wheels, a carriage for propelling the axially-moving wheels in the direction of their axes, and keys controlling the rotation of the aforesaid shaft.

39. The combination of a series of registering-wheels, a series of printing-wheels, arranged upon the same shaft, and means for taking impressions from the printing-wheels, two axially-moving wheels arranged upon a sleeve sliding upon a shaft, a carriage for propelling the said axially-moving wheels in the direction of their axes, a motor for rotating the aforesaid shaft and sleeve, a variable escapement governing said motor, and keys controlling said escapement.

40. The combination of registering wheels bearing suitable characters or type, gear wheels attached thereto, idle wheels meshing with the afore-mentioned gear wheels, an axially-moving wheel adapted to mesh with said idle wheels, a carriage for propelling the axially-moving wheel in the direction of its axis, and keys controlling the carriage and the rotation of the axially-moving wheel.

41. The combination of a series of registering-wheels, a series of printing-wheels, characters or type on the peripheries of said registering and printing wheels, a gear wheel attached to each of said wheels, idle wheels meshing into said gear wheels, two axially-moving wheels for rotating said idle wheels, a carriage for propelling said axially-moving wheels in the direction of their axes, and keys controlling said carriage and the rotation of said axially-moving wheels.

42. The combination of a series of registering-wheels, a series of printing-wheels, gear wheels attached to said registering and printing wheels idle wheels meshing with said gear wheels, two axially-moving wheels each meshing with the corresponding idle wheel of each series of idle wheels, a sleeve upon which said axially-moving wheels are mounted, a shaft upon which said sleeve slides, a carriage impelling said sleeve longitudinally, a motor and suitable gearing rotating said shaft and sleeve, an escapement shaft suitably geared to said motor, an escapement governing said shaft and motor, and keys controlling said escapement, motor and carriage.

43. The combination of a series of registering-wheels, a series of printing-wheels loosely arranged upon the same shaft, two axially-moving wheels each adapted to rotate the corresponding wheels of the printing and registering wheels, a sleeve upon which said axially-moving wheels are mounted, a shaft on which said sleeve slides, a carriage impelling said sleeve longitudinally, a motor and suitable gearing rotating said shaft and sleeve, an escapement shaft suitably geared to said motor, an escapement governing said shaft and motor, keys controlling said escapement, motor and carriage, a motor-winding mechanism, and a handle having suitable connections with the motor-winding mechanism and carriage, whereby the motor will be wound and the axially-moving wheels returned to their starting point along the said shaft.

44. The combination of a series of registering-wheels, a motor for rotating the same, an escapement controlling the motor, a carriage determining which of the registering-wheels may be actuated, a carriage-impelling motor, an escapement governing the carriage-impelling motor, keys actuating both of said escapements, and a handle having suitable connections with the motor and with the carriage, whereby the two motors may be wound and the carriage returned to a starting point by the operation of said handle.

45. The combination of registering-wheels, a motor, gear wheels intermediate the motor and the registering wheels for rotating the same, a variable escapement governing the motor, keys controlling said escapement and reversing means for changing the direction of rotation of the gear wheels rotating the registering-wheels, whereby the machine may be made to add or subtract at will.

46. The combination in a registering machine, of registering wheels having suitable gearing, a motor, two trains of gearing intermediate the motor and the gearing for the registering wheels, a clutch adapted to be thrown into engagement with one or the other of said trains of gearing to effect rotation of the gearing of the registering-wheels, and operating means for said clutch extending upon the outside of the machine within reach of the operator as a means for reversing the direction of rotation of the registering wheels to add or subtract at will.

47. The combination of registering-wheels, printing wheels having the digits thereon repeated in two series in reverse order, a motor, gear wheels intermediate the motor and the registering-wheels for revolving the latter, a variable escapement controlled by the keys and also geared to said motor independently of the registering-wheels, and reversing means for changing the direction of rotation of the gear wheels intermediate the motor and the registering and printing wheels.

48. The combination of registering-wheels having the digits thereon repeated twice in regular succession, printing wheels having the digits thereon repeated twice in reverse order, said registering and printing wheels being arranged upon the same shaft, a motor, gear wheels intermediate the motor and the registering wheels for revolving the same, a variable escapement controlled by keys geared to said motor independently of the registering wheels, reversing means for changing the direction of rotation of the gear wheels intermediate the motor and the registering and printing wheels, and a shiftable impression-taking device normally co-operating with the printing wheels, whereby the result registered may be printed directly from the registering wheels.

49. The combination of registering-wheels, an axially-moving wheel for revolving the same, a carriage impelling the axially-moving wheel in the direction of its axis, a shaft rotating said axially-moving wheel but upon which said axially-moving wheel may slide, a motor, a train of gearing between said motor and said shaft, a clutch upon said shaft suitably operated, by which the direction of rotation of the shaft may be changed, a variable escapement mechanism geared to the motor and driven always in the same direction, and key controlling the escapement mechanism.

50. The combination of registering-wheels, printing wheels as described, two axially-moving wheels for revolving said registering and printing wheels, a sleeve connecting the axially-moving wheels, a carriage impelling the axially-moving wheels in the direction of their axes, a shaft rotating said axially-moving wheels but upon which said axially-moving wheels may slide, a motor, a train of gearing between said motor and said shaft, a clutch upon said shaft suitably operated, by which the direction of rotation of the shaft may be changed, and keys controlling the escapement mechanism.

51. The combination in a calculating machine of loosely mounted registering wheels, pawls normally locking said wheels, keys controlling said registering wheels, and actuating appliances intermediate the keys and pawls, whereby said pawls will be unlocked by the operation of said keys from said registering wheels independently of their rotation.

52. The combination of a series of registering wheels, keys suitably controlling the same, pawls normally locking said registering wheels, a carriage determining which of the registering wheels may be actuated, and an unlocking means for said pawls mounted upon the carriage and operated by said keys to unlock the registering wheel, corresponding to the numerical order in which the machine is working.

53. The combination of a series of registering wheels, keys suitably controlling the same, pawls normally locking said registering wheels, a carriage determining which of the registering wheels may be actuated, a sliding cam, and a shaft upon which said cam is mounted, which said shaft is actuated by the keys and which cam is positioned by the carriage and adapted to impinge against and unlock the respective locking pawls from the registering wheels.

54. The combination in a calculating machine, of loosely mounted registering wheels, loosely mounted printing wheels, pawls normally locking said registering and printing wheels, keys controlling both the registering and the printing wheels, and actuating appliances intermediate the keys and pawls, whereby said pawls will be unlocked by the operation of said keys from said registering and printing wheels independently of their rotation.

55. The combination of a series of registering wheels, a series of printing wheels, keys suitably controlling both of the same, locking pawls for said registering and printing wheels, a carriage determining which of the registering and printing wheels may be actuated, and unlocking means for said pawls actuated by the keys and positioned by the carriage to unlock the respective corresponding printing and registering wheels.

56. The combination of a series of registering wheels, a series of printing wheels, keys suitably controlling both of the same, locking pawls for said registering and printing wheels, a carriage determining which of said registering and printing wheels may be actuated, two cams upon a sleeve controlled by said carriage and sliding upon a shaft actuated by the keys, the said cams impinging against the respective locking pawls of the printing and registering wheels to unlock the same when the keys are operated.

57. The combination of registering wheels, a motor for rotating the same, a variable arresting mechanism for controlling said motor, a toothed wheel for restraining the rotation of the motor, a detent engaging the teeth of said toothed wheel, and keys for operating the said detent and governing the arresting mechanism.

58. A variable escapement for a registering machine, consisting of a shaft, a motor driving the same, toothed gearing upon said shaft, traveling toothed gearing adapted to be suitably thrown in engagement and mesh with the teeth of said toothed gearing, stops for limiting the travel of the said traveling toothed gear, and appliances for positioning the stops and unlocking the motor.

59. A variable escapement for a registering machine, consisting of a shaft, a motor revolving the same, gearing upon said shaft, a series of vibrating levers each provided with a traveling rack adapted to be thrown in and out of mesh with said gearing, stops for limiting the travel of the racks and arranged to permit the desired rotation to register the required number, and means for unlocking the motor when the racks are thrown into engagement with said gearing.

60. A variable escapement for a registering machine, consisting of a shaft, a motor driving the same, gearing upon said shaft, a series of vibrating levers, each provided with a traveling rack adapted to be thrown in and out of mesh with said gearing, a key for each lever to put the racks in and out of mesh with the said gearing, stops for limiting the travel of the racks and arranged to permit the desired rotation to register the required number, and means for unlocking the motor when the keys are operated.

61. A variable escapement for a registering machine, consisting of a shaft, a motor driving the same, gearing upon said shaft, a series of vibrating levers each provided with a traveling rack, a key for each lever, a plate at the lower end of said vibrating levers, with a slot having an inclined and a vertical part, and a pin on each key working in the slot in its respective plate, and normally resting in the inclined part thereof, stops for limiting the travel of the respective racks, and a locking pawl having suitable connections with the keys, whereby it unlocks the motor when the keys are depressed.

62. The combination of a series of registering wheels, printing devices, an impression-taking means, a motor for rotating the registering wheels and positioning the printing devices, an escapement governing the motor, key-operated appliances for setting the impression-taking means, and connections intermediate said appliances and the escapement, whereby the printing devices will be tripped by the escapement mechanism to print the number registered, for the purpose set forth.

63. The combination of a series of registering wheels, printing wheels, a motor for rotating the registering and printing wheels, an escapement governing the motor, keys controlling the escapement, a bulletin sheet arranged over the printing wheels, a printing hammer upon the opposite side of the bulletin sheet from the printing wheels, a vibrating inking ribbon arranged between the bulletin sheet and said printing hammer, connections intermediate the keys and printing hammer and inking ribbon by which the inking ribbon and printing hammer will be set by the operation of the keys, and appliances intermediate the printing hammer and the escapement, whereby the printing hammer will be tripped to print the number registered by the escapement mechanism, for the purpose set forth.

64. The combination of a series of registering wheels, a series of printing wheels, a motor for rotating the registering and printing wheels, an escapement governing the motor, a carriage determining which of the printing and registering wheels may be actuated, a bulletin sheet arranged over the printing wheels, a vibrating inking ribbon arranged between the bulletin sheet and a printing hammer mounted upon the carriage, keys controlling the escapement, carriage, inking ribbon, and printing hammer, and tripping appliances intermediate the printing hammer and escapement.

65. The combination of registering wheels, printing wheels, a motor for rotating said wheels, an impression-taking device, keys for setting the impression-taking device, a tripping mechanism for the impression-taking device, and a motor escapement governed by the keys and controlling the impression-taking device, said escapement consisting of a traveling means carried by vibrating levers, one for each number key, which traveling means actuates said tripping device at the limit of motion, a zero key having a corresponding vibrating lever, and a stationary escapement device carried thereby, and connections intermediate the tripping mechanism and keys and carried by said vibrating lever, whereby the tripping mechanism will be actuated by the movement of the zero key direct.

66. The combination of registering wheels, a traveling carriage for determining which of the registering wheels may be rotated, keys controlling the registering wheels and carriage, and reversing means for changing the direction in which the keys controlling the registering wheels cause the carriage to travel.

67. The combination of registering wheels a carriage determining which of the registering wheels may be actuated, a spindle controlled by finger keys, a gear wheel carried thereby, and two racks upon said carriage with either of which the said gear wheel may be caused to mesh at will at diametrically opposite parts of said wheel, whereby the direction of travel of the carriage may be changed at will.

68. The combination of registering wheels a carriage determining which of the registering wheels may be actuated, a motor impelling said carriage, keys controlling the carriage, and a reversing means for changing the direction in which the motor impels the carriage.

69. The combination of registering wheels a carriage determining which of the wheels may be actuated, a spindle impelled by a motor for propelling said carriage, two racks upon said carriage, a spur wheel upon said shaft adapted to engage one or the other of said racks at diametrically opposite points, an escapement for said spindle, finger keys governing said escapement, and means for placing said spur wheel into mesh with one or the other of said racks, for the purpose described.

70. The combination of a series of registering wheels, printing devices, a carriage governing the printing devices and determining which of the registering wheels may be actuated, keys controlling said carriage, and reversing means for changing the direction of travel of the carriage.

71. The combination of registering wheels a carriage determining which of the registering wheels may be actuated, a handle having a uniform range of movement, and actuating appliances intermediate said handle and carriage, whereby the carriage may be brought to the starting point in whatever position it is by the uniform motion of the said handle.

72. The combination of registering wheels a carriage determining which of the registering wheels may be actuated, a bell-crank lever suitably connected to said carriage, and a handle having suitable means adapted to impinge against said bell-crank lever during its travel and restore the carriage to its starting position.

73. The combination of registering wheels a suitable motor for rotating the registering wheels, keys controlling the motor, a handle having a uniform range of movement, and motor-winding mechanism intermediate the handle and the motor and constructed to store into said motor by the uniform movement of the handle the variable amount of energy expended by the motor.

74. The combination of registering wheels a suitable motor for rotating the registering wheels, keys controlling the motor, a handle having a uniform range of movement, and motor-winding mechanism intermediate the handle and the motor and provided with a flexible connection whereby the motor will be wound by the uniform movement of the handle to an extent equal to the power expended by the motor.

75. The combination of registering wheels a suitable motor for rotating the registering wheels, a handle moved back and forth, a spool rotated to and fro thereby through the instrumentality of suitable connections, and a flexible connection between said motor and said spool, for the purpose set forth.

76. The combination of registering wheels a suitable motor for rotating the registering wheels, positive gearing intermediate the motor and the registering wheels, a pawl and ratchet connection between the motor and said gearing, a drum for said motor, a flexible connection adapted to be wound upon and unwound from said drum, and a handle with suitable connections for unwinding said flexible connection from the drum to wind the motor 77. The combination of registering wheels a carriage determining which of the registering wheels may be actuated, a motor impelling said carriage through the instrumentality of a suitable spindle an escapement governing the spindle, said escapement consisting of a ratchet wheel fixed to said spindle, a movable spring-actuated ratchet wheel adjacent thereto having a limit of motion equal to one step of the carriage, a pawl normally engaging the movable ratchet wheel, and keys having suitable connections for vibrating said pawl back and forth to feed the carriage step by step.

78. The combination of a series of registering wheels, arranged side by side upon a shaft, a bar normally out of engagement therewith for aligning said wheels to maintain them in co-incident radial position, a motor for rotating said registering wheels, an escapement for said motor controlled by finger keys, and connections intermediate the escapement and said bar by which the bar will be thrown against the wheels to align them after the machine has done its work.

79. The combination of a series of registering wheels, arranged side by side upon a shaft, printing wheels similarly arranged upon the same shaft, idle-wheels intermediate said wheels and power-transmitting wheels, a bar normally out of engagement therewith for aligning said idle-wheels to maintain them in co-incident radial position, and connections for actuating said bar and throwing it against said idle wheels to thereby align the printing and registering wheels after the machine has done its work.

80. The combination in a calculating machine, of registering devices a series of printing-wheels loosely journaled, a pawl for each printing-wheel having a notched rounded end, two pins on each of said printing-wheels, one normally engaging the notch in its pawl to lock the printing-wheels at zero, gearing for said printing-wheels loosely mounted upon a shaft, keys controlling said gearing and unlocking said pawls, and mechanism for returning said printing-wheels to zero when suitably operated and causing one of said pins to ride over the curved ends of said pawls and automatically lock said printing wheels.

81. The combination in a calculating machine, of registering-wheels a motor and suitable gearing rotating the registering-wheels, reversing means for said gearing to change the direction of rotation, a series of printing-wheels loosely journaled, and revolved by said motor and gearing, a pawl for each printing-wheel having a notched end and rounded at both sides of the notch, two pins on each printing-wheel, one normally engaging said notch to lock the printing-wheels at zero, keys controlling the motor and gearing and unlocking said pawls, and mechanism for returning said printing-wheels to zero when rotated in either direction and causing said pins to ride over the curved ends of said pawls and automatically lock said printing-wheels.

82. The combination in a calculating-machine, of registering devices, a series of printing wheels loosely journaled, gearing loosely mounted upon a shaft for rotating the said wheels, pawls normally locking said wheels at zero, keys controlling said gearing and unlocking said pawls from said wheels independently of their rotation, a longitudinally movable key carried by said shaft and provided with suitable pins adapted to engage pins upon said loosely-mounted gearing when properly operated, and manually-operated means for rotating said shaft and throwing the pins of said latter mentioned key in the path of the pins upon said gearing, to bring said printing-wheels to zero.

83. The combination in a calculating machine, of registering devices loosely-mounted printing wheels recording the numbers registered, pawls normally locking said wheels, keys controlling said printing wheels, and actuating appliances intermediate the keys and the pawls, whereby said pawls will be unlocked by the operation of said keys from said printing wheels independently of their rotation.

84. The combination in a calculating machine, of registering devices, loosely-mounted printing wheels recording the numbers registered, pawls normally locking said wheels at zero, keys controlling said printing wheels and unlocking said pawls independently of the rotation of the printing wheels, manually operated mechanism for bringing said wheels to zero, and automatic means for locking said wheels at zero.

85. The combination of a series of registering-wheels loosely mounted, gear wheels therefor also loosely mounted, a key in a shaft having suitable pins thereon and capable of longitudinal movement, pins upon said gear wheels normally without the path of the pins upon said key, a manually-operated means for moving the key longitudinally to throw its pins in the path of the pins on said gear wheels, and actuating mechanism operated at will for rotating said shaft to bring said registering-wheels to zero.

86. The combination of a series of registering wheels loosely mounted, pawls normally locking said wheels, keys, appliances operated by the keys to unlock the respective pawls, actuating means for unlocking said pawls at the will of the operator, and manually-operated mechanism for bringing said wheels to zero after being unlocked.

87. The combination of a series of registering-wheels loosely mounted upon a shaft, pawls therefor positively locking said wheels against rotation, actuating means for unlocking said pawls at the will of the operator, manually-operated mechanism for bringing said wheels to zero after being unlocked, and fingers adapted to be thrown into engagement with a suitably notched disk carried by said wheels, whereby the registering-wheels after being brought to zero will be arrested thereat.

88. The combination of a series of registering-wheels loosely mounted upon a shaft, pawls therefor positively locking said registering-wheels against rotation, manually-operated means for unlocking said pawls and bringing said registering-wheels to zero, a suitably notched disk carried by each registering-wheel, fingers adapted to be thrown into engagement with each of said notched disks, and connections between said fingers and the manually-operated means for unlocking the said pawls, whereby the fingers will be thrown in contact with said notched disks by manually operating the pawl-unlocking means, to arrest the registering-wheels at zero.

89. The combination of a series of registering-wheels, a series of printing-wheels, gear wheels for both the registering and printing wheels loosely mounted upon a shaft, a handle having connections and gearing for rotating said shaft each time the handle is pulled, restoring means for bringing the printing-wheels to zero each time the handle is operated and the shaft rotated, and a finger piece for causing the registering-wheels also to be brought to zero at will when said handle is operated.

90. The combination of a series of registering-wheels, a series of printing-wheels, gear wheels therefor loosely mounted upon a shaft, a handle having connections and gearing for rotating said shaft each time the handle is pulled, a key seat in said shaft having therein two keys with pins extending from the same, one key operating in connection with the printing-wheels and the other in connection with the registering-wheels, pins upon the gear wheels normally out of the path of the pins upon the keys, manually-operated means for throwing the pins upon the key of the printing-wheels in the path of the pins upon the gear wheels thereof when the handle is pulled, and connections operating at will the other key to throw its pins in the path of the pins upon the gear wheels of the registering-wheels.

91. The combination with a registering machine, of printing wheels, gearing for revolving the same, a carriage for spacing the printing, keys governing the carriage and gearing, and manually-operated means for effecting a separation of said gearing and printing-wheels, and restoring mechanism operated at will for bringing said printing-wheels to zero after the aforesaid separation has been effected.

92. The combination of a series of registering-wheels loosely mounted, a series of printing-wheels also loosely mounted, two axially-moving wheels each revolving the corresponding wheel of the registering and printing wheels, a carriage positioning the axially-moving wheels and determining which of the printing and registering wheels may be actuated, keys governing said carriage and the rotation of said axially-moving wheels, manually-operated mechanism for effecting a separation of said axially-moving wheels and the registering and printing wheels, and restoring means for bringing the printing and registering wheels to zero after the separation has been effected.

93. The combination in a registering and recording machine, of registering wheels and printing wheels, a suitable motive power for rotating said registering and printing wheels, a movable frame in which said motive power is mounted, manually-operated mechanism for actuating the movable frame to separate the motive power from the printing and registering wheels, and actuating means for restoring said printing and registering wheels to zero at the will of the operator.

94. The combination of a series of registering-wheels, printing-wheels, a printing device for taking an impression therefrom, axially-moving wheels for revolving said registering and printing wheels, a carriage determining which of the registering-wheels may be actuated and spacing the printing, a shaft for rotating said axially-moving wheels and along which said wheels slide, keys controlling said carriage and the rotation of said axially-moving wheels, a movable frame upon which said shaft is mounted, actuating means for operating the movable frame to throw the axially-moving wheels out of mesh with the registering and printing wheels, and manually-operated mechanism for bringing said registering and printing wheels to zero after the separation has been effected.

95. The combination of a series of registering-wheels, an axially-moving wheel for revolving said registering-wheels, a carriage determining which of the registering-wheels may be actuated, a shaft for rotating said axially-moving wheel and along which said wheel slides, a motor for impelling said shaft and suitably geared thereto, keys controlling said carriage and motor, a movable frame in which said motor and shaft are mounted, actuating means for effecting a separation of said axially-moving wheel and registering-wheels by operating the movable frame, and manually-operated mechanism for bringing the registering-wheels to zero.

96. The combination of a series of registering-wheels, an axially-moving wheel for revolving said registering-wheels, a carriage determining which of the registering-wheels may be actuated, a shaft for rotating said axially-moving wheel and along which said wheel slides, a motor for impelling said shaft, and suitably geared thereto, an escapement for said motor, keys controlling said carriage and motor, a movable frame in which said motor, shaft, and escapement are mounted, actuating means for said movable frame effecting a separation of said axially-moving wheel from the registering-wheels, and manually-operated mechanism for bringing the registering-wheels to zero.

97. The combination of a series of registering-wheels, a series of printing-wheels, a device for taking an impression therefrom, two axially-moving wheels each revolving the corresponding registering and printing wheel, a carriage determining which of the registering and printing wheels may be actuated and spacing the printing, a shaft upon which said axially-moving wheels are mounted, a sleeve connecting said axially-moving wheels and along which shaft said sleeve slides, a motor for impelling said shaft, an escapement for said motor, keys controlling said carriage and escapement, a movable frame in which said shaft, motor, and escapement are mounted, manually-operated means for actuating said movable frame to effect a separation of said axially-moving wheels from the registering and printing wheels, and restoring mechanism for thereafter bringing the registering and printing wheels to zero at the will of the operator.

98. The combination with a registering machine, of a series of loosely-mounted printing-wheels, a key resting in a seat in a shaft and having suitable pins normally out of the path of pins upon the gear wheels for rotating said printing-wheels, an impression-taking device adapted to print from said printing-wheels, a motor having suitable gearing for actuating said printing-wheels, a carriage determining which of the printing-wheels may be actuated, a movable frame in which the motor and gearing is mounted, keys controlling the motor and carriage, manually-operated mechanism for actuating the movable frame to effect a separation of the motor-gearing and the gearing of the printing-wheels, automatic means for shifting the pins on said key in the path of pins on the printing-wheel gears by the operation of said movable frame, and connections for rotating the shaft carrying said key whereby the printing-wheels may be brought to zero.

99. The combination in a registering machine of registering wheels, a suitable motive power, an oscillating frame in which said motive power is mounted, keys controlling said motive power to position the registering wheels, a handle having suitable connections for operating said oscillating frame to disengage the motive power from the registering wheels, stops limiting the movement of said oscillating frame, and manually-operated mechanism for bringing the registering wheels to zero after such disengagement.

100. The combination of a series of registering-wheels, an axially-moving wheel adapted to revolve each of the same *seriatim*, a shaft upon which said axially-moving wheel slides, a carriage positioning said axially-moving wheel and determining which of the registering-wheels may be actuated, keys controlling said carriage and the revolution of said axially-moving wheel, a movable frame in which said shaft is mounted, fixed ways in which said carriage travels, and a swinging connection between said shaft and said carriage.

101. The combination of a series of registering-wheels, a series of printing-wheels, two axially-moving wheels for revolving the same, a carriage impelling said axially-moving wheels in the direction of their axes, a shaft upon which said wheels slide, a motor rotating said shaft, an escapement for the motor, a movable frame in which the motive power and escapement are mounted, keys governing the carriage and escapement, a motor-winding mechanism, and a handle having suitable connections with the carriage and with said movable frame, and also with the motor-winding mechanism, whereby the registering and printing wheels will be brought to zero, the carriage to its starting point, and the motor wound.

102. The combination of registering wheels, of printing-wheels recording the numbers registered, a geared motive power suitably controlled for positioning the printing and registering wheels, a movable frame in which said motive power is mounted, a handle for operating the movable frame, paper-feeding devices and connections between said movable frame and the paper-feeding devices, whereby the paper will be fed by the actuation of said movable frame.

103. The combination of registering wheels, of printing-wheels recording the numbers registered, a geared motive power suitably controlled for positioning the printing and registering wheels, a movable frame in which said motive power is mounted, a handle for actuating the movable frame, ink-ribbon-feeding devices and connections between said movable frame and the ink-ribbon-feeding devices, whereby the inking ribbon will be fed by the actuation of said movable frame.

104. A calculating machine having a series of registering wheels provided with printing characters, printing devices for recording the different numbers registered, impression-taking mechanism for printing, and a lip or ridge adjacent to each of the printing characters upon said registering wheels, whereby a line may be drawn in printing from said registering wheels.

105. The combination of a series of registering wheels, keys controlling same, a carrying mechanism, the members which are set to carry during the operation of the keys, and means for actuating the carrying members to carry after the operation of the keys and after all the set carrying members have been set.

106. The combination of a series of carrying members, a series of registering wheels provided with suitable carrying teeth, connections between the said carrying members, whereby one carrying member may position another when the latter's corresponding registering wheel is one step removed from carrying position, and means for actuating the members to carry after they have been positioned.

107. The combination of a series of carrying members, a series of registering wheels provided with suitable carrying teeth, latches for holding the said carrying members out of carrying position, devices mounted upon the carrying members and intermediate the said latches and the carrying teeth, whereby one carrying member may unlatch another when the latter's corresponding registering wheel is one step removed from carrying position, and means for actuating the carrying members to carry after they have been unlatched.

108. The combination of a series of carrying-bars, a series of registering wheels provided with suitable carrying teeth, latches for maintaining said carrying-bars out of carrying position, a bell-crank lever carried by each of said carrying-bars and suitably connected to the latch for the bar of the next higher order, whereby one carrying bar, when unlatched, may unlatch another, when the latter's corresponding registering wheel is one step removed from carrying position, and means for actuating the carrying-bars to carry after they have been unlatched.

109. The combination with registering devices of a carrying mechanism comprising a series of carrying mechanisms co-operating with said registering devices, locking means for normally holding said carrying members out of carrying position, carrying teeth operated by the registering devices and actuating respectively said locking means to suitably position the carrying members to carry, actuating mechanism for causing the carrying members to carry after being suitably positioned by the carrying teeth, and additional locking means for locking the non-positioned carrying members out of carrying position when the latter mechanism is actuated.

110. The combination with registering devices of a carrying mechanism comprising a series of carrying bars co-operating with the registering devices, locking means for normally holding said carrying bars out of position, carrying teeth operated by the registering devices actuating respectively said means to suitably position the carrying bars to carry, actuating mechanism for reciprocating the carrying bars to carry after being suitably positioned by the carrying teeth, a rod adapted to pass beneath the unlatched carrying bars and prevent the same from accidentally carrying, and connections intermediate said rod and the latter mechanism, whereby the rod is operated by the actuation of said mechanism.

111. A carrying mechanism comprising a series of carrying members co-operating with registering devices and normally held out of carrying position, carrying teeth operated by the registering devices positioning said carrying members to carry, actuating mechanism for causing the carrying members to carry after being suitably positioned by the carrying teeth, locking means brought into requisition by the actuating mechanism to serve as an additional safe-guard against the non-positioned carrying members carrying when said mechanism actuates said carrying members, and appliances also operated by the actuating mechanism restoring said parts to their normal position.

112. The combination of a series of registering members normally locked against rotation, a series of carrying members adapted to co-operate therewith, and connections between the carrying members and the locking means for the registering members, whereby the registering members will be unlocked when the carrying members effect carrying.

113. The combination of a series of registering-wheels, pawls for locking said registering-wheels against rotation, a series of carrying bars adapted to co-operate with the registering-wheels, locking means for normally holding said carrying bars out of carrying position, suitable connections therefor, carrying teeth for operating said connections to position said bars to carry, unlocking devices intermediate the locking pawls and the carrying bars normally disengaged by the carrying bars but connected therewith when said bars are positioned to carry, and actuating mechanism for reciprocating said bars, whereby the registering-wheels will be unlocked and the carrying effected.

114. The combination of a series of registering-wheels, pawls for locking said registering-wheels against rotation, a series of carrying members adapted to co-operate with the registering-wheels, locking means for normally holding said carrying members out of carrying position, suitable connections therefor, carrying teeth for operating said connections to position said members to carry, devices intermediate the locking pawls and the carrying members normally disengaged by the carrying members but connected therewith when said members are positioned to carry, actuating mechanism for causing the carrying members to unlock the pawls and carry after being suitably positioned by the carrying teeth, and additional locking means brought into requisition by the latter mechanism to prevent accidental carrying of the non-positioned carrying members and the accidental unlocking of the corresponding registering-wheels.

115. The combination with registering wheels of a carrying mechanism comprising a series of carrying bars co-operating with said registering-wheels, locking means normally holding said bars out of carrying position, carrying teeth operated by the registering-wheels actuating said locking means to suitably position the carrying bars to carry, actuating mechanism for reciprocating the carrying bars to carry after being suitably positioned, and a handle for operating said mechanism independently of the registering mechanism proper.

116. The combination with registering devices of a carrying mechanism comprising a series of carrying members adapted to co-operate with said registering devices, locking means normally holding said carrying members out of carrying position, carrying teeth operated by the registering devices, to unlock the carrying members, a rest for holding the carrying members out of carrying position after being unlocked, and actuating mechanism for operating said rest to bring the carrying members into carrying position and for actuating said carrying members to carry.

117. The combination with registering wheels of a carrying mechanism comprising a series of carrying bars co-operating with the registering-wheels, a latch normally locking said carrying bars out of carrying position, carrying teeth operated by the registering-wheels unlocking said latches, a rest for holding the carrying bars out of carrying position after being unlocked, actuating mechanism for reciprocating said carrying bars to carry, and a handle having suitable connections with the said rest and actuating mechanism, whereby the carrying bars will be brought into carrying position and carrying effected by the operation of said handle.

118. The combination of a series of registering-wheels, a series of carrying bars co-operating therewith, a reciprocating frame in which said bars are mounted, a fixed frame carrying said reciprocating frame, a rock-shaft mounted upon the fixed frame and having arms at each end connected with the reciprocating frame at each side, and a handle having suitable connections with said rock-shaft, whereby the movement of the handle will reciprocate said movable frame to actuate the carrying bars for carrying.

119. The combination of a series of registering-wheels, a series of carrying bars co-operating therewith, a reciprocating frame in which said bars are mounted, a fixed frame carrying said reciprocating frame, latches for said carrying bars having suitable connections operated respectively by carrying teeth for unlocking said carrying bars, a rest upon which said carrying bars fall after being unlocked, said latches and rest being carried by said reciprocating frame, actuating mechanism for moving the reciprocating frame and operating the carrying-bar rest, and a handle for operating said actuating mechanism.

120. The combination with a registering machine, of a series of carrying bars normally held from carrying position, a reciprocating frame in which said bars are mounted, a slotted plate, and connections intermediate said slotted plate and reciprocating frame for actuating said reciprocating frame in one or the other direction to add or subtract at will.

121. The combination with a registering machine, of a series of carrying bars normally held from carrying position, a reciprocating frame in which said bars are mounted, a slotted plate, operating connections intermediate said slotted plate and reciprocating frame, a T-lever suitably attached to said slotted plate, and actuating means maintaining the T-lever in either one of two opposite positions and adapted to operate the slotted plate in reverse directions, and thereby to move the reciprocating frame and carrying bars in one or the other direction to add or subtract.

122. The combination with a registering machine, of a series of carrying bars normally held from carrying position, a reciprocating frame in which said bars are mounted, a slotted plate, operating connections intermediate said slotted plate and reciprocating frame, a T-lever suitably attached to said slotted plate, and a member or members adapted to engage one or the other opposite arms of said T-lever and maintain and actuate said T-lever oppositely, whereby the slotted plate, its connections and the carrying bars will be moved in one or the other direction to add or subtract.

123. The combination of a series of registering-wheels, a series of carrying bars co-operating therewith, a reciprocating frame in which said bars are mounted, a fixed frame carrying said reciprocating frame, latches for said carrying bars having suitable connections operated respectively by carrying teeth for unlocking said carrying bars, a rest upon which said carrying bars fall after being unlocked, said latches and rest being carried by said reciprocating frame, a rock-shaft mounted upon the fixed frame and having arms at each end connected with the reciprocating frame at each end, a plate having slots therein as described in which work pins connected with said rock-shaft and rest, and suitable actuating means for reciprocating said slotted plate to vibrate the reciprocating frame and operate the carrying-bar rest.

124. The combination of a series of registering-wheels, a series of carrying bars co-operating therewith, a reciprocating frame in which said bars are mounted, a fixed frame carrying said reciprocating frame, latches for said carrying bars having suitable connections operated respectively by carrying teeth for unlocking said carrying bars, a rest upon which said carrying bars fall after being unlocked, said latches and rest being carried by said reciprocating frame, a rock-shaft having arms at each end connected with the reciprocating frame, said rock-shaft being mounted upon the fixed frame, a plate having slots therein as described in which work pins connected with said rock-shaft and rest, and a handle having suitable connections for reciprocating said slotted plate at the will of the operator and independently of power derived from other mechanism of the machine.

125. The combination of a series of registering-wheels, a series of carrying bars co-operating therewith, a reciprocating frame in which said bars are mounted, a fixed frame carrying said reciprocating frame, latches for said carrying bars having suitable connections operated respectively by carrying teeth for unlocking said carrying bars, a rest upon which said carrying bars fall after being unlocked, said latches and rest being carried by said reciprocating frame, a rock-shaft mounted upon the fixed frame and having arms at each end connected with the reciprocating frame, a plate having slots therein as described in which work pins connected with said rock-shaft and rest, a swinging rod carried by said reciprocating frame and adapted to pass between the latched and unlatched carrying bars, connections between said swinging rod and the carrying-bar rest by which said rod will be positioned beneath the unlatched carrying bars when the rest is lowered, actuating mechanism between said slotted plate and a suitably located handle, whereby said slotted plate may be reciprocated to lower the rest, position the swinging rod, vibrate the reciprocating frame and carrying bars to carry, and also restore said parts to their normal position.

126. A carrying mechanism comprising a series of members moved in one direction to add, for instance, and in the other direction to subtract, for instance, a handle for actuating said carrying mechanism at the will of the operator and independently of the movements of the registering apparatus proper, and reversible connections between said handle and said carrying mechanism, whereby the said carrying mechanism may be made to carry in either direction.

127. The combination with registering wheels of a carrying mechanism comprising a series of carrying bars normally away from the registering-wheels and normally maintained in a rearward position for instance, carrying teeth suitable connections operated thereby for unlocking said bars, actuating mechanism for moving said bars forwardly for instance, to carry for addition, for example, and reversible connections in said actuating mechanism, whereby the said mechanism may position said carrying bars forwardly and move them rearwardly for instance, to carry for subtraction for example.

128. The combination with registering wheels of a carrying mechanism comprising a series of carrying bars, a reciprocating frame in which said carrying bars are normally locked from the registering wheels, carrying teeth having suitable connections for unlocking said bars, a rest upon which said bars drop after being unlocked and before engaging the registering-wheels, means normally maintaining the reciprocating frame in a rearward position for instance, mechanism for moving said reciprocating frame forwardly for instance, to carry for addition for example, a handle having suitable connections with said mechanism, and reversible connections comprised in the aforesaid connections for causing said mechanism to move said reciprocating frame in the opposite direction, for example, to carry for subtraction, but to operate in other respects the same as before.

129. The combination of a series of registering-wheels, pawls for locking the same against rotation, a series of carrying bars adapted to be moved in one or the other direction to add or subtract, means for positioning said bars to carry, and operating devices between said locking pawls and carrying bars, normally out of engagement with each other, but adapted to engage when in the act of carrying, said carrying bars and devices being constructed to operate in either direction for addition and subtraction.

130. The combination of a series of registering-wheels, pawls for locking the same against rotation, a series of carrying bars having two notches and adapted to be moved in one or the other direction to add or subtract, means for positioning said bars to carry, a two-way tilting lever for each bar having a pin adapted to be engaged by one or the other notch in its carrying bar when carrying, according to whether the carrying mechanism is in position to add or subtract, and an arm pivoted to each pawl and engaging the other end of said levers, whereby said arms will be depressed and the registering-wheels unlocked, when said levers are moved in either direction by said carrying bars to add or subtract.

131. A carrying mechanism adapted to be moved in one direction to carry for addition, for instance, and in the other direction to carry for subtraction, for instance, in combination with operating means for actuating said carrying mechanism, and a T-lever between said operating means and the carrying mechanism, whereby the carrying mechanism may be set in a rearward position and moved forwardly by said means to carry for addition, for instance, and the same means may also be set in a forward position and moved rearwardly to carry for subtraction, for instance.

132. A carrying mechanism adapted to be moved in one direction to carry for addition, for instance, and in the other direction to carry for subtraction, for instance, a handle for actuating said carrying mechanism at the will of the operator independently of power derived from the registering apparatus, and a T-lever between the handle connections and the carrying mechanism, whereby the carrying mechanism may be set in a rearward position and moved forwardly by said handle connections and T-lever, to carry for addition, for instance, and may also be set in a forward position and moved rearwardly by said parts to carry for subtraction, for instance.

133. A carrying mechanism adapted to be moved in one direction to carry for adding, for instance, and in the other direction to carry for subtracting, for instance, in combination with a T-lever for actuating said carrying mechanism having suitable connections therewith, a member or members adapted to engage one or the other of the opposite arms of said T-lever at opposite points of said member or members, and operating means for reciprocating said member or members to actuate the T-lever and carrying mechanism to carry in one or the other direction.

134. A carrying mechanism adapted to be moved in one direction to carry for addition, for instance, and in the other direction to carry for subtraction, for instance, in combination with a T-lever for actuating said carrying mechanism having suitable connections therewith, a member or members adapted to engage one or the other opposite arms of said T-lever at opposite points of said member or members and a handle having suitable connection with said member or members for reciprocating the same, said handle being operated at the will of the operator independently of power derived from the registering mechanism.

135. A carrying mechanism adapted to be moved in one direction to carry for addition, for instance, and in the other direction to carry for subtraction, for instance, in combination with a T-lever for actuating said carrying mechanism having suitable connections therewith, a member or members adapted to engage one or the other of the opposite arms of said T-lever at opposite points of said member or members, operating means for reciprocating said member or members to actuate the T-lever and carrying mechanism to carry in one or the other direction, registering wheels gearing for impelling the registering-wheels, a reversing means for changing the direction of rotation of said gearing and registering-wheels to add or subtract, for instance, a positioning appliance for operating said reversing means, having suitable connection with the member or members engaging the T-lever which operates the carrying mechanism, whereby the carrying mechanism may be reversed in operation at the same time that the direction of rotation of the registering-wheels is changed.

136. A carrying mechanism adapted to be moved in one direction to carry for addition, for instance, and in the other direction to carry for subtraction, for instance, in combination with a T-lever for actuating said carrying mechanism having suitable connections therewith, a quadrangular part notched interiorly at opposite sides, one or the other of said notches engaging one pin or the other on opposite ends of said T-lever, a handle having suitable connections for reciprocating said quadrangular part to actuate the T-lever and carrying mechanism to carry in one or the other direction, registering wheels gearing for impelling the registering-wheels, a clutch for changing the direction of rotation of said gearing and registering-wheels to add or subtract for instance, and a rotary longitudinally movable spindle having suitable connection with the clutch and with the quadrangular part, whereby the carrying mechanism may be reversed in operation at the same time that the registering-wheels are changed in direction of rotation.

In testimony whereof I have hereunto set my hand and affixed my seal, this 1st day of October, 1892, in the presence of the two subscribing witnesses.

WILLIAM W. HOPKINS. [L. S.]

Witnesses:
A. C. FOWLER,
GEO. L. NEUHOFF.